US007991630B2

(12) United States Patent
Scalet et al.

(10) Patent No.: US 7,991,630 B2
(45) Date of Patent: Aug. 2, 2011

(54) DISPLAYING LIKELIHOOD VALUES FOR USE IN SETTLEMENT

(75) Inventors: Frank Scalet, Round Rock, TX (US); Scott Henry, Austin, TX (US); Clifton Watters, Pflugerville, TX (US); Scott Dulock, Cedar Park, TX (US)

(73) Assignee: Computer Sciences Corporation, El Segundo, CA (US)

( * ) Notice: Subject to any disclaimer, the term of this patent is extended or adjusted under 35 U.S.C. 154(b) by 196 days.

(21) Appl. No.: 12/135,009

(22) Filed: Jun. 6, 2008

(65) Prior Publication Data

US 2009/0187432 A1 Jul. 23, 2009

Related U.S. Application Data

(60) Provisional application No. 61/022,140, filed on Jan. 18, 2008, provisional application No. 61/053,556, filed on May 15, 2008.

(51) Int. Cl.
*G06Q 40/00* (2006.01)

(52) U.S. Cl. .......................................................... 705/4

(58) Field of Classification Search ........................ 705/4
See application file for complete search history.

(56) References Cited

U.S. PATENT DOCUMENTS

| 4,166,599 A | 9/1979 | Auer et al. |
| 4,525,780 A | 6/1985 | Bratt et al. |
| 4,553,206 A | 11/1985 | Smutek et al. |
| 4,638,289 A | 1/1987 | Zottnik |
| 4,648,062 A | 3/1987 | Johnson et al. |
| 4,656,585 A | 4/1987 | Stephenson |
| 4,812,966 A | 3/1989 | Takagi et al. |
| 4,831,526 A | 5/1989 | Luchs et al. |
| 4,837,693 A | 6/1989 | Schotz |
| 4,839,822 A | 6/1989 | Dormond et al. |
| 4,878,167 A | 10/1989 | Kapulka et al. |
| 4,931,793 A | 6/1990 | Fuhrmann et al. |
| 4,945,474 A | 7/1990 | Elliott et al. |
| 4,964,077 A | 10/1990 | Eisen et al. |
| 4,975,840 A | 12/1990 | DeTore et al. |

(Continued)

FOREIGN PATENT DOCUMENTS

EP 0 280 773 9/1988

(Continued)

OTHER PUBLICATIONS

Predicting automobile claims bodily injury severity with sequential ordered logit models; Mercedes Ayuso, Miguel Santolino; University of Barcelona, Department of Econometrics, Avda. Diagonal 690, 08034, Barcelona, Spain; Received Mar. 2006.*

(Continued)

*Primary Examiner* — Alexander Kalinowski
*Assistant Examiner* — Abhishek Vyas
(74) *Attorney, Agent, or Firm* — Meyertons, Hood, Kivlin, Kowert & Goetzel, P.C.; Eric B. Meyertons

(57) ABSTRACT

Likelihood values are determined for one or more closed claims that match an open claim. The likelihood values are displayed as a function of an amount (e.g., general damages amount). The graph may be an x-y graph in which the x-axis is amount and the y-axis is likelihood value. The graph may include a likelihood curve. A band to corresponding a most likely range of amounts is indicated on the graph.

17 Claims, 17 Drawing Sheets

U.S. PATENT DOCUMENTS

| | | |
|---|---|---|
| 4,987,538 A | 1/1991 | Johnson et al. |
| 4,992,972 A | 2/1991 | Brooks et al. |
| 5,008,853 A | 4/1991 | Bly et al. |
| 5,093,911 A | 3/1992 | Parks et al. |
| 5,099,422 A | 3/1992 | Foresman et al. |
| 5,128,859 A | 7/1992 | Carbone et al. |
| 5,155,806 A | 10/1992 | Hoeber et al. |
| 5,157,768 A | 10/1992 | Hoeber et al. |
| 5,170,464 A | 12/1992 | Hayes et al. |
| 5,172,281 A | 12/1992 | Ardis et al. |
| 5,180,309 A | 1/1993 | Egnor |
| 5,191,522 A | 3/1993 | Bosco et al. |
| 5,201,044 A | 4/1993 | Frey, Jr. et al. |
| 5,225,976 A | 7/1993 | Tawil |
| 5,233,513 A | 8/1993 | Doyle |
| 5,241,671 A | 8/1993 | Reed et al. |
| 5,243,524 A | 9/1993 | Ishida et al. |
| 5,287,448 A | 2/1994 | Nicol et al. |
| 5,307,262 A | 4/1994 | Ertel |
| 5,307,265 A | 4/1994 | Winans |
| 5,317,503 A | 5/1994 | Inoue |
| 5,359,509 A | 10/1994 | Little et al. |
| 5,359,660 A | 10/1994 | Clark et al. |
| 5,386,566 A | 1/1995 | Hamanaka et al. |
| 5,388,251 A | 2/1995 | Makino et al. |
| 5,394,555 A | 2/1995 | Hunter et al. |
| 5,410,648 A | 4/1995 | Pazel |
| 5,432,904 A | 7/1995 | Wong |
| 5,434,994 A | 7/1995 | Shaheen et al. |
| 5,446,653 A | 8/1995 | Miller et al. |
| 5,446,659 A | 8/1995 | Yamawaki |
| 5,455,947 A | 10/1995 | Suzuki et al. |
| 5,471,575 A | 11/1995 | Giansante |
| 5,481,667 A | 1/1996 | Bieniek et al. |
| 5,483,442 A | 1/1996 | Black et al. |
| 5,483,632 A | 1/1996 | Kuwamoto et al. |
| 5,499,330 A | 3/1996 | Lucas et al. |
| 5,504,674 A | 4/1996 | Chen et al. |
| 5,504,675 A | 4/1996 | Cragun et al. |
| 5,517,405 A | 5/1996 | McAndrew et al. |
| 5,523,942 A | 6/1996 | Tyler et al. |
| 5,524,489 A | 6/1996 | Twigg |
| 5,535,323 A | 7/1996 | Miller et al. |
| 5,537,315 A | 7/1996 | Mitcham |
| 5,550,734 A | 8/1996 | Tarter et al. |
| 5,550,976 A | 8/1996 | Henderson et al. |
| 5,557,515 A | 9/1996 | Abbruzzese et al. |
| 5,581,677 A | 12/1996 | Myers et al. |
| 5,585,798 A | 12/1996 | Yoshioka et al. |
| 5,586,310 A | 12/1996 | Sharman |
| 5,613,072 A | 3/1997 | Hammond et al. |
| 5,627,886 A | 5/1997 | Bowman |
| 5,630,127 A | 5/1997 | Moore et al. |
| 5,638,508 A | 6/1997 | Kanai et al. |
| 5,644,778 A | 7/1997 | Burks et al. |
| 5,652,705 A | 7/1997 | Spiess |
| 5,652,842 A | 7/1997 | Siegrist, Jr. et al. |
| 5,655,085 A | 8/1997 | Ryan et al. |
| 5,673,402 A | 9/1997 | Ryan et al. |
| 5,689,706 A | 11/1997 | Rao et al. |
| 5,696,705 A | 12/1997 | Zykan |
| 5,704,044 A | 12/1997 | Tarter et al. |
| 5,710,578 A | 1/1998 | Beauregard et al. |
| 5,717,391 A | 2/1998 | Rodriguez |
| 5,717,913 A | 2/1998 | Driscoll |
| 5,732,221 A | 3/1998 | Feldon et al. |
| 5,732,397 A | 3/1998 | DeTore et al. |
| 5,745,901 A | 4/1998 | Entner et al. |
| 5,748,953 A | 5/1998 | Mizutani et al. |
| 5,768,505 A | 6/1998 | Gilchrist et al. |
| 5,768,506 A | 6/1998 | Randell |
| 5,768,578 A | 6/1998 | Kirk et al. |
| 5,787,269 A | 7/1998 | Hyodo |
| 5,787,429 A | 7/1998 | Nikolin |
| 5,797,134 A | 8/1998 | McMillan et al. |
| 5,798,949 A | 8/1998 | Kaub |
| 5,806,078 A | 9/1998 | Hug et al. |
| 5,809,478 A | 9/1998 | Greco et al. |
| 5,809,496 A | 9/1998 | Byrd et al. |
| 5,815,093 A | 9/1998 | Kikinis |
| 5,832,481 A | 11/1998 | Sheffield |
| 5,832,508 A | 11/1998 | Sherman et al. |
| 5,832,530 A | 11/1998 | Paknad et al. |
| 5,835,897 A | 11/1998 | Dang |
| 5,835,914 A | 11/1998 | Brim |
| 5,850,442 A | 12/1998 | Muftic |
| 5,862,325 A | 1/1999 | Reed et al. |
| 5,862,500 A | 1/1999 | Goodwin |
| 5,870,711 A | 2/1999 | Huffman |
| 5,873,066 A | 2/1999 | Underwood et al. |
| 5,877,707 A | 3/1999 | Kowalick |
| 5,877,757 A | 3/1999 | Baldwin et al. |
| 5,884,274 A | 3/1999 | Walker et al. |
| 5,895,461 A | 4/1999 | De La Huerga et al. |
| 5,899,998 A | 5/1999 | McGauley et al. |
| 5,903,873 A | 5/1999 | Peterson et al. |
| 5,907,705 A | 5/1999 | Carter |
| 5,907,848 A | 5/1999 | Zaiken et al. |
| 5,909,683 A | 6/1999 | Miginiac et al. |
| 5,913,198 A | 6/1999 | Banks |
| 5,914,714 A | 6/1999 | Brown |
| 5,915,241 A | 6/1999 | Giannini |
| 5,918,208 A | 6/1999 | Javitt |
| 5,930,759 A | 7/1999 | Moore et al. |
| 5,933,816 A | 8/1999 | Zeanah et al. |
| 5,937,189 A | 8/1999 | Branson et al. |
| 5,948,035 A | 9/1999 | Tomita |
| 5,950,169 A | 9/1999 | Borghesi et al. |
| 5,950,196 A | 9/1999 | Pyreddy et al. |
| 5,953,526 A | 9/1999 | Day et al. |
| 5,956,687 A | 9/1999 | Wamsley et al. |
| 5,956,691 A | 9/1999 | Powers |
| 5,963,952 A | 10/1999 | Smith |
| 5,970,464 A | 10/1999 | Apte et al. |
| 5,982,369 A | 11/1999 | Sciammarella et al. |
| 5,987,430 A | 11/1999 | Van Horne et al. |
| 5,987,434 A | 11/1999 | Libman |
| 5,987,440 A | 11/1999 | O'Neil et al. |
| 5,991,733 A | 11/1999 | Aleia et al. |
| 5,991,756 A | 11/1999 | Wu |
| 5,995,947 A | 11/1999 | Fraser et al. |
| 5,999,940 A | 12/1999 | Ranger |
| 6,009,402 A | 12/1999 | Whitworth |
| 6,012,053 A | 1/2000 | Pant et al. |
| 6,016,477 A | 1/2000 | Ehnebuske et al. |
| 6,016,504 A | 1/2000 | Arnold et al. |
| 6,029,150 A | 2/2000 | Kravitz |
| 6,029,195 A | 2/2000 | Herz |
| 6,037,860 A | 3/2000 | Zander et al. |
| 6,038,393 A | 3/2000 | Iyengar et al. |
| 6,038,668 A | 3/2000 | Chipman et al. |
| 6,043,813 A | 3/2000 | Stickney et al. |
| 6,049,665 A | 4/2000 | Branson et al. |
| 6,061,657 A | 5/2000 | Whiting-O'Keefe |
| 6,064,983 A | 5/2000 | Koehler |
| 6,065,000 A | 5/2000 | Jensen |
| 6,065,047 A | 5/2000 | Carpenter et al. |
| 6,073,104 A | 6/2000 | Field |
| 6,076,026 A | 6/2000 | Jambhekar et al. |
| 6,081,832 A | 6/2000 | Gilchrist et al. |
| 6,088,702 A | 7/2000 | Plantz et al. |
| 6,088,710 A | 7/2000 | Dreyer et al. |
| 6,092,049 A | 7/2000 | Chislenko et al. |
| 6,098,070 A | 8/2000 | Maxwell |
| 6,105,007 A | 8/2000 | Norris |
| 6,112,986 A | 9/2000 | Berger et al. |
| 6,115,690 A | 9/2000 | Wong |
| 6,119,093 A | 9/2000 | Walker et al. |
| 6,128,598 A | 10/2000 | Walker et al. |
| 6,134,582 A | 10/2000 | Kennedy |
| 6,141,015 A | 10/2000 | Tanaka |
| 6,141,611 A | 10/2000 | Mackey et al. |
| 6,148,297 A | 11/2000 | Swor et al. |
| 6,161,071 A | 12/2000 | Shuman et al. |
| 6,163,770 A | 12/2000 | Gamble et al. |
| 6,173,284 B1 | 1/2001 | Brown |
| 6,185,490 B1 | 2/2001 | Ferguson |

| Patent No. | Date | Inventor |
|---|---|---|
| 6,185,540 B1 | 2/2001 | Schreitmueller et al. |
| 6,202,054 B1 | 3/2001 | Lawlor et al. |
| 6,208,973 B1 | 3/2001 | Boyer et al. |
| 6,223,125 B1 | 4/2001 | Hall |
| 6,226,623 B1 | 5/2001 | Schein et al. |
| 6,236,972 B1 | 5/2001 | Shkedy |
| 6,236,975 B1 | 5/2001 | Boe et al. |
| 6,237,035 B1 | 5/2001 | Himmel et al. |
| 6,239,798 B1 | 5/2001 | Ludolph et al. |
| 6,240,408 B1 | 5/2001 | Kaufman |
| 6,246,933 B1 | 6/2001 | Bague |
| 6,249,905 B1 | 6/2001 | Yoshida et al. |
| 6,253,203 B1 | 6/2001 | O'Flaherty et al. |
| 6,254,127 B1 | 7/2001 | Breed et al. |
| 6,266,645 B1 | 7/2001 | Simpson |
| 6,268,804 B1 | 7/2001 | Janky et al. |
| 6,272,471 B1 | 8/2001 | Segal |
| 6,272,472 B1 | 8/2001 | Danneels et al. |
| 6,272,482 B1 | 8/2001 | McKee et al. |
| 6,272,528 B1 | 8/2001 | Cullen et al. |
| 6,301,621 B1 | 10/2001 | Haverstock et al. |
| 6,308,187 B1 | 10/2001 | DeStefano |
| 6,314,415 B1 | 11/2001 | Mukherjee |
| 6,314,419 B1 | 11/2001 | Faisal |
| 6,184,782 B1 | 12/2001 | Oda et al. |
| 6,330,551 B1 | 12/2001 | Burchetta et al. |
| 6,336,096 B1 | 1/2002 | Jernberg |
| 6,341,265 B1 | 1/2002 | Provost et al. |
| 6,343,271 B1 | 1/2002 | Peterson et al. |
| 6,351,893 B1 | 3/2002 | St. Pierre |
| 6,363,360 B1 | 3/2002 | Madden |
| 6,370,511 B1 | 4/2002 | Dang |
| 6,381,561 B1 | 4/2002 | Bomar, Jr. et al. |
| 6,389,588 B1 | 5/2002 | Wadhwa et al. |
| 6,397,334 B1 | 5/2002 | Chainer et al. |
| 6,401,079 B1 | 6/2002 | Kahn et al. |
| 6,405,132 B1 | 6/2002 | Breed et al. |
| 6,408,304 B1 | 6/2002 | Kumhyr |
| 6,446,086 B1 | 9/2002 | Bartlett et al. |
| 6,449,652 B1 | 9/2002 | Blumenau et al. |
| 6,452,607 B1 | 9/2002 | Livingston |
| 6,456,303 B1 | 9/2002 | Walden et al. |
| 6,467,081 B2 | 10/2002 | Vaidyanathan et al. |
| 6,473,084 B1 | 10/2002 | Phillips et al. |
| 6,473,748 B1 | 10/2002 | Archer |
| 6,473,794 B1 | 10/2002 | Guheen et al. |
| 6,477,533 B2 | 11/2002 | Schiff et al. |
| 6,480,956 B1 | 11/2002 | DiRienzo |
| 6,484,178 B1 | 11/2002 | Bence, Jr. et al. |
| 6,493,650 B1 | 12/2002 | Rodgers et al. |
| 6,505,176 B2 | 1/2003 | DeFrancesco et al. |
| 6,513,019 B2 | 1/2003 | Lewis |
| 6,523,172 B1 | 2/2003 | Martinez-Guerra et al. |
| 6,525,672 B2 | 2/2003 | Chainer et al. |
| 6,532,459 B1 | 3/2003 | Berson |
| 6,560,592 B1 | 5/2003 | Reid et al. |
| 6,570,609 B1 | 5/2003 | Heien |
| 6,584,467 B1 | 6/2003 | Haught et al. |
| 6,594,697 B1 | 7/2003 | Praitis et al. |
| 6,604,080 B1 | 8/2003 | Kern |
| 6,609,200 B2 | 8/2003 | Anderson |
| 6,633,316 B1 | 10/2003 | Maddalozzo et al. |
| 6,636,242 B2 | 10/2003 | Bowman-Amuah |
| 6,643,652 B2 | 11/2003 | Helgeson et al. |
| 6,658,568 B1 | 12/2003 | Ginter et al. |
| 6,681,380 B1 | 1/2004 | Britton et al. |
| 6,684,388 B1 | 1/2004 | Gupta et al. |
| 6,696,929 B2 | 2/2004 | Igaki et al. |
| 6,728,769 B1 | 4/2004 | Hoffmann |
| 6,675,074 B2 | 6/2004 | Hathout et al. |
| 6,751,657 B1 | 6/2004 | Zothner |
| 6,775,658 B1 | 8/2004 | Zothner |
| 6,810,382 B1 | 10/2004 | Wamsley et al. |
| 6,832,205 B1 | 12/2004 | Aragones et al. |
| 6,850,843 B2 | 2/2005 | Smith et al. |
| 6,850,922 B1 | 2/2005 | Wason |
| 6,868,413 B1 | 3/2005 | Grindrod et al. |
| 6,925,468 B1 | 8/2005 | Bobbitt et al. |
| 6,938,029 B1 | 8/2005 | Tien |
| 6,952,741 B1 | 10/2005 | Bartlett et al. |
| 6,961,708 B1 | 11/2005 | Bierenbaum |
| 6,970,844 B1 | 11/2005 | Bierenbaum |
| 7,013,284 B2 | 3/2006 | Guyan |
| 7,024,418 B1 | 4/2006 | Childress et al. |
| 7,051,046 B2 | 5/2006 | Virag et al. |
| 7,095,426 B1 | 8/2006 | Childress |
| 7,197,444 B2 | 3/2007 | Bomar, Jr. et al. |
| 7,249,114 B2 | 7/2007 | Burchetta et al. |
| 7,328,212 B2 | 2/2008 | Voss et al. |
| 7,337,121 B2 | 2/2008 | Beinat et al. |
| 7,343,307 B1 | 3/2008 | Childress |
| 7,398,219 B1 | 7/2008 | Wolfe |
| 7,418,400 B1 | 8/2008 | Lorenz |
| 7,424,715 B1 | 9/2008 | Dutton |
| 7,430,514 B1 | 9/2008 | Childress et al. |
| 7,430,515 B1 | 9/2008 | Wolfe et al. |
| 7,451,148 B2 | 11/2008 | Childress et al. |
| 7,720,698 B1 | 5/2010 | Gulko et al. |
| 2001/0009033 A1 | 7/2001 | Morisaki et al. |
| 2001/0037223 A1 | 11/2001 | Beery et al. |
| 2001/0037224 A1 | 11/2001 | Eldridge et al. |
| 2001/0041992 A1 | 11/2001 | Lewis et al. |
| 2001/0041993 A1 | 11/2001 | Campbell |
| 2001/0044735 A1 | 11/2001 | Colburn et al. |
| 2002/0002475 A1 | 1/2002 | Freedman et al. |
| 2002/0004729 A1 | 1/2002 | Zak et al. |
| 2002/0007289 A1 | 1/2002 | Malin et al. |
| 2002/0022976 A1 | 2/2002 | Hartigan |
| 2002/0030587 A1 | 3/2002 | Jackson |
| 2002/0035488 A1 | 3/2002 | Aquila et al. |
| 2002/0035491 A1 | 3/2002 | Dombroski |
| 2002/0055861 A1 | 5/2002 | King et al. |
| 2002/0091818 A1 | 7/2002 | Cascio et al. |
| 2002/0116228 A1 | 8/2002 | Bauer et al. |
| 2002/0116254 A1 | 8/2002 | Stein et al. |
| 2002/0120473 A1 | 8/2002 | Wiggins |
| 2002/0120917 A1 | 8/2002 | Abrari et al. |
| 2002/0133362 A1 | 9/2002 | Karathanasis et al. |
| 2002/0138449 A1 | 9/2002 | Kendall et al. |
| 2002/0145666 A1 | 10/2002 | Scaman et al. |
| 2002/0147617 A1 | 10/2002 | Schoenbaum et al. |
| 2002/0161597 A1 | 10/2002 | Klibaner |
| 2002/0194023 A1 | 12/2002 | Turley et al. |
| 2002/0198753 A1 | 12/2002 | Feldman et al. |
| 2003/0033292 A1 | 2/2003 | Meisel et al. |
| 2003/0074353 A1 | 4/2003 | Berkan et al. |
| 2003/0093302 A1 | 5/2003 | Quido et al. |
| 2003/0114972 A1 | 6/2003 | Takafuji et al. |
| 2003/0120477 A1 | 6/2003 | Kruk et al. |
| 2003/0120917 A1 | 6/2003 | Itonaga et al. |
| 2003/0125991 A1 | 7/2003 | Logan |
| 2003/0158759 A1 | 8/2003 | Kannenberg |
| 2003/0200121 A1* | 10/2003 | Santoloci ............... 705/4 |
| 2003/0200123 A1 | 10/2003 | Burge et al. |
| 2003/0221184 A1 | 11/2003 | Gunjal et al. |
| 2004/0030421 A1 | 2/2004 | Haley |
| 2004/0030587 A1 | 2/2004 | Danico |
| 2004/0049409 A1 | 3/2004 | Wahlbin et al. |
| 2004/0054556 A1 | 3/2004 | Wahlbin et al. |
| 2004/0054557 A1 | 3/2004 | Wahlbin et al. |
| 2004/0054558 A1 | 3/2004 | Wahlbin et al. |
| 2004/0054559 A1 | 3/2004 | Wahlbin et al. |
| 2004/0088198 A1 | 5/2004 | Childress et al. |
| 2004/0102984 A1 | 5/2004 | Wahlbin et al. |
| 2004/0102985 A1 | 5/2004 | Wahlbin et al. |
| 2004/0103004 A1 | 5/2004 | Wahlbin et al. |
| 2004/0103005 A1 | 5/2004 | Wahlbin et al. |
| 2004/0103006 A1 | 5/2004 | Wahlbin et al. |
| 2004/0103007 A1 | 5/2004 | Wahlbin et al. |
| 2004/0103008 A1 | 5/2004 | Wahlbin et al. |
| 2004/0103009 A1 | 5/2004 | Wahlbin et al. |
| 2004/0103010 A1 | 5/2004 | Wahlbin et al. |
| 2004/0111301 A1 | 6/2004 | Wahlbin et al. |
| 2004/0133526 A1 | 7/2004 | Shmueli et al. |
| 2004/0205562 A1 | 10/2004 | Rozek et al. |
| 2004/0215494 A1 | 10/2004 | Wahlbin et al. |
| 2005/0038682 A1 | 2/2005 | Gandee et al. |
| 2005/0060184 A1* | 3/2005 | Wahlbin ............... 705/2 |

| | | | |
|---|---|---|---|
| 2005/0060205 A1 | 3/2005 | Woods et al. | |
| 2005/0192850 A1 | 9/2005 | Lorenz | |
| 2005/0198154 A1 | 9/2005 | Xie et al. | |
| 2006/0111993 A1 | 5/2006 | Lawrence et al. | |
| 2007/0214020 A1 | 9/2007 | Srinivasan et al. | |
| 2007/0226018 A1 | 9/2007 | Gross et al. | |
| 2007/0271119 A1 | 11/2007 | Boerger et al. | |
| 2008/0097796 A1 | 4/2008 | Birchall | |
| 2009/0187428 A1 | 7/2009 | Scalet et al. | |
| 2009/0187429 A1 | 7/2009 | Scalet et al. | |
| 2009/0187430 A1 | 7/2009 | Scalet et al. | |
| 2009/0187431 A1 | 7/2009 | Scalet et al. | |

FOREIGN PATENT DOCUMENTS

| | | |
|---|---|---|
| EP | 0 465 018 | 1/1992 |
| EP | 0 836 779 | 3/1999 |
| EP | 0 926 608 | 6/1999 |
| JP | 10197285 | 7/1998 |
| JP | 10214283 | 8/1998 |
| JP | 111611711 | 6/1999 |
| JP | 2002014950 | 1/2002 |
| WO | WO 02/01460 | 1/2002 |

OTHER PUBLICATIONS

Pinquet, J., Ayuso, M. and Guillén, M. (2007), Selection Bias and Auditing Policies for Insurance Claims. Journal of Risk and Insurance, 74: 425-440.*

U.S. Patent and Trademark Office, "Final Office Action" for U.S. Appl. No. 10/306,804 mailed Mar. 21, 2008.

U.S. Patent and Trademark Office, "Final Office Action" for U.S. Appl. No. 10/306,866 mailed May 5, 2008.

U.S. Patent and Trademark Office, "Final Office Action" for U.S. Appl. No. 10/306,628 mailed Mar. 27, 2008.

U.S. Patent and Trademark Office, "Final Office Action" for U.S. Appl. No. 10/306,873 mailed May 21, 2008.

U.S. Patent and Trademark Office, "Final Office Action" for U.S. Appl. No. 10/306,909 mailed May 14, 2008.

U.S. Patent and Trademark Office, "Final Office Action" for U.S. Appl. No. 10/306,803 mailed May 29, 2008.

U.S. Patent and Trademark Office, "Examiner's Answer" for U.S. Appl. No. 09/969,018 mailed Jul. 21, 2008.

U.S. Patent and Trademark Office, "Final Office Action" for U.S. Appl. No. 09/969,027 mailed Jul. 10, 2008.

U.S. Patent and Trademark Office, "Final Office Action" for U.S. Appl. No. 09/969,020 mailed Jul. 7, 2008.

U.S. Patent and Trademark Office, "Office Action" for U.S. Appl. No. 10/238,025 mailed Jun. 27, 2008.

U.S. Patent and Trademark Office, "Office Action" for U.S. Appl. No. 10/237,547 mailed Jun. 30, 2008.

U.S. Patent and Trademark Office, "Office Action" for U.S. Appl. No. 10/238,981 mailed Aug. 1, 2008.

U.S. Patent and Trademark Office, "Office Action" for U.S. Appl. No. 10/306,858 mailed Jul. 18, 2008.

U.S. Patent and Trademark Office, "Office Action" for U.S. Appl. No. 10/790,632 mailed Jul. 2, 2008.

U.S. Patent and Trademark Office, "Office Action" for U.S. Appl. No. 09/969,021 mailed Sep. 4, 2008.

U.S. Patent and Trademark Office, "Final Office Action" for U.S. Appl. No. 10/238,019 mailed Sep. 23, 2008.

U.S. Patent and Trademark Office, "Office Action" for U.S. Appl. No. 10/306,864 mailed Aug. 22, 2008.

U.S. Patent and Trademark Office, "Office Action" for U.S. Appl. No. 10/306,873 mailed Sep. 23, 2008.

U.S. Patent and Trademark Office, "Office Action" for U.S. Appl. No. 10/306,804 mailed Sep. 2, 2008.

U.S. Patent and Trademark Office, "Office Action" for U.S. Appl. No. 10/306,628 mailed Aug. 22, 2008.

U.S. Patent and Trademark Office, "Examiner's Answer" for U.S. Appl. No. 09/969,516 mailed Oct. 14, 2008.

U.S. Patent and Trademark Office, "Examiner's Answer" for U.S. Appl. No. 09/969,016 mailed Oct. 28, 2008.

U.S. Patent and Trademark Office, "Examiner's Answer" for U.S. Appl. No. 09/969,017 mailed Dec. 11, 2008.

U.S. Patent and Trademark Office, "Supplemental Examiner's Answer" for U.S. Appl. No. 09/969,545 mailed Dec. 9, 2008.

U.S. Patent and Trademark Office, "Examiner's Answer" for U.S. Appl. No. 09/969,015 mailed Dec. 9, 2008.

U.S. Patent and Trademark Office, "Examiner's Answer" for U.S. Appl. No. 09/969,022 mailed Dec. 9, 2008.

U.S. Patent and Trademark Office, "Office Action" for U.S. Appl. No. 09/969,536 mailed Dec. 4, 2008.

U.S. Patent and Trademark Office, "Supplemental Examiner's Answer" for U.S. Appl. No. 09/969,534 mailed Dec. 9, 2008.

U.S. Patent and Trademark Office, "Examiner's Answer" for U.S. Appl. No. 09/969,019 mailed Dec. 9, 2008.

U.S. Patent and Trademark Office, "Examiner's Answer" for U.S. Appl. No. 09/970,161 mailed Dec. 9, 2008.

U.S. Patent and Trademark Office, "Examiner's Answer" for U.S. Appl. No. 09/969,039 mailed Dec. 9, 2008.

U.S. Patent and Trademark Office, "Examiner's Answer" for U.S. Appl. No. 10/306,909 mailed Dec. 15, 2008.

U.S. Patent and Trademark Office, "Examiner's Answer" for U.S. Appl. No. 10/306,803 mailed Dec. 12, 2008.

U.S. Patent and Trademark Office, "Examiner's Answer" for U.S. Appl. No. 10/306,908 mailed Dec. 9, 2008.

U.S. Patent and Trademark Office, "Examiner's Answer" for U.S. Appl. No. 10/306,866 mailed Dec. 9, 2008.

U.S. Patent and Trademark Office, "Final Office Action" for U.S. Appl. No. 10/306,864 mailed Jan. 8, 2009.

U.S. Patent and Trademark Office, "Final Office Action" for U.S. Appl. No. 10/790,632 mailed Dec. 23, 2008.

U.S. Patent and Trademark Office, "Office Action" for U.S. Appl. No. 10/790,626 mailed Jan. 22, 2009.

U.S. Patent and Trademark Office, "Board Decision" for U.S. Appl. No. 09/969,546 mailed Feb. 20, 2009.

U.S. Patent and Trademark Office, "Examiner's Answer" for U.S. Appl. No. 09/969,018 mailed Mar. 19, 2009.

U.S. Patent and Trademark Office, "Final Office Action" for U.S. Appl. No. 09/969,021 mailed Mar. 17, 2009.

U.S. Patent and Trademark Office, "Examiner's Answer" for U.S. Appl. No. 09/969,024 mailed Jan. 9, 2008.

U.S. Patent and Trademark Office, "Final Office Action" for U.S. Appl. No. 10/238,029 mailed Dec. 8, 2008.

U.S. Patent and Trademark Office, "Examiner's Answer" for U.S. Appl. No. 10/306,623 mailed Jan. 7, 2009.

U.S. Patent and Trademark Office, "Final Office Action" for U.S. Appl. No. 10/306,908 mailed Mar. 19, 2009.

U.S. Patent and Trademark Office, "Notice of Allowance" for U.S. Appl. No. 09/969,546 mailed Jun. 22, 2009.

U.S. Patent and Trademark Office, "Office Action" for U.S. Appl. No. 09/969,015 mailed Apr. 28, 2009.

U.S. Patent and Trademark Office, "Office Action" for U.S. Appl. No. 09/969,022 mailed Apr. 28, 2009.

U.S. Patent and Trademark Office, "Advisory Action" for U.S. Appl. No. 09/969,534 mailed Apr. 29, 2009.

U.S. Patent and Trademark Office, "Notice of Allowance" for U.S. Appl. No. 09/969,018 mailed Jun. 29, 2009.

U.S. Patent and Trademark Office, "Office Action" for U.S. Appl. No. 09/969,019 mailed Apr. 28, 2009.

U S Patent and Trademark Office, "Office Action" for U.S. Appl. No. 09/970,161 mailed Apr. 28, 2009.

U.S. Patent and Trademark Office, "Examiner's Answer" for U.S. Appl. No. 09/969,027 mailed Jun. 8, 2009.

U.S. Patent and Trademark Office, "Office Action" for U.S. Appl. No. 10/238,029 mailed Apr. 10, 2009.

U.S. Patent and Trademark Office, "Office Action" for U.S. Appl. No. 10/238,019 mailed Jun. 26, 2009.

U.S. Patent and Trademark Office, "Final Office Action" for U.S. Appl. No. 10/238,981 mailed Apr. 13, 2009.

U S Patent and Trademark Office, "Office Action" for U.S. Appl. No. 10/306,864 mailed Jun. 26, 2009.

U.S. Patent and Trademark Office, "Final Office Action" for U.S. Appl. No. 10/306,909 mailed Apr. 29, 2009.

U.S. Patent and Trademark Office, "Final Office Action" for U.S. Appl. No. 10/306,803 mailed Apr. 29, 2009.

U.S. Patent and Trademark Office, "Office Action" for U.S. Appl. No. 10/306,804 mailed May 26, 2009.

U.S. Patent and Trademark Office, "Final Office Action" for U.S. Appl. No. 10/306,866 mailed Apr. 16, 2009.
U.S. Patent and Trademark Office, "Final Office Action" for U.S. Appl. No. 10/306,858 mailed Apr. 2, 2009.
U.S. Patent and Trademark Office, "Final Office Action" for U.S. Appl. No. 10/306,628 mailed May 7, 2009.
U.S. Patent and Trademark Office, "Office Action" for U.S. Appl. No. 10/790,632 mailed May 22, 2009.
U.S. Patent and Trademark Office, "Office Action" for U.S. Appl. No. 10/790,626 mailed Jun. 24, 2009.
U.S. Patent and Trademark Office, "Office Action" for U.S. Appl. No. 10/912,883 mailed Jun. 25, 2009.
U.S. Patent and Trademark Office, "Final Office Action" for U.S. Appl. No. 10/306,873 mailed Jul. 21, 2009.
U.S. Patent and Trademark Office, "Supplemental Notice of Allowance" for U.S. Appl. No. 09/969,018 mailed Jul. 30, 2009.
U.S. Patent and Trademark Office, "Decision on Appeal" for U.S. Appl. No. 09/969,039 dated Jun. 10, 2009.
U.S. Patent and Trademark Office, "Notice of Allowability" for U.S. Appl. No. 10/306,908 mailed Jul. 27, 2009.
U.S. Patent and Trademark Office, "Office Action" for U.S. Appl. No. 10/306,866 mailed Aug. 14, 2009.
U.S. Patent and Trademark Office, "Final Office Action" for U.S. Appl. No. 09/969,536 mailed Oct. 16, 2009.
U.S. Patent and Trademark Office, "Advisory Action" for U.S. Appl. No. 091969,020 mailed Oct. 21, 2009.
U.S. Patent and Trademark Office, "Office Action" (Restriction Requirement) for U.S. Appl. No. 10/238,025 mailed Oct. 16, 2009.
U.S. Patent and Trademark Office, "Notice of Allowance" for U.S. Appl. No. 10/238,981 mailed Oct. 7, 2009.
U.S. Patent and Trademark Office, "Office Action" for U.S. Appl. No. 10/306,909 mailed Oct. 5, 2009.
U.S. Patent and Trademark Office, "Office Action" for U.S. Appl. No. 10/306,623 mailed Oct. 22, 2009.
U.S. Patent and Trademark Office, "Office Action" for U.S. Appl. No. 10/306,803 mailed Oct. 5, 2009.
U.S. Patent and Trademark Office, "Supplemental Notice of Allowability" for U.S. Appl. No. 10/306,908 mailed Sep. 21, 2009.
U.S. Patent and Trademark Office, "Office Action" for U.S. Appl. No. 10/306,628 mailed Oct. 1, 2009.
U.S. Patent and Trademark Office, "Final Office Action" for U.S. Appl. No. 10/790,632 mailed Oct. 20, 2009.
U.S. Patent and Trademark Office, "Notice of Allowance" for U.S. Appl. No. 09/969,039 dated Oct. 9, 2009.
U.S. Patent and Trademark Office, "Office Action" for U.S. Appl. No. 09/969,015 mailed Oct. 27, 2009.
U.S. Patent and Trademark Office, "Office Action" for U.S. Appl. No. 09/969,022 mailed Oct. 27, 2009.
U.S. Patent and Trademark Office, "Office Action" for U.S. Appl. No. 09/969,019 mailed Oct. 27, 2009.
U.S. Patent and Trademark Office, "Office Action" for U.S. Appl. No. 09/970,161 mailed Oct. 28, 2009.
U.S. Patent and Trademark Office, "Notice of Allowance" for U.S. Appl. No. 10/238,019 mailed Nov. 13, 2009.
U.S. Patent and Trademark Office, "Notice of Allowance" for U.S. Appl. No. 10/306,804 mailed Nov. 9, 2009.
U.S. Patent and Trademark Office, "Office Action" for U.S. Appl. No. 10/790,626 mailed Nov. 25, 2009.
U.S. Patent and Trademark Office, "Notice of Allowance" for U.S. Appl. No. 10/306,873 mailed Dec. 14, 2009.
U.S. Patent and Trademark Office, "Notice of Allowance" for U.S. Appl. No. 10/306,864 mailed Dec. 21, 2009.
U.S. Patent and Trademark Office, "Notice of Allowance" for U.S. Appl. No. 09/969,015 mailed Dec. 31, 2009.
U.S. Patent and Trademark Office, "Notice of Allowance" for U.S. Appl. No. 09/969,019 mailed Dec. 31, 2009.
U.S. Patent and Trademark Office, "Final Office Action" for U.S. Appl. No. 10/238,025 mailed Dec. 31, 2009.
U.S. Patent and Trademark Office, "Decision on Appeal" for U.S. Appl. No. 09/969,146 mailed Jan. 15, 2010.
U.S. Patent and Trademark Office, "Final Office Action" for U.S. Appl. No. 10/912,883 mailed Jan. 25, 2010.
U.S. Patent and Trademark Office, "Notice of Allowance" for U.S. Appl. No. 09/969,022 mailed Jan. 29, 2010.
U.S. Patent and Trademark Office, "Notice of Allowance" for U.S. Appl. No. 09/970,161 mailed Jan. 29, 2010.
U.S. Patent and Trademark Office, "Notice of Allowance" for U.S. Appl. No. 09/969,021 mailed Feb. 4, 2010.
U.S. Patent and Trademark Office, "Decision on Appeal" for U.S. Appl. No. 09/969,146 mailed Mar. 26, 2010.
Blodgett, "Corporate Ethics Codes: A Practical Application of Liability Prevention", Journal of Business Ethics, vol. 16, Nos. 12-23, pp. 1363-1369, 1997.
Falkinham, Sara, "The 'Open and Obvious Defense' is No Longer a Complete Bar to Plaintiff Recovery", Mississippi Law Journal (Fall 1994), p. 241.
"ISO to Acquire Claims Outcome Advisor from Computer Sciences and MYND," Dec. 21, 2000, accessed at www.swampfox.ws.
CSC website, "Fault Evaluator,"www.csc.com, accesssed on Feb. 8, 2006.
ISO Liability Advisor, www.iso.com, accessed on Feb. 8, 2006.
"Policy Management Systems Corporation Announces Pilot Licensing of Claims Outcome Advisor™ to Blue Ridge Insurance Co.," PR Newswire. New York; Aug. 24, 1999, p. 1.
"CSC Files Suit to protect Intellectual Property", PR Newswire, New York: Jan. 12, 2000, p. 1.
Computer Sciences Corp., "Property & Casualty Solutions Precedent ID", Copyright 2007.
Computer Sciences Corp., "CSC Announces New Insurance Software for Claims Assessment and Negotiation", Mar. 1, 2007.
Computer Sciences Corp., "Insurers and Self-Insured Organizations Receive Awards at CSC Connect 2007", Oct. 24, 2007.
Raykar, V.C., and Duraiswami, R., "Very fast optimal bandwidth selection for univariate kernel density estimation" CS-TR-4774/UMIACS-TR-2005-73, Dec. 20, 2005.
Walrand, J., et al., High-Performance Communication Networks, "Economics," Chapter 8 through 8.2.1, p. 361-369, 1996.
Howarth, Brad, "Outsourcing: Technology on tap," Information Economy, BRW, vol. 21, No. 47, p. 1-5, Dec. 3, 1999.
Holding State in Objects with Microsoft Transaction Server, Microsoft Corp., pp. 2, Jun. 1997.
Microsoft Component Services: Server Operating System A Technology Overview, Microsoft Corp., p. 1-7, Aug. 15, 1998.
Utzaeider, James, "Microsoft Transaction Server and Internet Information Server: Technology for the Web," Microsoft Corp., p. 1-5, Feb. 6, 1998.
Straight Through Processing: Migration Assessment for Series II Clients Computer Sciences Corporation, pp. 6, 2003.
Property and Casualty Solutions: CSC's Property & Casualty Claims Solutions, Computer Sciences Corporation, pp. 2, 2003.
@Fault: Improve Claims Practices Through Greater consistency in Fault Assessment, Computer Sciences corporation, pp. 2, 2004.
U.S. Patent and Trademark Office, "Office Action" for U.S. Appl. No. 12/134,997 mailed Aug. 19, 2010.
U.S. Patent and Trademark Office, "Final Office Action" for U.S. Appl. No. 10/237,547 mailed Mar. 31, 2010.
U.S. Patent and Trademark Office, "Notice of Allowance" for U.S. Appl. No. 10/306,866 mailed Mar. 23, 2010.
U.S. Patent and Trademark Office, "Office Action" for U.S. Appl. No. 09/969,146 mailed Apr. 2, 2010.
U.S. Patent and Trademark Office, "Notice of Allowance" for U.S. Appl. No. 10/306,909 mailed Apr. 5, 2010.
U.S. Patent and Trademark Office, "Decision on Appeal" for U.S. Appl. No. 09/969,016 mailed Mar. 26, 2010.
U.S. Patent and Trademark Office, "Notice of Allowance" for U.S. Appl. No. 09/969,016 mailed Apr. 9, 2010.
U.S. Patent and Trademark Office, "Notice of Allowance" for U.S. Appl. No. 10/306,623 mailed Apr. 19, 2010.
U.S. Patent and Trademark Office, "Office Action" for U.S. Appl. No. 09/969,516 mailed Jun. 8, 2010.
U.S. Patent and Trademark Office, "Decision on Appeal" for U.S. Appl. No. 09/969,017 decided May 11, 2010.
U.S. Patent and Trademark Office, "Office Action" for U.S. Appl. No. 09/969,536 mailed Jun. 9, 2010.

U.S. Patent and Trademark Office, "Order Remanding Appeal to Examiner" for U.S. Appl. No. 09/969,534 mailed May 19, 2010.
U.S. Patent and Trademark Office, "Notice of Allowance" for U.S. Appl. No. 10/306,803 mailed Jun. 4, 2010.
Greenleaf, Graham, A Colossus come to judgement: GIO's expert system on general damages, University of New South Wales (published in the Law & Information Technology column, Australian Law Journal) Nov. 26, 1992.
Beinat, Paul, Artificial intelligence helps boost Australian profits, Property-Casualty Insurance Edition, Apr. 97, vol. 97 Issue 12, p. 22, 2/3 p.
Attrino, Tony, Software helps bolster claims assessment, National Underwriter/Property & Casualty Risk & Benefits, May 4, 1998, vol. 102 Issue 18, p. 14, 2p.
Colossus'—A claims management system, creates standard for measuring pain/ sufering claims, Insurance Advocate, May 8, 1999, vol. 110 Issue 19, p. 25, 1/4 p.
Schwartz, Susana, CSC wraps traditional insurance solutions into a neat new package, Insurance and Technology, Sep. 1998, vol. 23 Issue 9, p. 61, 2p.
Bremer, Christine, and Lance Trollop, Colossus: What Colossus is and what it does, accessed at http://www.watl.org.Verdict%20articles/colossus.htm on May 6, 2004.
"@ Fault A Commitment to Consistency," Computer Sciences Corporation, Copyright 2000, pp. 1-2.
"Accident Reconstruction Software Maine Computer Group," Maine Computer Group, Copyright 2001, pp. 1-2.
"ADP CSG: Integrated Medical Solutions," ADP Claims Solutions Group, Copyright 2001, p. 1.
"CSC Expands Cost Containment Solutions for Claims and Legal Expenses," Computer Sciences Corporation, Jun. 27, 2001, El Segundo, CA, pp. 1-2.
"CSC Introduces Liability Assessment Tool to Improve Claims Consistency," Computer Sciences Corporation, Oct. 31, 2001, pp. 1-2.
"CSC: Solutions Search," Computer Sciences Corporation, Copyright 2001, p. 1.
"IMS ICE," ADP Integrated Medical Solutions, Copyright 2001, Rockville, MD, pp. 1-6.
"Insurance Services Office Strengthens Claims Handling Team," ISO Properties, Inc., Copyright 1996, 2001, Jersey City, NJ, pp. 1-2.
"ISO Claims Outcome Advisor," ISO Properties Inc., Copyright 1996, 2001, Jersey City, NJ, pp. 1-2. 9.
"REC-TEC Accident Reconstruction and Analysis Computer Software," George M. Bonnett, Nov. 2001, Rockledge, FL, pp. 1-5.
"REC-TEC Accident Reconstruction Software," George M. Bonnett, Sep. 2001, Rockledge, FL, pp. 1-10.
Frey, Joe, "Page 2: Putting a price on auto injuries: How software called Colossus evaluates your pain—Allstate under colossal pressure," Insure.com, Oct. 26, 2000, pp. 1-3.
Frey, Joe, "Putting a price on auto injuries: How software called Colossus evaluates your pain," Insure.com, Oct. 26, 2000, pp. 1-5.
Juhl, Randy P., "The OTC Revolution;" Drugtopics.com; Mar. 3, 1997, pp. 1-9.
McHenry, Brian G., "The Algorithms of Crash," Southeast Coast Collision Conference, Aug. 2001, pp. 1-34.
Mead, Jay, "Technical Communication," Aug. 1998, V. 45, N. 3, pp. 353-380.
Merlin, Jr., William F., "Collision Course With the Colossus Program: How to Deal With It," The Merlin Law Group, May 2000, Tampa, FL, pp. 1-17.
Merlin, Jr., William F., "Colossus: What We Know Today," The Merlin Law Group, Aug. 2000, Tampa, FL, pp. 1-8.
Merlin, Jr., William F., "Overcoming Allstate's Trade Secrets and Work-Product Objections," The Merlin Law Group, Mar. 2000, Tampa, FL, pp. 1-31.
Laser Technology, Inc. "QuickMap 3D" http://web.archive.org/web/200003011511/222.lasertech.com/laserproducts/qm3d.html, last viewed on Nov. 28, 2005.
Esters, "Computers Can Help Settle Auto Claims" Apr. 28, 1997, National Underwriter. vol. 101, Iss. 17, p. 10.
Ross, "Settled Out of Court" Copyright 1980. Aldine Degruyter.
Ditek@http://www.archive.org/web/20000301124742/www.ditec.com, last viewed on Nov. 28, 2005. (t29).
Spice, "Police use lasers, computers to map scenes Town of Pewaukee's new system boost accuracy of reconstructions, users say" Sep. 29, 1998. Milwaukee Journal Sentinel. p. 2.
Meckbach, "U.S. Universities pick up Ditek's CAD application" Feb. 26, 1999. Computing Canada. vol. 25, Iss. 8 p. 14.
Laser Technology, Inc. "Crash/Crime Scene Mapping" @ http://www.lasertech.com/accidentcsinv.html. Copyright 1999.
Traynor, "The Effects of Varying Safety Conditions on the External Costs of Driving," Winter, 1994 Eastern Economic journal, vol. 20 No. 1 pp. 45-60.
Baker, "Don't Throw Your Adjusters to the Lions" Apr. 1995, Best's Review, vol. 95 No. 12, pp. 66-69.
Harts, "Reel to Real: Should You believe What You See?" Defense Counsel Journal, Oct. 1999, vol. 66. p. 514 from the Dialog File ABI/Inform Global.
Malloy, "'Big Time' Match Frame May Be Small, but It has No Problems Working With the Big Boys", San Antonio Business Journal, vol. 5 No. 11, s1, p. aa, Mar. 15, 1999. Dialog ID No. 0205483 from Dialog File 635 (Business Dateline .RTM.).
Kahn, "The Premise Behind Premises Liability" Feb. 1994, Security Management, vol. 38, Iss. 2 pp. 61-63.
CIGNA P&C Opens National Premises Liability Center, Mar. 1999, PR Newswire, p. 1.
U.S. Patent and Trademark Office, "Communication" for U.S. Appl. No. 09/602,687 mailed Mar. 6, 2009.
U.S. Patent and Trademark Office, "Communication" for U.S. Appl. No. 09/603,130 mailed Dec. 29, 2008.
U.S. Patent and Trademark Office, "Communication" for U.S. Appl. No. 10/285,292 mailed Apr. 19, 2007.
U.S. Patent and Trademark Office, "Communication" for U.S. Appl. No. 10/285,292 mailed Sep. 26, 2007.
U.S. Patent and Trademark Office, "Communication" for U.S. Appl. No. 10/285,292 mailed Mar. 18, 2008.
U.S. Patent and Trademark Office, "Communication" for U.S. Appl. No. 10/285,292 mailed Oct. 17, 2008.
U.S. Patent and Trademark Office, "Communication" for U.S. Appl. No. 10/285,292 mailed Feb. 19, 2009.
U.S. Patent and Trademark Office, "Notice of Allowance" for U.S. Appl. No. 10/285,292 mailed Sep. 4, 2009.
U.S. Patent and Trademark Office, "Communication" for U.S. Appl. No. 10/285,289 mailed Apr. 4, 2008.
U.S. Patent and Trademark Office, "Communication" for U.S. Appl. No. 10/285,289 mailed Oct. 29, 2008.
U.S. Patent and Trademark Office, "Communication" for U.S. Appl. No. 10/285,289 mailed Feb. 19, 2009.
U.S. Patent and Trademark Office, "Communication" for U.S. Appl. No. 10/285,289 mailed Jul. 22, 2009.
U.S. Patent and Trademark Office, "Office Action" for U.S. Appl. No. 10/285,289 mailed May 10, 2010.
U.S. Patent and Trademark Office, "Communication" for U.S. Appl. No. 10/285,339 mailed Apr. 28, 2005.
U.S. Patent and Trademark Office, "Communication" for U.S. Appl. No. 10/285,339 mailed Oct. 20, 2005.
U.S. Patent and Trademark Office, "Communication" for U.S. Appl. No. 10/285,339 mailed Mar. 20, 2006.
U.S. Patent and Trademark Office, "Communication" for U.S. Appl. No. 10/285,339 mailed Sep. 7, 2006.
U.S. Patent and Trademark Office, "Communication" for U.S. Appl. No. 10/285,339 mailed Aug. 10, 2007.
U.S. Patent and Trademark Office, "Communication" for U.S. Appl. No. 10/285,339 mailed Feb. 19, 2008.
U.S. Patent and Trademark Office, "Communication" for U.S. Appl. No. 10/285,339 mailed Jul. 1, 2008.
U.S. Patent and Trademark Office, "Communication" for U.S. Appl. No. 10/285,375 mailed Jun. 21, 2007.
U.S. Patent and Trademark Office, "Communication" for U.S. Appl. No. 10/285,375 mailed Oct. 18, 2007.
U.S. Patent and Trademark Office, "Communication" for U.S. Appl. No. 10/285,375 mailed Apr. 16, 2008.
U.S. Patent and Trademark Office, "Communication" for U.S. Appl. No. 10/285,375 mailed Mar. 15, 2009.
U.S. Patent and Trademark Office, "Communication" for U.S. Appl. No. 10/285,375 mailed Sep. 29, 2008.

U.S. Patent and Trademark Office, "Office Action" for U.S. Appl. No. 10/285,375 mailed Sep. 30, 2009.
U.S. Patent and Trademark Office, "Communication" for U.S. Appl. No. 10/285,338 mailed Jul. 3, 2007.
U.S. Patent and Trademark Office, "Communication" for U.S. Appl. No. 10/285,338 mailed Jan. 23, 2008.
U.S. Patent and Trademark Office, "Communication" for U.S. Appl. No. 10/285,338 mailed Jul. 25, 2008.
U.S. Patent and Trademark Office, "Communication" for U.S. Appl. No. 10/285,338 mailed Feb 4, 2009.
U.S. Patent and Trademark Office, "Notice of Allowance" for U.S. Appl. No. 10/285,338 mailed Sep. 4, 2009.
U.S. Patent and Trademark Office, "Communication" for U.S. Appl. No. 10/285,293 mailed Feb. 7, 2006.
U.S. Patent and Trademark Office, "Communication" for U.S. Appl. No. 10/285,293 mailed Aug. 9, 2006.
U.S. Patent and Trademark Office, "Communication" for U.S. Appl. No. 10/285,293 mailed Sep. 5, 2007.
U.S. Patent and Trademark Office, "Decision on Appeal" for U.S. Appl. No. 10/285,293 mailed Sep. 3, 2009.
U.S. Patent and Trademark Office, "Communication" for U.S. Appl. No. 10/422,632 mailed May 14, 2008.
U.S. Patent and Trademark Office, "Communication" for U.S. Appl. No. 10/422,632 mailed Jan. 30, 2009.
U.S. Patent and Trademark Office, "Communication" for U.S. Appl. No. 10/422,450 mailed Feb. 5, 2008.
U.S. Patent and Trademark Office, "Communication" for U.S. Appl. No. 10/422,450 mailed Aug. 20, 2008.
U.S. Patent and Trademark Office, "Communication" for U.S. Appl. No. 10/422,450 mailed Mar. 2, 2009.
U.S. Patent and Trademark Office, "Final Office Action" for U.S. Appl. No. 10/422,450 mailed Oct. 27, 2009.
U.S. Patent and Trademark Office, "Communication" for U.S. Appl. No. 09/969,024 mailed Jan. 31, 2006.
U.S. Patent and Trademark Office, "Communication" for U.S. Appl. No. 09/969,024 mailed Jun. 1, 2006.
U.S. Patent and Trademark Office, "Communication" for U.S. Appl. No. 09/969,022 mailed Apr. 6, 2006.
U.S. Patent and Trademark Office, "Communication" for U.S. Appl. No. 09/969,015 mailed Jun. 1, 2006.
U.S. Patent and Trademark Office, "Communication" for U.S. Appl. No. 09/969,019 mailed Jun. 1, 2006.
U.S. Patent and Trademark Office, "Communication" for U.S. Appl. No. 09/969,018 mailed Jan. 26, 2006.
U.S. Patent and Trademark Office, "Communication" for U.S. Appl. No. 09/969,018 mailed Jun. 2, 2006.
U.S. Patent and Trademark Office, "Communication" for U.S. Appl. No. 09/969,027 mailed Mar. 3, 2006.
U.S. Patent and Trademark Office, "Office Action" for U.S. Appl. No. 09/969,020 mailed Jan. 26, 2006.
U.S. Patent and Trademark Office, "Final Office Action" for U.S. Appl. No. 09/969,020 mailed Jul. 5, 2006.
U.S. Patent and Trademark Office, "Communication" for U.S. Appl. No. 09/969,146 mailed Feb. 28, 2006.
U.S. Patent and Trademark Office, "Communication" for U.S. Appl. No. 09/969,545 mailed Mar. 23, 2006.
U.S. Patent and Trademark Office, "Communication" for U.S. Appl. No. 09/969,546 mailed Mar. 21, 2006.
U.S. Patent and Trademark Office, "Communication" for U.S. Appl. No. 09/969,016 mailed Mar. 21, 2006.
U.S. Patent and Trademark Office, "Communication" for U.S. Appl. No. 09/969,536 mailed Mar. 24, 2006.
U.S. Patent and Trademark Office, "Communication" for U.S. Appl. No. 09/969,534 mailed Feb. 17, 2006.
U.S. Patent and Trademark Office, "Communication" for U.S. Appl. No. 09/970,161 mailed Mar. 23, 2006.
U.S. Patent and Trademark Office, "Communication" for U.S. Appl. No. 09/969,021 mailed Feb. 27, 2006.
U.S. Patent and Trademark Office, "Communication" for U.S. Appl. No. 09/969,017 mailed Mar. 1, 2006.
U.S. Patent and Trademark Office, "Communication" for U.S. Appl. No. 09/969,516 mailed Aug. 10, 2006.
U.S. Patent and Trademark Office, "Office Action" for U.S. Appl. No. 09/969,020 mailed Dec. 21, 2006.
U.S. Patent and Trademark Office, "Communication" for U.S. Appl. No. 09/969,018 mailed Dec. 4, 2006.
U.S. Patent and Trademark Office, "Communication" for U.S. Appl. No. 09/969,017 mailed Oct. 11 2006.
U.S. Patent and Trademark Office, "Final Office Action" for U.S. Appl. No. 09/969,017 mailed May 9, 2007.
U.S. Patent and Trademark Office, "Communication" for U.S. Appl. No. 09/969,016 mailed Mar. 3, 2007.
U.S. Patent and Trademark Office, "Communication" for U.S. Appl. No. 09/969,534 mailed May 30, 2007.
U.S. Patent and Trademark Office, "Communication" for U.S. Appl. No. 09/969,018 mailed Jun. 21, 2007.
U.S. Patent and Trademark Office, "Communication" for U.S. Appl. No. 09/969,027 mailed Jun. 20, 2007.
U.S. Patent and Trademark Office, "Communication" for U.S. Appl. No. 09/969,024 mailed May 23, 2007.
U.S. Patent and Trademark Office, "Communication" for U.S. Appl. No. 10/306,623 mailed Mar. 7, 2007.
U.S. Patent and Trademark Office, "Office Action" for U.S. Appl. No. 10/306,866 mailed Jun. 21, 2007.
U.S. Patent and Trademark Office, "Office Action" for U.S. Appl. No. 10/306,858 mailed Jun. 29, 2007.
U.S. Patent and Trademark Office, "Office Action" for U.S. Appl. No. 09/969,021 mailed Mar. 8, 2007.
U.S. Patent and Trademark Office, "Office Action" for U.S. Appl. No. 10/306,873 mailed Sep. 20, 2007.
U.S. Patent and Trademark Office, "Final Office Action" for U.S. Appl. No. 10/306,804 mailed Oct. 3, 2007.
U.S. Patent and Trademark Office, "Office Action" for U.S. Appl. No. 10/306,803 mailed Oct. 5, 2007.
U.S. Patent and Trademark Office, "Office Action" for U.S. Appl. No. 10/306,908 mailed Oct. 4, 2007.
U.S. Patent and Trademark Office, "Office Action" for U.S. Appl. No. 10/306,864 mailed Oct. 4, 2007.
U.S. Patent and Trademark Office, "Examiner's Answer" for U.S. Appl. No. 09/969,545 mailed Sep. 4, 2007.
U.S. Patent and Trademark Office, "Office Action" for U.S. Appl. No. 10/306,628 mailed Oct. 10, 2007.
U.S. Patent and Trademark Office, "Office Action" for U.S. Appl. No. 10/239,029 mailed Jun. 29, 2007.
U.S. Patent and Trademark Office, "Final Office Action" for U.S. Appl. No. 09/969,516 mailed Nov. 14, 2007.
U.S. Patent and Trademark Office, "Final Office Action" for U.S. Appl. No. 10/306,858 mailed Dec. 13, 2007.
U.S. Patent and Trademark Office, "Final Office Action" for U.S. Appl. No. 10/306,623 mailed Jan. 25, 2008.
U.S. Patent and Trademark Office, "Final Office Action" for U.S. Appl. No. 10/238,029 mailed Dec. 13, 2007.
U.S. Patent and Trademark Office, "Office Action" for U.S. Appl. No. 09/969,020 mailed Jan. 24, 2008.
U.S. Patent and Trademark Office, "Final Office Action" for U.S. Appl. No. 09/969,021 mailed Jan. 8, 2008.
U.S. Patent and Trademark Office, "Office Action" for U.S. Appl. No. 09/969,027 mailed Jan. 11, 2008.
U.S. Patent and Trademark Office, "Office Action" for U.S. Appl. No. 10/238,019 mailed Jan. 11, 2008.
U.S. Patent and Trademark Office, "Final Office Action" for U.S. Appl. No. 10/238,981 mailed Jan. 25, 2008.
U.S. Patent and Trademark Office, "Final Office Action" for U.S. Appl. No. 09/969,017 mailed Apr. 16, 2008.
U.S. Patent and Trademark Office, "Final Office Action" for U.S. Appl. No. 09/969,016 mailed Mar. 17, 2008.
U.S. Patent and Trademark Office, "Office Action" for U.S. Appl. No. 09/969,534 mailed Apr. 15, 2008.
U.S. Patent and Trademark Office, "Office Action" for U.S. Appl. No. 09/969,019 mailed Feb. 27, 2008.
U.S. Patent and Trademark Office, "Office Action" for U.S. Appl. No. 09/969,019 mailed Apr. 28, 2008.
U.S. Patent and Trademark Office, "Examiner's Answer" for U.S. Appl. No. 09/969,146 mailed Oct. 5, 2007.

U.S. Patent and Trademark Office, "Office Action" for U.S. Appl. No. 10/238,029 mailed May 12, 2008.
U.S. Patent and Trademark Office, "Final Office Action" for U.S. Appl. No. 10/306,864 mailed Mar. 27, 2008.
U.S. Patent and Trademark Office, "Final Office Action" for U.S. Appl. No. 10/306,908 mailed Mar. 21, 2008.
U.S. Patent and Trademark Office, "Final Office Action" for U.S. Appl. No. 12/134,997 mailed Feb. 7, 2011.
U.S. Patent and Trademark Office, "Final Office Action" for U.S. Appl. No. 12/134,997 mailed Feb. 7, 2011.
U.S. Patent and Trademark Office, "Office Action" for U.S. Appl. No. 12/135,004 mailed Mar. 21, 2011.
U.S. Patent and Trademark Office, "Office Action" for U.S. Appl. No. 12/134,991 mailed May 3, 2011.

* cited by examiner

Soft Tissue Injury

Median of precedents in data set: $4,596
Mean of precedents in data set: $4,695
Mid-zone of precedents in data set: $4,595

| Claimant | | Medical | |
|---|---|---|---|
| Claim Number | 4765 | Demonstrables | none |
| Date of Accident | 03/30/2005 | | Soft Tissue. |
| Age | 19 | Injuries | Sprain Strain of cervical spine |
| Gender | Female | | Sprain Strain of lumbosacral spine |
| State | Texas | Treatment Period | 15 weeks |
| County | Travis | | 15 weeks |
| Claim Type | Unlitigated | | 36 (Chiropractor) |
| | | Treatment | none |
| | | Prognoses | resolved |
| | | Dr. Chiropractor for the Treatment on 07/21/2005: | |

| This claim has closed on 06/29/2005: | | |
|---|---|---|
| General Damages | | $6,600 |
| Accepted Medicals | $8,110 | |
| Accepted Wages | $0 | |
| Specials | $8,110 | $8,110 |
| Gross Total | | $14,710 |
| Claimant Liability | | 0.00% |

*FIG. 3*

Fracture Injury

Median of precedents in data set: $8,760 Mean of precedents in data set: $9,821
Mid-zone of precedents in data set: $8,571

| Claimant | | Medical | |
|---|---|---|---|
| Claim Number | 4653 | Demonstrables | |
| Date of Accident | 09/01/2004 | Injuries (* denote dominant factors) | |
| Age | 44 | * Open fracture of left radius (1 months - ongoing symptoms) | |
| Gender | Male | Treatments | |
| State | Nebraska | left wrist - Open reduction of fracture/left arm | |
| County | Lincoln | left arm - Immobilization | |
| Claim Type | Unrepresented | systemic - Prescribed medication | |
| | | Soft Tissue | |
| | | none | |
| | | Future Treatments | |
| | | none | |

| This claim has closed on 10/01/2004: | | |
|---|---|---|
| General Damages | | $20,139 |
| Claimed Wage Loss | $6,584 | |
| Accepted Wage Loss | $6,584 | |
| Medicals | $23,007 | $23,007 |
| Disfigurement | | $0 |
| Gross Total | | $50,000 |
| Claimant Liability | | 0.00% |

| Claim ID | Matching Claim ID | Rating | Prec_Stl_Adj_Mny | STL_GDS_MNY | Prec_GD_Liklihood |
|---|---|---|---|---|---|
| CWW110001001 | 0000001464001 | 2 | 339.52 | 380 | 0.00029299 |
| CWW110001001 | 0000002063001 | 4 | 758.21 | 4995 | 0.000417868 |
| CWW110001001 | 0000017267001 | 1 | 769.29 | 927 | 0.000419192 |
| CWW110001001 | 0000001234001 | 3 | 897.03 | 1407 | 0.000425344 |
| CWW110001001 | 0000012582001 | 4 | 1082.54 | 1090 | 0.000406217 |
| CWW110001001 | 0000005265001 | 2 | 1553.00 | 2000 | 0.000280081 |
| CWW110001001 | 0000012497001 | 4 | 2189.12 | 3121 | 0.000159015 |
| CWW110001001 | 0000016477001 | 2 | 3123.46 | 5793 | 0.000137601 |
| CWW110001001 | 0000004399001 | 4 | 3825.83 | 22000 | 0.000121044 |

(442 → Claim ID, 444 → Matching Claim ID, 446 → Rating, 448 → Prec_Stl_Adj_Mny, 450 → STL_GDS_MNY, 452 → Prec_GD_Liklihood)

FIG. 17

| Candidate Closed Claim | | | | | Matching Closed Claims | | | | | | |
|---|---|---|---|---|---|---|---|---|---|---|---|
| ID | Type | Juris | Dom | Value | Zone | ID | Value($) | Mean | Difference | Median | Mid-Zone Average |
| 1 | U | TX | ST | 5,115.00 | Low | M | 2,000.00 | 5,162.50 | | 5,150.00 | 5,125.00 |
| | | | | | Low | N | 2,200.00 | | | | |
| | | | | | Mid | O | 4,900.00 | | | | |
| | | | | | Mid | P | 5,100.00 | | | | |
| | | | | | Mid | Q | 5,200.00 | | | | |
| | | | | | Mid | R | 5,300.00 | | | | |
| | | | | | High | S | 7,600.00 | | | | |
| | | | | | High | T | 9,000.00 | | | | |
| 2 | D | MA | D | 15,500.00 | Low | V | 10,000.00 | 17,100.00 | | 14,000.00 | 14,500.00 |
| | | | | | Mid | W | 13,500.00 | | | | |
| | | | | | Mid | X | 14,000.00 | | | | |
| | | | | | Mid | Y | 16,000.00 | | | | |
| | | | | | High | Z | 32,000.00 | | | | |
| Total Value - Candidates | | | | 20,615.00 | | Total Representative Values | | Mean | Difference | Median | Mid-Zone Average |
| | | | | | | | | 22,262.50 | 1,647.50 | 19,150.00 | 19,625.00 |
| | | | | | | Potential Impact | | | 7.99% | 7.11% | 4.80% |
| | | | | | | | | | | 1,465.00 | 990.00 |

DISPLAYING LIKELIHOOD VALUES FOR USE IN SETTLEMENT

PRIORITY CLAIM

This application claims priority to U.S. Provisional Patent Application Ser. No. 61/022,140 filed on Jan. 18, 2008 entitled: "SYSTEM AND METHOD FOR EVALUATING EFFECTIVENESS OF INSURANCE CLAIMS ASSESSMENT AND NEGOTIATION" and U.S. Provisional Patent Application Ser. No. 61/053,556 filed on May 15, 2008, entitled "SYSTEM AND METHOD FOR DETERMINING AMOUNTS FOR SETTLING INSURANCE CLAIMS", the disclosures of which is hereby incorporated by reference as if fully set forth herein.

BACKGROUND OF THE INVENTION

1. Field of the Invention

The present invention generally relates to methods of assessment and negotiation of insurance claims. Certain embodiments relate to systems and methods of evaluating the effectiveness and consistency of computer processes and systems used in insurance assessment and negotiation.

2. Description of the Related Art

Insurance companies have been processing and settling claims associated with bodily injury for a long time. The task of evaluating, analyzing or estimating the amount of damage associated with one or more types of bodily injuries, especially trauma-induced bodily injuries, can be very complex. Complexity in the evaluation process often arises out of the fact that concurrent expertise in legal, medical and insurance fields is often required to arrive at a particular decision involving a bodily injury claim.

Several factors can affect the estimated amount of the claim associated with a bodily injury. Every accident is different and every injury is unique. Arriving at a customized evaluation of a bodily injury claim, which is unique for a specific accident, injury, etc. is desirable. Applying across-the-board standards may tend to result in an inequitable solution for one or more parties involved. External environmental factors, such as the experience level of a claims adjuster, record of accomplishment of the legal professionals, post-injury quality of life for the injured party, etc., all may affect the valuation of a claim.

Many insurance companies have been using computer-based and knowledge-based claim-processing systems to process, evaluate, analyze and estimate thousands or even millions of claims in what is intended to be a fair and consistent manner. A knowledge-based claim-processing system may include an expert system which utilizes and builds a knowledge base to assist the user in decision making. Such a system may allow the insurance companies to define new business rules and/or use previously defined rules, in real-time. The business rules are generally written by industry experts to evaluate legal, medical, insurance conditions before arriving at a valuation of a claim.

The use of assessment tools can improve the fairness and equity in claim adjusting, especially the equity between claimants with similar claims. However, there is often significant variation in the values of similar claims. In many instances, these variations may be warranted by the individual nuances of a particular claim. However, there are also a number of claims with widely disparate values that likely have no real material differences to warrant these disparate values. For any given insurer, there may be a number of precedent claims in the insurer's closed claim database that embody the best practices for a particular candidate claim; however, finding and presenting these claims to the insurer's claim team as a basis for closing the candidate claim may not be possible due to the sheer size of the database and the difficulty in matching the essential features of a claim with the available tools or methods.

Even where assessment tools for claims adjustment and negotiation are being used (or considered for use) by an organization, it may be difficult to assess how useful or consistent the values (e.g., dollar amounts) being generated using the system are.

SUMMARY

Various embodiments of determining and displaying amounts for use in settling insurance claims are disclosed. In an embodiment, closed claims that match an open claim are identified based on one or more characteristics of the open claim. A likelihood value associated with at least one of the matching closed claims is determined. An amount for use by an adjuster in settling the open claim (e.g., a general damages amount or a recommended payout amount) is determined based on the likelihood value for at least one of the matching claims. A most likely amount and most likely range associated with the open claim may be determined based on the likelihood values. In certain embodiments, likelihood values are determined using kernel density estimation.

In an embodiment, likelihood values are determined for one or more closed claims that match an open claim. A graph is displayed of the likelihood values as a function of an amount (e.g., general damages amount). The graph may be an x-y graph in which the x-axis is amount and the y-axis is likelihood value. The graph may include a likelihood curve. In certain embodiments, a band to corresponding a most likely range of amounts is shown on the graph. The band may include, for example, all the claims within a specified percentage of a most likely value for an open claim. The band may provide a visual aid to an adjuster in choosing an amount for settling the open claim.

In an embodiment, a selection is made from a defined list of one or more equalization criteria. Based on the selected equalization criteria, equalization values are derived from a set of closed claim data. The selection of the equalization criteria and the derivation of equalization values may be accomplished during installation of a claims-matching program onto a computer system. During use of the claims-matching program to process open claims, bodily injury data for the open claims are entered into the system. For one or more of the open claims, precedent claims that match the open claim are identified based on characteristics of the open claim. A value for one or more of the matching precedent claims (e.g., a general damages value) is adjusted using the previously determined equalization values. An amount for use in settling the open claim (e.g., a recommended settlement amount) is determined based on the adjusted value.

In an embodiment, precedent claims that match a pending claim are identified. A general damages amount is determined based on the likelihood value for at least one of the matching precedent claims. A general damages amount is derived from the likelihood value for at least one of the matching precedent claims. Pending claim adjustments are calculated based on amounts associated with the pending claim. Pending claim adjustments are applied to (e.g., added to or subtracted from) the general damages amount to determine a recommended settlement amount. In certain embodiments, pending claim adjustments are applied to an adjusted general damages range derived from the precedent claims to determine a recommended settlement range.

Various embodiments of evaluating processes for insurance claim estimation and settlement are disclosed. In an embodiment, data is provided for closed claims that have been previously settled using an estimation and settlement process. Each closed claims the data is treated as a candidate claim. For each candidate closed claim, a set of closed claims similar to the candidate closed claim is identified based on characteristics of the candidate closed claim. For each set of similar claims so identified, a representative value for the set of similar claims, such as an arithmetic mean, is determined. The settlement values for the candidate closed claims are compared to the representative values for the sets of similar closed claims. The consistency of the claims estimation and settlement process is evaluated based on the comparison. In certain embodiments, a potential benefit of changing or improving the estimation and settlement process is projected based on the comparison. The projection may be used in benefit studies, quality assessments, or the like.

In an embodiment, a method of evaluating an insurance claim estimation and settlement process includes providing candidate claims, each having an associated general damages value. For each candidate claim, a set of claims that are similar to a candidate claim is identified based on characteristics of the candidate claim and the similar claims. A representative general damages value for the set of similar claims is determined. A total general damages value is calculated for all the candidate claims. A total representative general damages value is determined for the sets of similar claims associated with the candidate claims. A difference between the total general damages value for the candidate claims and total representative general damages value for the sets of similar claims is calculated.

In some embodiments, claims in a set of similar claims are grouped into two or more zones based on the values of the claims. A representative value for the set of similar claims may be based on values determined for claims in one or more of the zones, (such as an average value for the claims in a mid-zone). The representative value for the set of similar claims may be compared to the value for a candidate claim.

BRIEF DESCRIPTION OF THE DRAWINGS

A better understanding of the present invention may be obtained when the following detailed description of preferred embodiments is considered in conjunction with the following drawings, in which:

FIG. 3 illustrates a summary report for a set of precedent claims for a soft tissue injury according to one embodiment.

FIG. 4 illustrates a summary report for a set of precedent claims for a fracture injury according to one embodiment.

FIG. 17 illustrates an example of results from a closed claim mathematical analysis.

Figure 1:
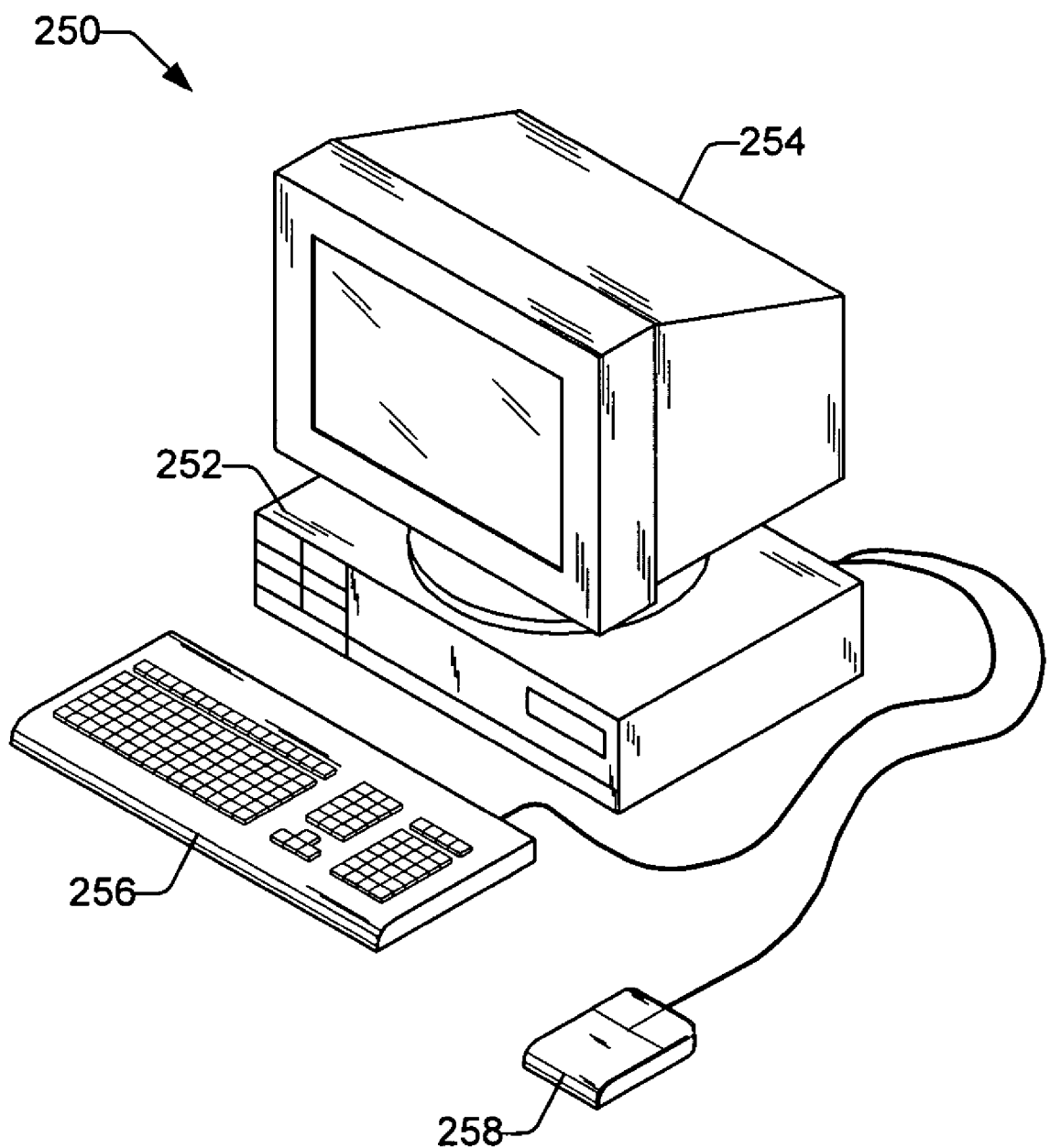
FIG. 1 illustrates a computer system suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended requests. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF ILLUSTRATIVE EMBODIMENTS

FIG. 1 illustrates an embodiment of computer system 250 that may be suitable for implementing various embodiments of a system and method for processing claims. Each computer system 250 typically includes components such as CPU 252 with an associated memory medium such as disks 260. The memory medium may store program instructions for computer programs. The program instructions may be executable by CPU 252. Computer system 250 may further include a display device such as monitor 254, an alphanumeric input device such as keyboard 256, and a directional input device such as mouse 258. Computer system 250 may be operable to execute the computer programs to implement computer-implemented systems and methods for processing claims.

Computer system 250 may include a memory medium on which computer programs according to various embodiments may be stored. The term "memory medium" is intended to include an installation medium, e.g., a CD-ROM, a computer system memory such as DRAM, SRAM, EDO RAM, Rambus RAM, etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. Computer system 250 may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement a method for processing insurance claims. The software program(s) may be implemented in various ways, including, but not limited to, procedure-based techniques, component-based techniques, and/or object-oriented techniques, among others. For example, the software programs may be implemented using C#, ASP.NET, HTML, JavaScript, Java, ActiveX controls, C++ objects, JavaBeans, Microsoft Foundation Classes ("MFC"), browser-based applications (e.g., Java applets), traditional programs, or other technologies or methodologies, as desired.

A CPU such as host CPU 252 executing code and data from the memory medium may include a means for creating and executing the software program or programs according to the embodiments described herein.

Various embodiments may use a service-oriented architecture. In a system using service-oriented architecture, functions may be defined using a description language. Interfaces may be invoked to perform business processes. The interfaces may be independent of the platform on which the systems operate. Therefore, the services may be used regardless of the device, operating system, or communication protocol.

In some embodiments, a system includes a rule and calculation engine. The rule and calculation engine may also allow a user to configure the system to meet particular business needs.

In some embodiments, a system includes a thin-client common front end. The common front end may provide a single claims view for all types of claims. Views can be tailored to specific types of users, such as call center representatives, who handle notification and status calls, and back-office claims processors and adjudicators.

In some embodiments, a back office system may be provided. Back office users may handle more complex business processes and processes that remain active over a longer period of time. The back office may include access to management reports. Through the back office, managers may have access to all functions within their business unit in order to provide advice and to handle issues. In one embodiment, the back office may be provided as a thin client.

As used herein, "FSO" means financial services organization. An FSO may be an organization such as an insurance carrier or a bank. FSO also includes any company, organization, or other entity that covers risk and assesses claims, including entities that self-insure.

As used herein, "general damages" generally refers to general damages relating to an injury or accident. General damages may include damages relating to pain and suffering, permanent impairment, disability, loss of enjoyment of life, and disfigurement.

As used herein, a "closed" claim means a claim that has been settled.

As used herein, an "open" means to a claim that has yet to be settled.

As used herein, "precedents" generally refer to acts or instances that may be used as an example in dealing with subsequent similar instances. Applying this interpretation to bodily injury claims, precedent finding includes the act of comparing the facts of a bodily injury claim to bodily injury claims that have occurred previously, to find similar claims and to compare the "outcome" of these claims with each other. For this purpose, the "outcome" of a bodily injury claim can be the monetary settlement, or award in respect of general damages assessed or awarded for injuries suffered.

As used herein, a "candidate claim" includes a claim that being considered for adjustment, evaluation, estimation, assessment, or comparison. The candidate claim may be, for example, an open claim for which a process of estimation, negotiation, and settlement needs to be carried out by an insurer.

As used herein, a "match" includes a claim that is identified for a candidate claim based on one or more similarities to the candidate claim. For example, a closed claim relating to a broken radius bone may be found to match a candidate claim relating to a broken ulna bone. A match need not require that the characteristics of a claim be identical to the candidate claim. The degree of similarity that a system uses to produce a match may be controlled to produce a set of matching claims that are relevant to a claims negotiation process.

As used herein, "monetary amount" means an amount of money. A monetary amount may be expressed in any terms that indicate or correspond to financial value. In some embodiments, a monetary amount may be expressed in the form of a currency, such as dollars, euros, or yen.

As used herein, "likelihood value" generally refers to a value corresponding to or representing the likelihood of a condition or event. For example, a likelihood value may provide a measure of the likelihood that the monetary value associated with a particular closed claim matching an open claim represents an appropriate value for use in settling the open claim.

As used herein, "most likely value" generally refers to a value derived from a set of two or more values that, based on an established set of criteria, is most likely to represent a good value for settlement of a claim. A "most likely range" generally refers to a range of values derived from a set of two or more values that, based on an established set of criteria, is most likely to represent a good range for settlement of a claim.

As used herein, an "adjusted value" generally refers to a value that is adjusted (increased or decreased) from an original value based on one or more criteria. In some embodiments, an adjustment may be made for one or more differences between a candidate claim and a matching claim.

As used herein, "equalization" generally refers to a process of finding and/or accounting for relativities between settlement general damages amounts with different characteristics (e.g., for different jurisdictions or for different litigation types). For example, when a system is installed, a set of equalization values (e.g., coefficient values) may be derived from a set of closed claims data and stored in a database. During use of the system to process open claims, the equalization values may be retrieved from the database and used to adjust the values of matching precedent claims to account for differences between the characteristics of the open claim and the characteristics of the matching precedent claims. As used herein, equalization does not require that the value of any one claim be made equal to that of any other claim.

Claims Matching and Analysis

In an embodiment, a system allows an adjuster to compare each open and its relevant factors to other similar closed claims to determine common attributes so that the adjuster can better assess the value of each claim. The value of a claim may be, for example, a general damages value for a bodily injury claim. The system may include a database that covers all the closed claims data of a particular FSO. Details of such claims may be accessed by the adjuster to assist the adjuster in assessing values for new claims with the same or similar factors. Similar claims that significantly vary in value can be reviewed by the adjuster to understand what unique factors may have been present in the prior claim to determine whether that prior claim may have relevance to the current claim.

Figure 2:
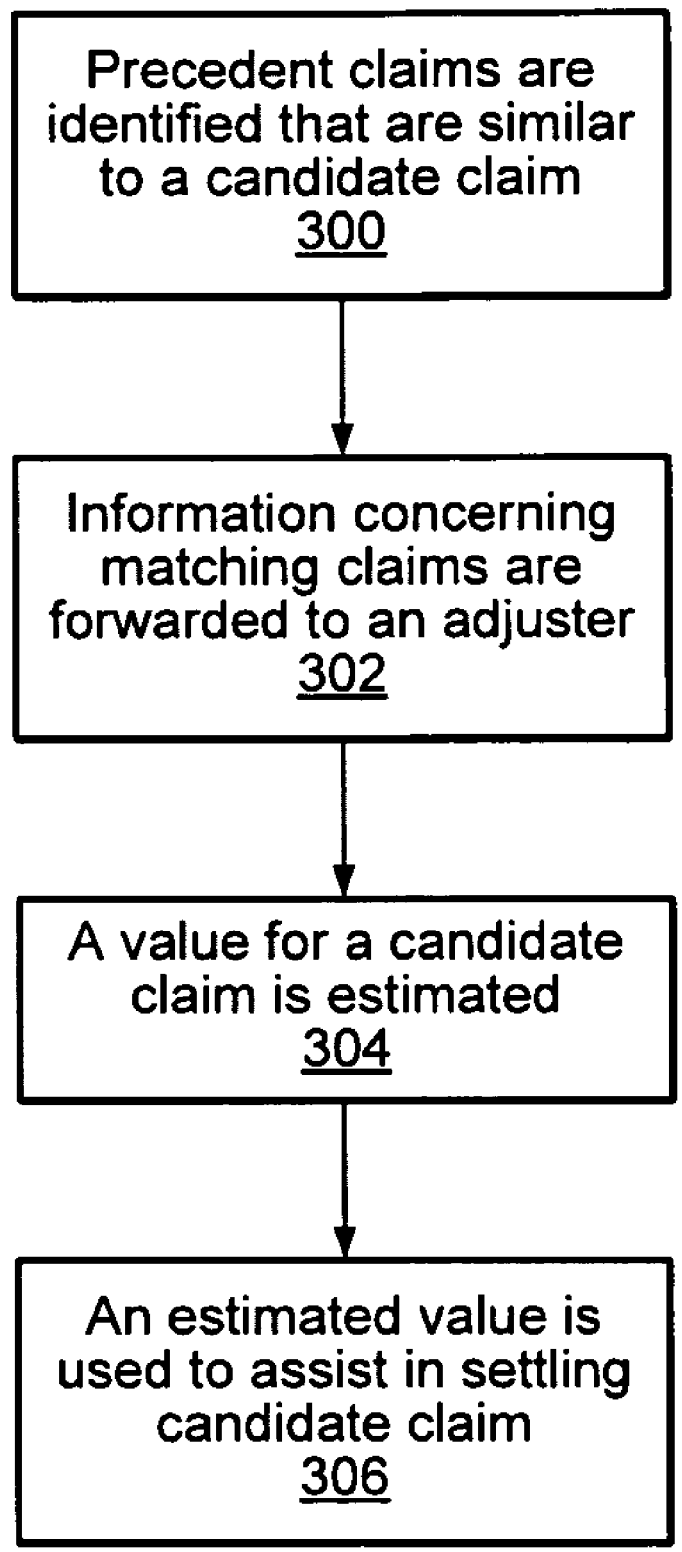
FIG. 2 illustrates matching of candidate claims to precedent claims according to one embodiment.

FIG. 2 illustrates matching of candidate claims to precedent claims according to one embodiment. At 300, one or more claims are identified that are similar to a candidate claim based on one or more characteristics of the candidate claim. The identification of similar claims may be carried out automatically using a computer system. In one embodiment, a claims matching process may be performed using PRECEDENT ID™, available from Computer Sciences Corporation (CSC).

At 302, information concerning the matching claims may be presented to an adjuster. The information may include information on individual claims, as well as information concerning the set of claims as a whole. For example, statistical information concerning the matching claims may be presented to the adjuster.

At 304, a value for the candidate claim is estimated. The value may be based on the value of one or more of the matching claims. In some embodiments, the estimated value for the candidate claim may be the same as a particular matching claim. In other embodiments, the estimated value may be based on statistical information (e.g., an average) for one or more of the matching claims.

At 306, the value of the candidate claim may be used in a process for settling the claim. In some cases, the negotiation process for a particular open claim may include more than one matching procedure. For example, an initial offer may be made to a claimant based on one matching procedure. After a counter-offer is received, a second matching process may be carried out to support an analysis of whether to accept the counter-offer or to formulate a response to the counter-offer.

FIG. 3 illustrates an example summary for a set of precedent claims for a soft tissue injury according to one embodiment. FIG. 4 illustrates an example summary for a set of precedent claims for fracture injury according to one embodiment.

Various characteristics of a candidate claim and/or precedent claims may be used in determining a matching set of claims. For a bodily injury claim, examples of characteristics that may be considered include the nature of any injuries, the treatment modalities, the injury stabilization period, the nature of any complications, the medical outcome and prognoses, and the degree of any residual permanent impairment. In certain embodiments, additional data including mitigating factors, attorney name, vehicle impact, and/or driving while under the influence, may be considered.

In some embodiments, a system or program for automatically identifying similar cases may be used in combination with a general assessment tool. In one embodiment, an adjuster may use COLOSSUS®, available from Computer Sciences Corporation, as a general assessment tool. Thus, an adjuster may have a general assessment program and a catalog of precedent cases to assist the adjuster in determining an appropriate value for the claim and to aid in the negotiation process.

If one looks for a precedent for a claim with a broken leg then one might look at claims that involved a fractured femur, patella, tibia or fibula. These however are not similar injuries. The femur and tibia are the two major weight bearing bones of the lower extremity and are considered much more serious injuries than fractures of the fibula and patella, and this would be reflected in the settlement or verdict amount. Furthermore, even if the broken leg were in fact a fractured femur, not all previous cases of fractured femur would necessarily be similar cases. In assessing General Damages for an injury, the nature and type of injury is not assessed in isolation. One also has to assess pain and suffering for the trauma of the treatment and its duration, and the complications that may arise from the injury and also the outcome—whether the injury heals or results in residual dysfunction and impairment, and the degree of such.

In some embodiments, the system collates and presents the outcome of closely similar finalized claims. An insurer's collection of finalized claims includes claims settled by negotiation, those determined by arbitration or mediation and those determined through the court process (verdicts). Finalized cases reflect the opinions and evaluations of adjusters and their peers, attorneys, injured parties, arbitrators and juries, and therefore collectively may be a fair and true reflection of the potential value of a given claim.

While many people would agree that a fracture will be worth more than a contusion, the actual monetary damages assessed for a given injury under particular circumstances can be subject to some disagreement. There can also be disagreement over the order of many injuries in regard to their relative value to each other. These disagreements may be resolved by considering the claims that have already been finalized through settlement, arbitration or verdict.

In an embodiment, relative values or severities of injuries and assessment behavior may be learned from a database of finalized claims. The relative difference between the contusion and fracture are exhibited in the finalized claims already present. The system may use data mining technologies to learn the relative values of such injuries and many others, from the tangle of injuries present in the finalized claims. This technology is also used to determine the impact that various treatments and complications have on the value of claims, as well as other medical and non-medical attributes. These include such things as the jurisdiction, i.e., how damages for particular injuries vary from state to state and county to county, and litigation stage, i.e., whether the claim was settled with or without attorney representation and whether a suit was filed.

Once the relative values of jurisdictions, injuries, treatments and other claim attributes have been learned then finding precedent claims can be constrained by these as well as other factors. For instance, attempting to locate an existing case matching exactly the attributes of a new fractured femur claim would probably prove fruitless. Imagine the very specific medical and non-medical features of a real fractured femur claim: the actual medical treatment, the specific period under care, the prognostic expectation, the impact on lifestyle to this individual, to name only some. It is doubtful whether another claim would exist in any insurer's database which matched exactly these features. Thus the process of locating precedent claims may include consideration of what the key features of this claim are and finding other claims which share these key features—a close match rather than an exact match. The system may determine for example that if there was both a contusion and a fracture in a claim that the contusion was not a key feature of the claim. The knowledge gained from data mining the finalized claims may form the basis of determining what is important and what is not in claims, and how this varies from claim to claim.

Matching may include input of precise and comprehensive injury and claim data to successfully search for similar claims, including the nature of injuries, the treatment modalities, injury stabilization period, nature of any complication, the medical outcome and prognoses, and the degree of any residual permanent impairment or disability.

Apart from claim data, other important information to be stored in the finalized claims database includes the financial outcome of each claim. The General Damages component for all settlements, arbitration awards and verdicts may be stored for each claim along with all the other components of the settlement.

As discussed above, mathematical models may be applied to the information relating to matched claims. Statistical measures such as mean or median for the claim set may be determined and presented to the user.

In some embodiments, claims with similar adjusted general damages amounts are grouped into zones. In determining the zones, typically three are produced, but there may be fewer depending on how many claims are found as matches. The objective in determining zones can be expressed as determining where to place the dividing lines between the values in order to make three good clusters. Good clusters may be characterized by the 'closeness' of the values to each other in a cluster.

Figure 5:
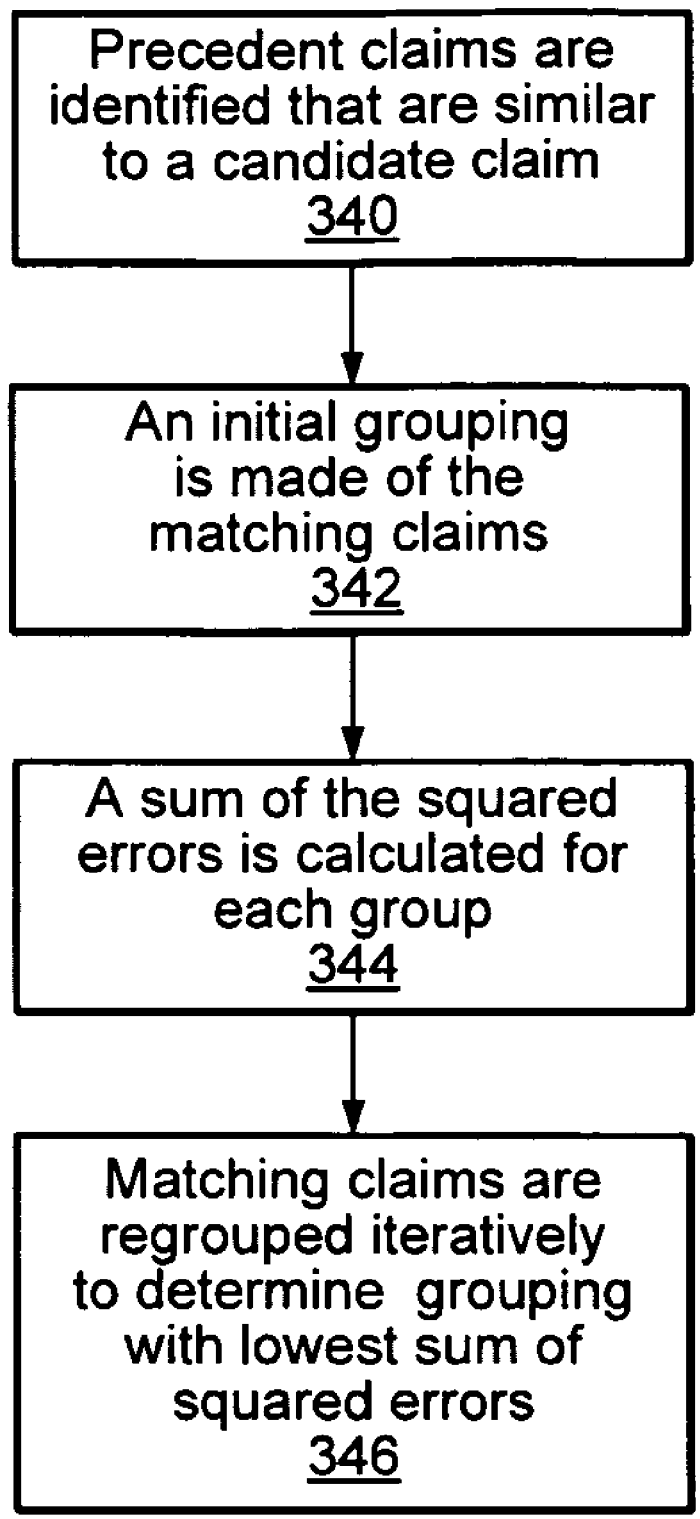
FIG. 5 illustrates grouping of a claim set into zones according to one embodiment.

FIG. 5 illustrates grouping of a claim set into zones according to one embodiment. At 340, claims are identified that are similar to a candidate claim. At 342, an initial grouping of the claims is made. At 344, the sum of the squared errors is calculated by taking the mean of the values in a cluster, finding the difference between each value and the mean, squaring the difference, and computing the sum for all of the claims. At 346, the dividing line is iteratively moved between values to determine the group of values with the lowest sum of squared errors.

In an embodiment, the precedent claims are divided in three groups—High, Medium and Low. For each of the groups the system calculates the minimum, maximum and weighted average value (e.g., general damages value) and the number of claims. The system also needs to derive the values which separate the groups.

Typically, three bands may be calculated. However, there may be fewer bands. In this case the high band is discarded first, then the middle band.

Values may be derived to separate the groups, or bands, in order to place the claims into these bands. In this case of three bands, the task is to find the two values that represent the dividing lines between the low and medium bands, and the dividing line between the medium and high bands. These two values may be found by regression (a stepwise process of refinement of the solution). The regression process starts by dividing the claims into three groups in increasing order of value. The value may be, for example, a General Damages amount or medicals amount, depending on which are being derived at the time. Claims are initially allocated with equal numbers in each group (as far as equal numbers can be achieved, the total number may not be exactly divisible by 3, e.g. 10 claims). The values which separate the groups are then calculated as the mid-points of the claims on either side. In other words, the separator value between the low and medium groups is calculated as halfway between the highest claims in the low group and the lowest claim in the medium group.

The next task is to see if the separator values can be changed in some way in order to derive more compact groups of values, or a tighter configuration of claims in the groups. To measure compactness, or tightness of values, we use the sum of the squared errors—in this case the squared errors between each claim in a group and the average value for that group. If the sum of the squared errors decreases then the claims values in a group will form a tighter cluster. An iterative task is performed, which moves the separator values in the direction of the decreasing total squared error, for all the three groups combined. In other words, it modifies the separator values until it has the tightest fit for the three bands.

To illustrate a sum of the squared errors calculation in a simple example, a set of 100 values are to fit into 2 clusters. Cluster A and cluster B may be divided into zones using the following approach:

1. Sort the values into ascending sequence,
2. Initially set the dividing line such that it splits the values equally, 50 values on each side of the line—therefore 50 values for cluster A and 50 for B.
3. Calculate the sum squared error for cluster A by finding the mean of the 50 values in A and then taking the square of the difference between the mean and each value in A, and summing them, and then do the same for B. The total squared error is the sum of the squared errors for A and B.
4. Move the dividing line up and down in single value increments, and redistribute the values accordingly between A and B, then recalculate the total error. Continue until the total error cannot be reduced any more. In mathematical terms, the foregoing description is a regression to find the best split by descending the squared error surface.

Table 1 is an example of a set of similar claims for which can be grouped into zones according to one embodiment. Table 2 is an example of a sequence of iterations used to group the claims in Table 1. To simplify the illustration, only two zones (Group A and Group B) are determined in the example.

TABLE 1

| Claim ID | Value ($) |
| --- | --- |
| M | 4,000.00 |
| N | 4,200.00 |
| O | 5,000.00 |
| P | 5,100.00 |
| Q | 5,200.00 |
| R | 5,300.00 |

TABLE 2

| | | | Group Mean ($) | Squared Error |
| --- | --- | --- | --- | --- |
| Iteration 1 | Group A | M, N, O | 4,400.00 | 560,000.00 |
| | Group B | P, Q, R | 5,200.00 | 20,000.00 |
| | | | Sum Squared Error | 580,000.00 |
| Iteration 2 | Group A | M, N, O, P | 4,575.00 | 652,400.00 |
| | Group B | Q, R | 5,250.00 | 5,000.00 |
| | | | Sum Squared Error | 657,400.00 |
| Iteration 3 | Group A | M, N | 4,100.00 | 20,000.00 |
| | Group B | O, P, Q, R | 5,150.00 | 50,000.00 |
| | | | Sum Squared Error | 70,000.00 |
| Iteration 4 | Group A | M | 4,000.00 | 0.00 |
| | Group B | N, O, P, Q, R | 4,960.00 | 772,000.00 |
| | | | Sum Squared Error | 772,000.00 |

Referring to Table 2, a first iteration is performed with the claims evenly divided—claims M, N, and O in Group A, and claims P, Q, and R in Group B. The sum squared error is calculated for Iteration 1. Subsequent iterations may be carried out until the grouping with the lowest sum squared error is found. In this case, Iteration 3, in which Group A includes claims M ($4,000) and N ($4,200) and Group B includes claims O ($5,000), P ($5,100), Q ($5,200), and R ($5,300), is associated with the lowest sum squared error (70,000) of all the iterations. This grouping may be used in mathematical models support claim assessment, process evaluation, or other purposes.

In some embodiments, once the zones for a set of claims are established, an average for each zone is calculated using a weighted average calculation that considers the similarity (i.e., more similar attributes) of the precedent claims to the candidate claim.

In order to derive a weighted average, a weight is calculated for each claim, based on its similarity to the candidate claim, For example, an age of the claimant and the impairment as attributes to measure for claim similarity. For whiplash claims, duration of treatment, general practitioner visits, specialist visits, physical therapy, and chiropractic visits as attributes may be used to measure for claim similarity, A ratio is first developed which is calculated as the absolute difference between the candidate claim's attribute value and the precedent claim's attribute value, divided by the size of the zone used in the search for this attribute. For instance, if the candidate claim had a claimant age of 40 and the search used an age range of 30-50 (this range is purely hypothetical and will be influenced by search filters and algorithms) then the age band is 20. If the precedent claim had a claimant age of 45 then the age attribute ratio would be (45-40)/20 or 0.25. Ratios are calculated for all the relevant claim attributes. Then an average ratio is derived from all the relevant attribute ratios that have been calculated. The weight is then 1 minus the average ratio, all squared. Therefore, if the claim is very similar to the candidate claim then the weight will be close to 1, while if it has significant dissimilarities then the weight can be close to zero (e.g., 0.0025).

The weighted average is then calculated by multiplying each precedent claim's value (e.g., adjusted General Damages) by its weight, giving its weighted value. The weighted values for all the claims in a cluster are summed and then divided by the sum of the weights for all precedent matches to the candidate claim. The result is the weighted average.

Determining Amounts for Claims Settlement Using Likelihood Values

Figure 6:
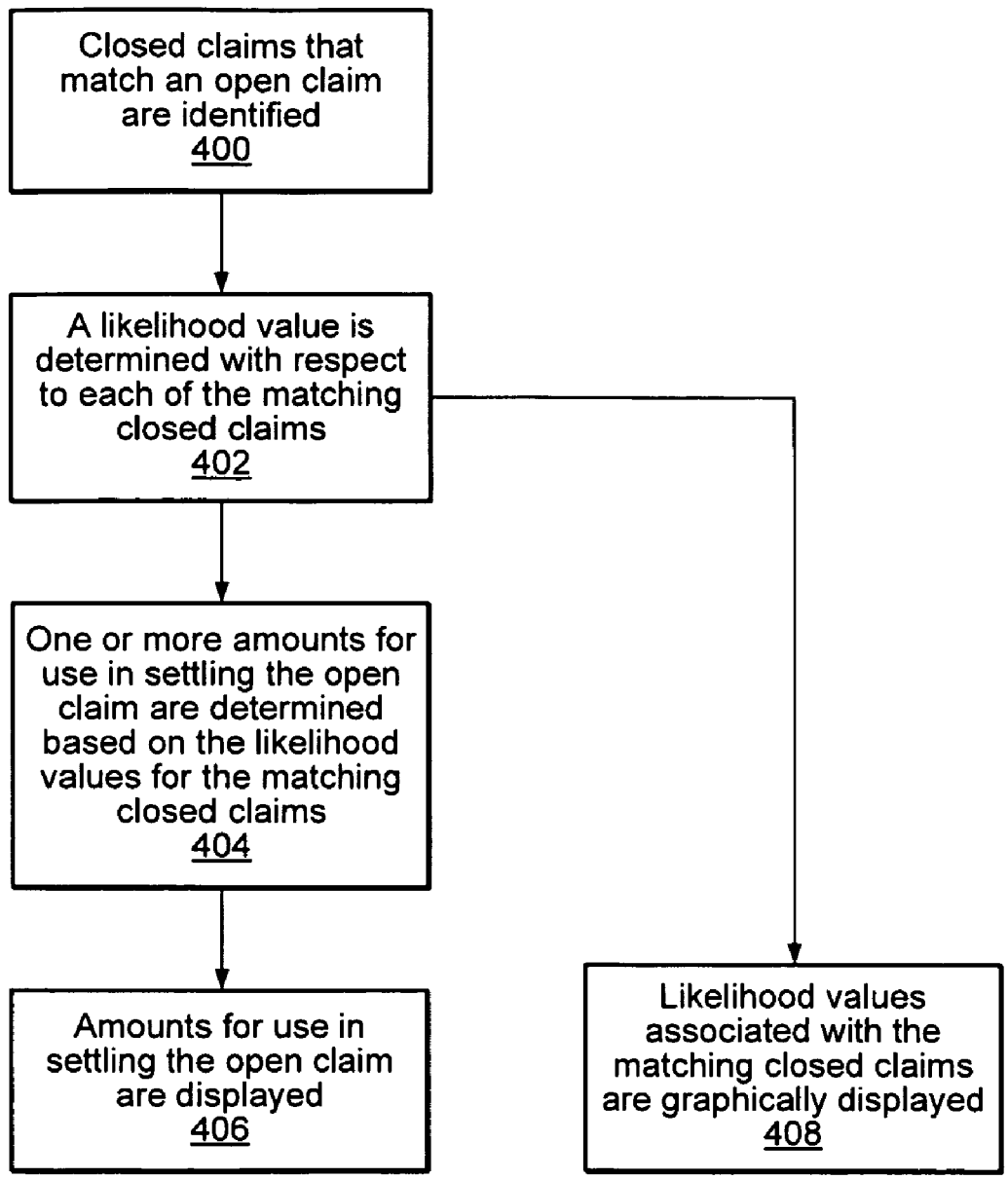
FIG. 6 illustrates determining an amount for use in settling an open claim using likelihood estimation according to one embodiment.

FIG. 6 illustrates determining an amount for use in settling an open claim using likelihood estimation according to one embodiment. At 400, an automated system may be used to identify one or more closed claims that match an open claim. Each of the closed claims may be associated with a corresponding monetary amount. In one embodiment, the monetary amounts are general damages. At 402, a likelihood value is determined with respect to each of the closed claims.

At 404, one or more amounts are determined for the open claim based on the likelihood values for the matching closed claims. The amounts may be monetary amounts. An adjuster may use the monetary amounts in settling the open claim. For example, the monetary amount may be used as a proposed payout amount for the open claim.

Monetary amounts may be representative of a value for any of various aspects of the claim. For example, a monetary amount may represent a general damages value, a medicals value, a settled value, or a payout value. In some embodiments, monetary amounts may be presented to an adjuster as a Most Likely Amount or Most Likely Range.

At 406, one or more of the amounts are displayed. In some embodiments, likelihood values for the matching claims are displayed as a function of amount (e.g., in an x-y graph). At 408, likelihood values associated with the matching claims are graphically displayed. The amounts and likelihood values may be displayed simultaneously or on separate screens.

In some embodiments, likelihood values are determined using kernel density estimation. Kernel density estimations methods suitable for embodiments described herein may be found in "Very fast optimal bandwidth selection for univariate kernel density estimation" by Vikas Chandrakant Raykar and Ramani Duraiswami (Dec. 20, 2005, CS-TR-4774/UMI-ACS-TR-2005-73), which is incorporated herein by reference as if fully set forth herein. In certain embodiments, likelihood values for matching claims are determined using maximum likelihood estimation.

Figure 7:
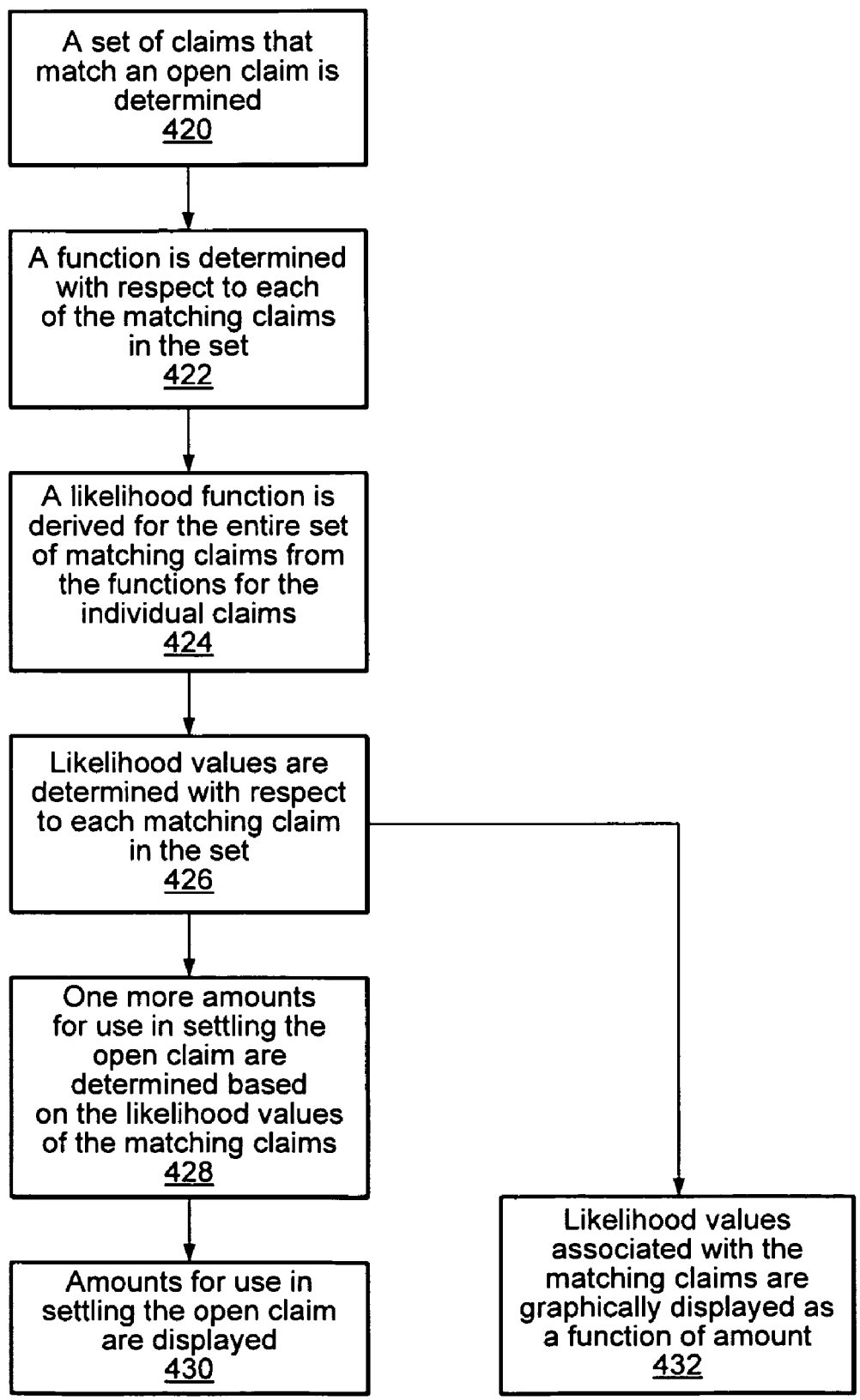
FIG. 7 illustrates determining amounts for settling open claims using a likelihood function according to one embodiment.

FIG. 7 illustrates determining amounts for settling open claims using a likelihood function according to one embodiment. At 420, a set of claims (e.g., closed claims) that match an open claim is determined. At 422, a function is determined with respect to each of the matching claims in the set. In one embodiment, a Gaussian function is derived for each claim in the set of claims. In one embodiment, a Gaussian curve has a mean of 0 and a variance of 1. A suitable bandwidth is determined for the function. One method for determining bandwidth may be that given in the Raykar paper.

At 424, a likelihood function is derived for the entire set of matching claims from the functions for the individual claims. In some embodiments, the likelihood function is the sum of the functions for the individual claims.

In some embodiments, kernel density estimation is accomplished using a fast density derivative estimation. In other embodiments, kernel density estimation is accomplished using a solve-the-equation plug-in method. In one embodiment, a fast density derivative method is used for relatively large sets (e.g., 20 or more points), and a solve-the-equation plug-in method is used for smaller sets.

At 426, likelihood values are determined with respect to each matching claim in the set. At 428, amounts for settling the open claim are determined based on the likelihood values of the matching claims. In some embodiments, an amount for settling is the amount associated with the closed claim with the highest likelihood value. In certain embodiments, a rank or rating may be assigned to each of the matching claims based on the likelihood value. One or more ranges may be determined. Each range may include all claims falling within a specified portion of the likelihood curve. In one embodiment, a range is defined to include all the claims having values within about the top quartile of the likelihood curve. In another embodiment, a range is defined to include all claims within a specified percentage of a most likely value. In one embodiment, a range is defined to include all claims within about 10% of a most likely value.

At 430, amounts for use in settling the open claim are displayed. The amounts may include specific values and/or ranges of values. At 432, likelihood values associated with the matching claims are displayed as a function of amount.

Figures 8, 9:
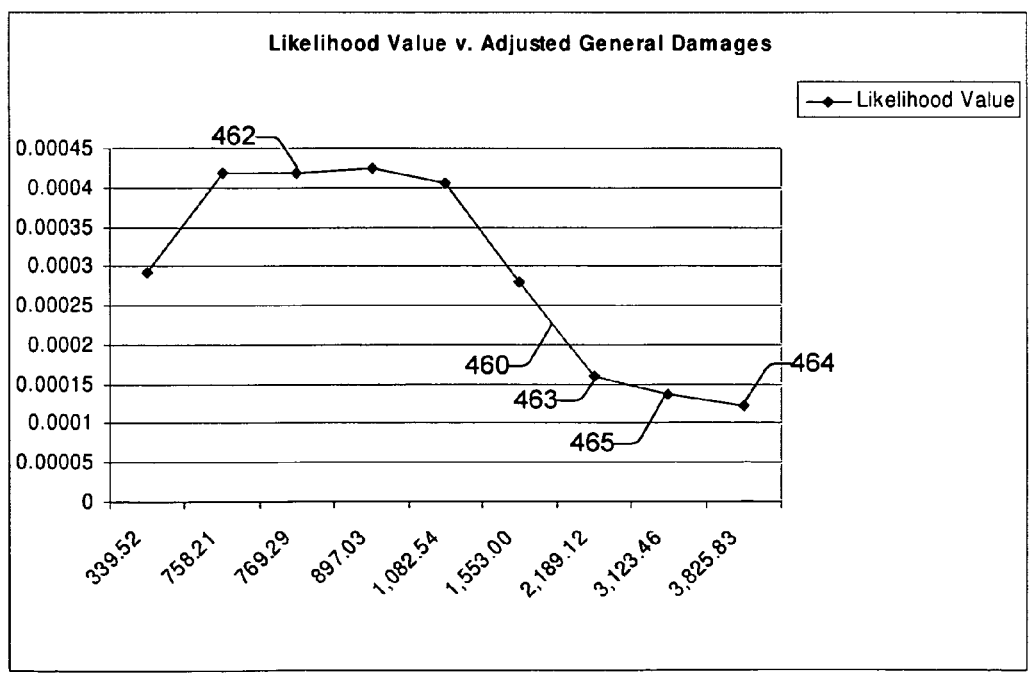
FIG. 8 shows a set of matches for an open claim.
FIG. 9 is a graph of likelihood values for a data set for an open claim.

FIG. 8 illustrates an example of a data set for an open claim. FIG. 9 is a graph of likelihood values for the data set shown in FIG. 8. Table 440 includes data for a set of claims that match a candidate claim. Column 442 indicates the candidate claim for which the matching claims are found. In this case, the candidate claim is identified as claim number CWW10001001. Column 444 indicates closed claims that were found to match claim CWW10001001. A unique claim number identifies each of the matching claims. Column 446 indicates a rating for each closed claim. Column 448 indicates an adjusted dollar value for each of the closed claims. Column 450 indicates a general damages value before adjustment.

Column 452 indicates a likelihood value associated with each claim. The likelihood value may be based on a likelihood function determined as described above with respect to FIG. 7. In the data set shown in FIG. 8, the following is used for the kernel density estimate:

$$\hat{p}(x) = \frac{1}{N\sqrt{2\pi h^2}} \sum_{i=1}^{N} e^{-(x-x_i)^2/2h^2}$$

where N is the number of points, $x_i$ is the value of a point, and h is a bandwidth. Bandwidth may be selected by estimating an asymptotic mean integrated squared error (AMISE)-optimal bandwidth. In one embodiment, the values for both matching claims that were paid at the policy limit and matching claims that were not paid at the policy limit are combined into a single list. Likelihood values may be calculated for all of the values on the combined list.

The rating shown in column 446 may provide an indicator of how useful the value for a claim might be in settling the open claim. The rating may reflect how close a match the candidate claim is to the matched claim in regards to data on the claim. In this example, claim number 0000017267001 has a rating of 1. Point 462 shown in FIG. 9, which is associated with claim number 0000017267001, is near the middle of the upper range of the likelihood curve. As another example, claim number 0000004399001 has a rating of 4. Point 464 shown in FIG. 9, which is associated with claim number 0000004399001, is on the lower fringe of the likelihood curve.

In some embodiments, a rating associated with a claim value may be based on the claim's position within a cluster of points. For example, points 463, 464, and 465 may be considered to form a cluster. The claim associated with point 465 may be given a relatively high rating because point 465 is in the middle of the cluster. In some embodiments, a value (e.g., dollar amount) associated with the highest rated point in a cluster may be used as a representative value. For example, $3,123.46, which is the amount associated with point 465, may be used as a representative value.

Displaying Likelihood Values for Use in Settlement

Figure 10:
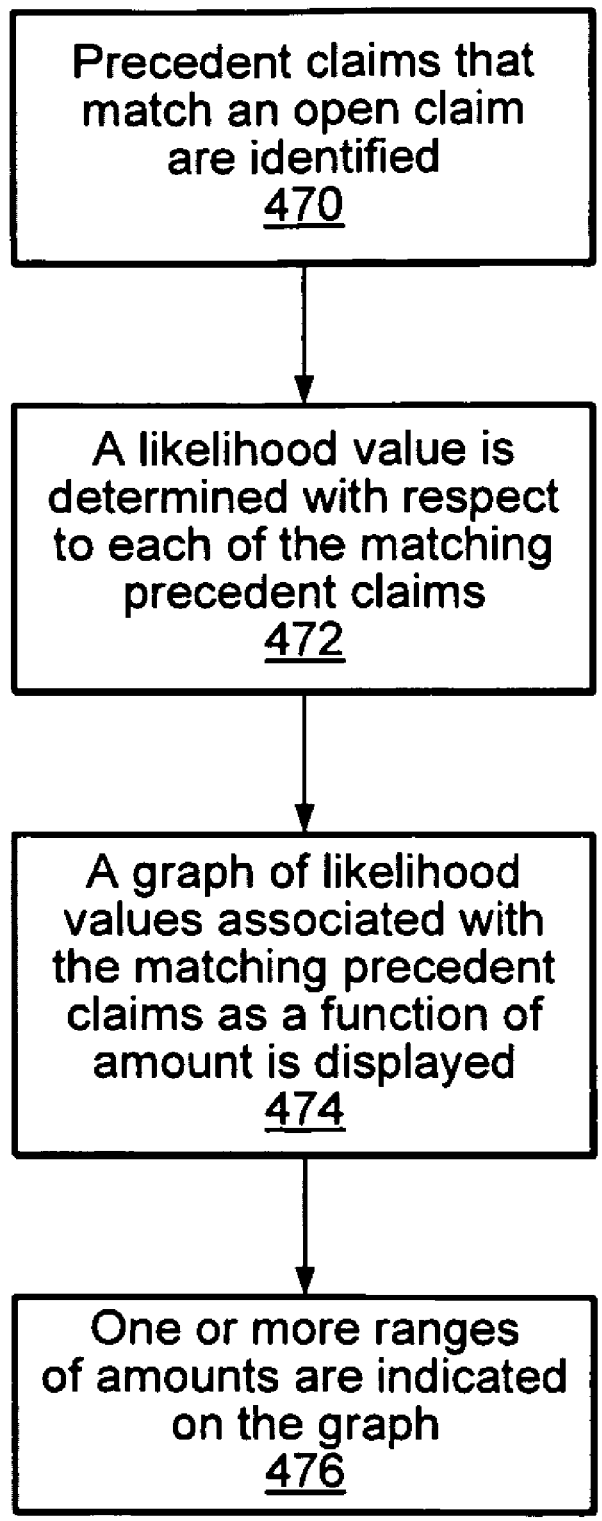
FIG. 10 illustrates displaying likelihood values for a set of precedent claims matching an open claim according to one embodiment.

FIG. 10 illustrates displaying likelihood values for a set of precedent claims matching an open claim according to one embodiment. At 470, precedent claims that match an open claim are identified. At 472, a likelihood value is determined with respect to each of the matching precedent claims. At 474, a graph of likelihood values associated with the matching precedent claims as a function of amount is displayed. At 476, one or more ranges of amounts are indicated on the graph.

Figure 11:
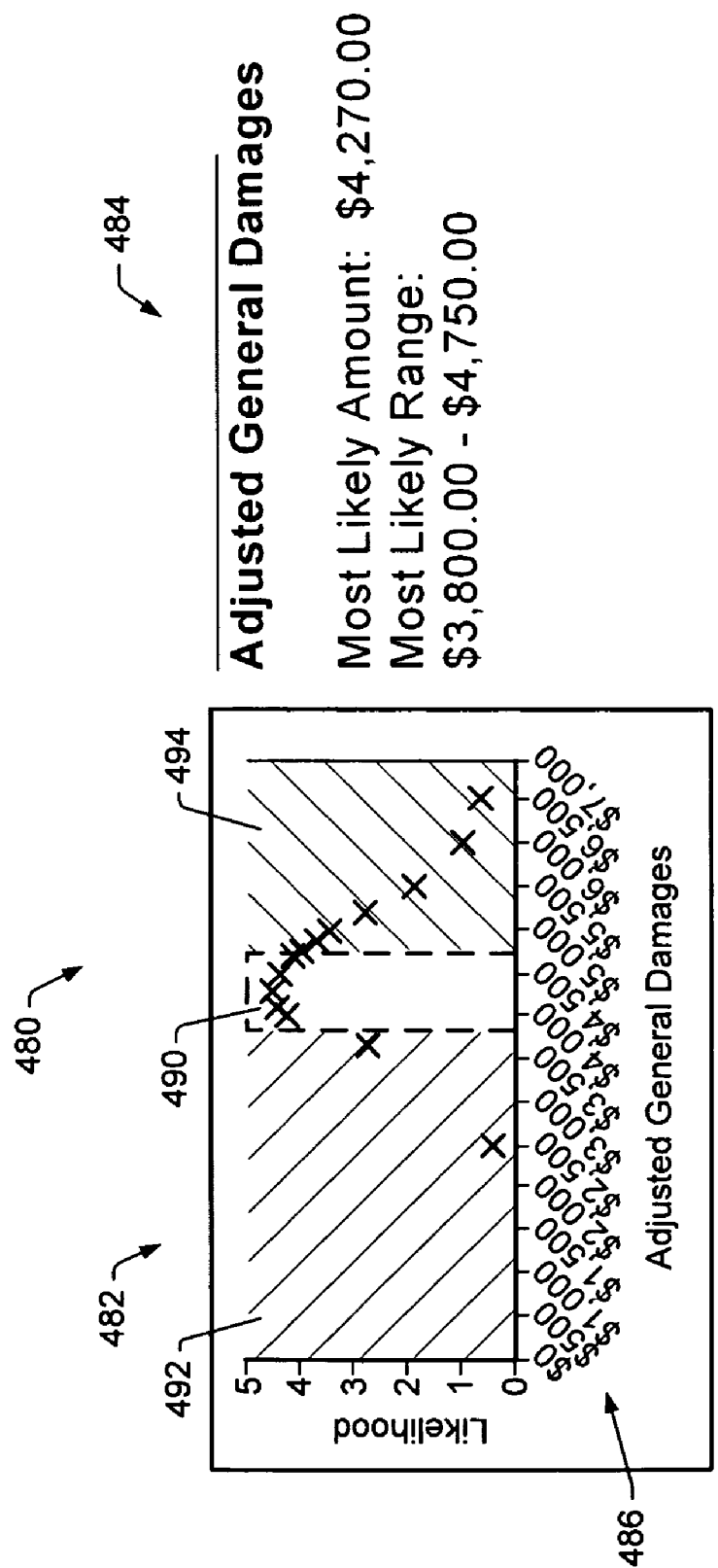
FIG. 11 illustrates a display of likelihood values for a set of claims matching an open claim according to one embodiment.

FIG. 11 illustrates a display of likelihood values for a set of claims matching an open claim according to one embodiment. Display 480 includes graph portion 482 and summary portion 484.

Graph portion 482 of display 480 includes general damages graph 486. General damages graph 486 includes a curve showing likelihood values as a function of general damages. In the embodiment illustrated in FIG. 11, the curves are represented by specific discrete points (X's). The curves may, however, be represented by a continuous curve or any other discrete or continuous symbology. General damages graph 486 and medicals graph 488 may provide a user with a visual representation of values for the matching claims. General damages graph 482 may allow an adjuster to identify a cluster of a values and select a value from the cluster, rather than for example, just picking a value from a textual list.

General damages graph 486 includes mid band 490, lower range 492, and upper range 494. Mid band 490 corresponds to a most likely range for general damages. Mid band 490 and ranges 492 and 494 may serve as visual aids to assist an adjuster in choosing amounts for settling an open claim. In some embodiments, mid band 490 may be shaded, hatched, highlighted, or colored, or the like. Such indicators may provide an additional visual cue to an adjuster for focusing on a most likely amount or range. In certain embodiments, a display may include only those values within a particular band. For example, an x-y graph may display only the portion of a curve associated with a mid-band, and not display any values associated with points in the lower or upper ranges.

Summary portion 484 of display 480 includes numerical values of most likely amount and most likely range for general damages.

Although in the display shown in FIG. 10, graph portion 482 and summary portion 484 relate to general damages, graphs may be directed to other amounts. In certain embodiments, a display may include a graph and summary for medicals instead of, or in addition, the graph and summary for general damages.

In certain embodiments, graphs and summary information are each displayed on a separate screen. Switching between screens may be accomplished by selecting a tab or by toggling between a graph screen and a summary screen. In certain embodiments, a display may include other information associated with a matching claim set. For example, a History Dialog Window may include the following columns:

Date Run, Matched Cases, Lkly GD Amnt, Lkly GD High, Lkly GD Low, Lkly Med Amt, Lkly Med Low, Lkly Med High The 'Lkly High/Low' amounts may correspond to the Most Likely Low and High amounts. These amounts may appear on Summary, Graphs, Compare With and/or Report screens.

In general damages graph 486 shown in FIG. 11, the likelihood (y-axis) includes scale of values 0 through 5. In other embodiments, values may be shown without any specific numerical values. Thus, likelihood values may be depicted graphically, relative to other likelihood values, rather than as an absolute value of likelihood.

Figure 12:
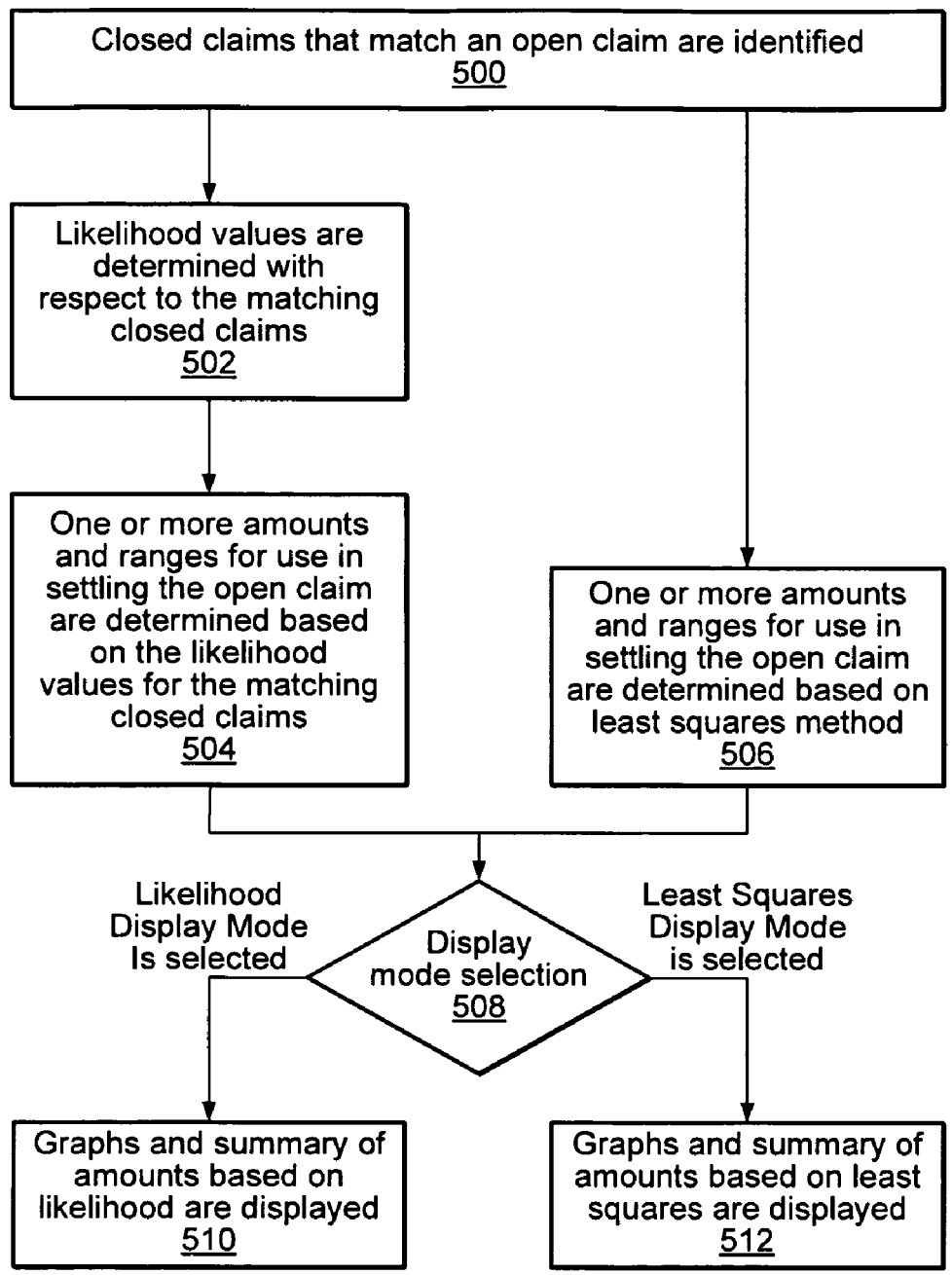
FIG. 12 illustrates displaying summary amounts to a user based on a display mode selected by the user.

In certain embodiments, an adjuster may be provided with amounts for matching precedent claims that are derived using two or more different methods. For example, an adjuster may consider a recommended settlement amount based on both a kernel density estimate for the matching claims and a least squares analysis of the matching claims. FIG. 12 illustrates displaying summary amounts to a user based on a display mode selected by the user. At 500, closed claims are identified that match an open claim. At 502, likelihood values are determined with respect to the matching precedent claims. At 504, amounts and ranges for use in settling the open claim are determined based on the likelihood values for the matching precedent claims. At 506, one or more amounts and ranges are determined for settling the open claim based on least squares method. Amounts and ranges may be determined, for example, as described above with respect to FIG. 5. In one embodiment, a display based on least squares method may include a mid-zone amount and a mid-zone range.

At 508, a user may be prompted to select a display mode. If the user selects the likelihood display mode, summary amounts based on likelihood are displayed at 510. If the user selects the least squares display mode, summary amounts based on least squares are displayed at 512. The selection of a display mode may be by toggle, tab, or other user input. In some embodiments, a default display mode may be established upon installation of a claims-matching program onto a computer system.

In certain embodiments, a user may simultaneously view amounts and graphs based on more than one method. For example, a user may simultaneously view amounts and graphs based on a maximum likelihood method and amounts and graphs based on a least squares method.

In the embodiment shown in FIG. 12, amounts are automatically computed for an open claim based on both likelihood and least squares methods regardless of the mode selected by the user. In other embodiments, a system may compute amounts only when the user selects a particular mode. For example, if the system default is to display likelihood values, the system might not calculate least squares values unless and until the user selects a least squares display mode.

Adjusting General Damages Values Using Equalization Values

In some embodiments, general damages values for precedent claims are adjusted using predetermined equalization values to account for one or more differences between an open claim and matching precedent claims. The equalization values may be derived from a set of closed claim data and stored in a database when a system is first installed or configured for use process open claims. During processing of an open claim, the equalization values are retrieved from the database and used to adjust the general damages values of matching claims. An adjuster may use the adjusted general damages values for the matching precedent claims as basis for settling the open claim.

Figure 13:
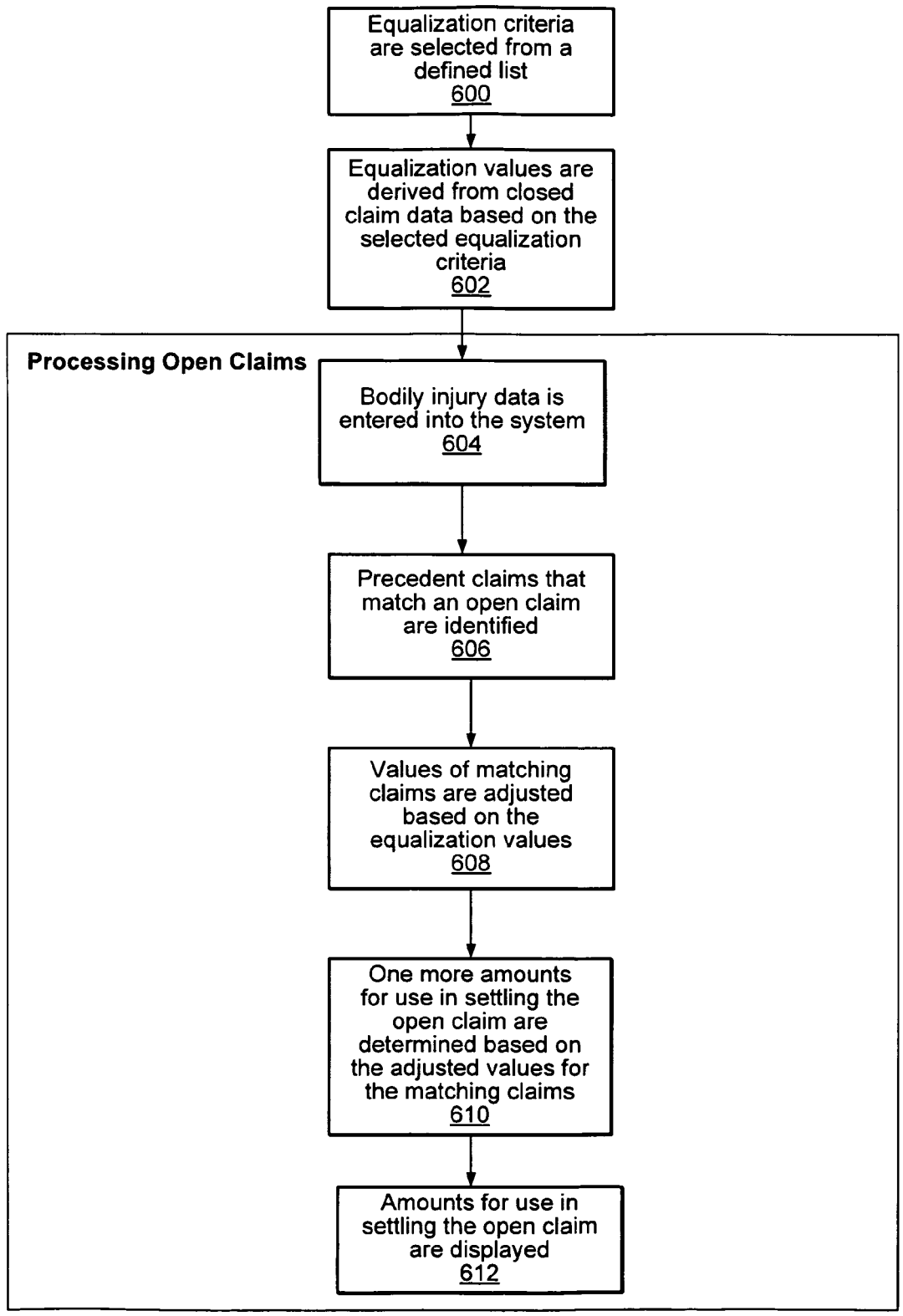
FIG. 13 illustrates determining equalization values based on defined equalization criteria for a system and processing open claims using the determined equalization values.

FIG. 13 illustrates determining equalization values based on defined equalization criteria for a system and processing open claims using the determined equalization values. Equalization criteria may be configured or selected globally for all claims to be settled by an adjuster, group of adjusters, or an FSO. In one embodiment, equalization criteria are selected or configured when a claims-matching program is installed on an FSO computer system. Equalization criteria are then applied to all claims to be settled (or, alternately, to all claims that match predetermined criteria). At 600, equalization criteria are selected from a defined list. The defined list may be presented, for example, to an installer of a claims matching program when the program is installed. Equalization criteria may relate to various characteristics of a claim including locality, injury type, personal characteristics of a claimant, dominant injury, and claimant type. Equalization criteria may be based on a single characteristic or a combination of two or more characteristics. Equalization criteria may be selected using drop-down menus, check boxes, or similar methods.

At 602, equalization values are determined based on the selected equalization criteria. The equalization values may be coefficients derived from a set of closed claim data. In alternate embodiments, the equalization values may be expressed as factors or multipliers. Coefficient values will vary as a function of the characteristics of the claims, such as jurisdiction, claim type, and/or secondary injury. The equalization values may be calculated in a batch process. In one embodiment, the batch process for determining the equalization values is run when a claims-matching program is first installed. The equalization values may be recalculated (e.g., by a subsequent batch process) at various times after the initial installation of a program. For example, the equalization values may be updated on a periodic basis, such as annually or quarterly.

In some embodiments, equalization values are determined based on the particular customer's past claim data. For example, based on one customer's past data, baselined equalization values may produce an adjusted settlement amount for a claim in Louisiana that is 20% less than a similar claim in New York City, while, based on another customer's past data, baselined equalization values may produce an adjusted settlement amount for a claim in Louisiana that is 22% less than a similar claim in New York City.

Beginning at 604, the system is placed into service to determine amounts for use in processing open claims. It will be understood that once the equalization values are determined at 602 (such as at the time the system is installed), any number of open claims may be processed without recalculating the equalization values. At 604, bodily injury data for an open claim is entered into the system. At 606, one or more precedent claims that match the open claim are identified by the system based on one or more characteristics of the open claim. At 608, a value of one or more of the matching precedent claims is adjusted based on the previously determined baselined equalization values. For example, for an open claim involving permanent impairment of a 20-year old male, the system may return an amount for a first matching closed claim settled for a 25-year old male and a second matching closed claim settled for a 30-year old male. Based on the baselined equalization values, the value for the closed claim relating to the 25-year old male may be increased by 4%, and the value for the closed claim relating to the 30-year old male may be increased by 8%. As another example, a value for a closed claim relating to a broken tibia might be adjusted upward for use in settling an open claim relating to a broken femur. At 610, an amount for use in settling the open claim is determined based on the adjusted values for the closed claims. At 612, the amounts for settling the claim are displayed.

In one embodiment, equalization criteria includes jurisdiction, claim type, and secondary injury (or a subset of one or more of these criteria). Other equalization criteria can be used, however. For example, in certain embodiments, equalization criteria include personal characteristics of the claimants. Examples of personal characteristics to be used as equalization criteria include gender, age, or type or nature of the injury to the claimant, or type or nature of the impairment to the claimant.

In one embodiment, equalization criteria include whether a claimant's injury is a combination injury or not. For example, one claim may relate to both a demonstrable and a soft tissue injury, while another claim may relate to only a soft tissue injury. A general damages value relating to the soft tissue-only claim may be adjusted using baselined equalization values to increase or decrease the value relative to a combination injury claim.

In an embodiment, equalization criteria include what a dominant injury of a claim is. For example, if a claim arises from a case where the dominant injury is demonstrable, the general damages value may be adjusted using equalization values to increase or decrease the value relative to a claim arising from a case where the dominant injury is a soft-tissue injury.

In an embodiment, equalization criteria includes settlement characteristics for the claims. Examples of settlement characteristics that may form the basis for equalization include claim type (e.g., whether a lawsuit has been filed), whether a claimant is represented by an attorney, or the identity of an attorney representing the claimant. In an embodiment, equalization criteria may include whether there is a particular type of evidence available with respect to the accident. For example, equalization values may be based on whether data for the accident is available from an electronic data recorder (EDR). In one embodiment, equalization criteria may include whether EDR data for the accident indicates that an injury was a low-impact injury. In certain embodiments, claims for which EDR data suggests fraud (e.g., false whiplash claims) may be adjusted or filtered out of the results.

In an embodiment, equalization criteria includes the locality of the claim. A locality may be a country, state, or a region thereof. In certain embodiments, a locality may be a sub-state locality (a portion of a state), such as a county, city, or zip code. For example, a general damages value for a matching claim in Orange County, California may be adjusted for use in settling an open claim in Los Angeles County, California, or Dade County, Florida based on past data from a California insurer.

Determining Recommended Settlement Amounts by Adjusting Values Derived from Matching Precedent Claims In an embodiment, a recommended settlement amount is determined by combining a value derived from precedent claims with one or more adjustments for the pending claim. As used herein, a "pending claim adjustment" generally refers to an addition or subtraction based on one or more amounts associated with the pending claim. Pending claim adjustments can include any adjustment for the actual claim being settled. Examples of pending claim adjustments include specials, disfigurement, offsets, medical expenses (e.g., incurred expenses or expected expenses), wages (e.g., actual lost wages or expected lost wages), or a combination thereof. Thus, a recommended settlement may be calculated as follows:

Adjusted General Damages Amount precedents+Adjustments pending claim=Adjusted Recommended Settlement Amount In some embodiments, recommended settlement ranges may be determined in a similar manner as the recommended settlement amounts.

Figure 14:
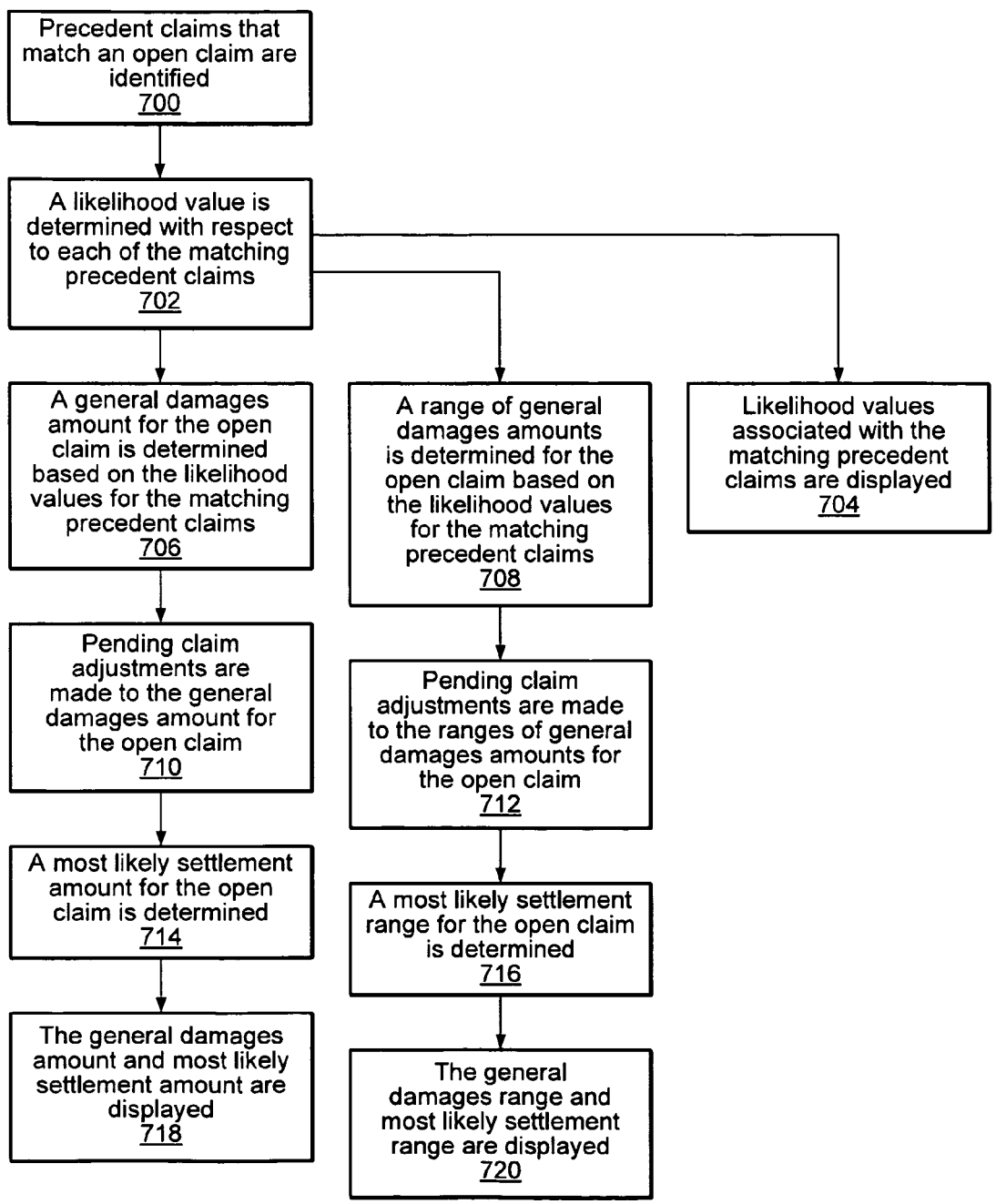
FIG. 14 illustrates determining recommended settlement amounts and ranges with adjustments to adjusted general damages values for matching precedent claims.

FIG. 14 illustrates determining recommended settlement amounts and ranges with adjustments to adjusted general damages values derived from matching precedent claims. At 700, precedent claims that match an open claim are identified. At 702, a likelihood value is determined with respect to each of the matching precedent claims. At 704, likelihood values associated with matching precedent claims are displayed.

At 706, an adjusted general damages amount for the open claim is determined based on the likelihood values for the matching precedent claims. At 708, a range of adjusted general damages amounts is determined for the open claim based on the likelihood values for the matching precedent claims. At 710 and 712, pending claim adjustments are made to an adjusted general damages amount and general damages range for the open claim, respectively. The pending claim adjustments may be made automatically, for example, by an FSO computer system. At 714 and 716, a most likely settlement amount and most likely settlement range for the open claim are determined. At 718 and 720, computed amounts and ranges are displayed to a user.

In the embodiment shown in FIG. 14, the general damages amounts and ranges are determined based on likelihood values for the matching closed claims (see 702, 706, and 708). In other embodiments the general damages amounts and ranges may be determined from other methods, such as from a midzone calculation based on a least squares method.

In one embodiment, an "Adjusted Recommended Payout" amounts are calculated after the matching process has been completed and displayed on the Summary tab of the screen. The recommended payout amounts may be a combination of the adjusted general damages amounts of catalog claims (e.g., similar past claims) brought back in the matching process and the specials, offsets, adjustments, and disfigurement of the pending claim (i.e. the claim currently being entered into the system and adjusted). An example determination is as follows:

Adjusted Settled GD amount of catalog claim
+Disfigurement
+Medicals Incurred+Medicals Expected
−Medical Offset
+Wages Incurred+Wages Expected
−Wages Offset
−Comparative Negligence (multiplied as a percentage of the subtotal amount and then subtracted)
−Contribution Percent Amount (multiplied as a percentage of the subtotal amount and then subtracted) OR Contribution Dollars
−Other Offsets
=Recommended Settlement Amount As used in the preceding equation, "Adjusted Settled GD amount of catalog claim" may exclude specials and disfigurement, but include other offsets. The above formula may be applied to settlement values and ranges. For example, the above formula may be applied to a most likely settlement amount and a most likely settlement range.

Least Squares Display

For a least squares display, the formula described above for Recommended Settlement Amount may be applied to the final high, average, and low amounts that are displayed in the Adjusted Generals column based on a least squares method. After the Recommended Settlement amounts have been calculated for the claims catalog, those amounts may be displayed in the Recommended Settlement column. The amounts can be calculated each time the user navigates to the screen if the specials, offsets, or disfigurement have been updated since the previous re-run. Any amounts that are calculated to be less than zero may be displayed as a '$0' in this column (i.e. negative amounts are not displayed). The following is an example display of values based on a least squares method:

| Adjusted General Damages: | Recommended Settlement: |
|---|---|
| High: $5,500 | High: $7,500 |
| Average: $3,500 | Average: $5,500 |
| Low: $2,000 | Low: $4,000 |

The following is an example display of adjustments for a pending claim:

Specials/Offsets and Disfigurement for the Current Claim

| | |
|---|---|
| Disfigurement: | $5,000 |
| Net Medicals | $2,000 |
| Net Wages | $1,400 |
| Negligence Percent: | 60% |
| Contribution Percent: | 40% |
| Contribution Dollars: | |
| Other Offsets: | $1,000 |
| Total: | |

Likelihood Display

For a likelihood display, the display may contain fields named "Most Likely Settlement Amount" and "Most Likely Settlement Range" and appear in the corresponding locations as the current amount fields located in the Adjusted Generals section. The amounts can be calculated and stored each time the user navigates to the screen if the specials, offsets, or disfigurement have been updated since the previous re-run.

Any amounts that are calculated to be less than zero may be displayed as a '$0' in this column (i.e. we will not display negative amounts). The following is an example display of values based on maximum likelihood:

| Adjusted Generals | |
| --- | --- |
| Most Likely Amount: | $4,290 |
| Most Likely Range: | $4,000-4,700 |
| Recommended Settlement | |
| Most Likely Settlement Amount: | $7,290 |
| Most Likely Settlement Range: | $7,000-7,700 |

Evaluating Effectiveness of Claims Evaluation, Assessment, and Settlement Processes In the discussion above with respect to FIGS. 2, 6, and 7, a system is used for settling outstanding claims (a "production" environment). Each candidate claim is an open claim for which an estimate of value is desired for purposes of settling the claim. In support of this process, the system provides an adjuster with access to data on closed claims that match the open claim. In another embodiment, a claims-matching process is used to evaluate a claim estimation, negotiation and resolution process that has already been used by a company (i.e., a post "production" environment). In this embodiment, each closed claim may be treated as a candidate claim and compared with other closed claims. Mathematical models may be used to determine the effectiveness of the process that has been used. For example, the system may be used to quantify how consistent a claim estimation and settlement process was. Such determinations may be used to guide process improvements and/or provide benefit studies on proposed or anticipated process changes.

Figure 15:
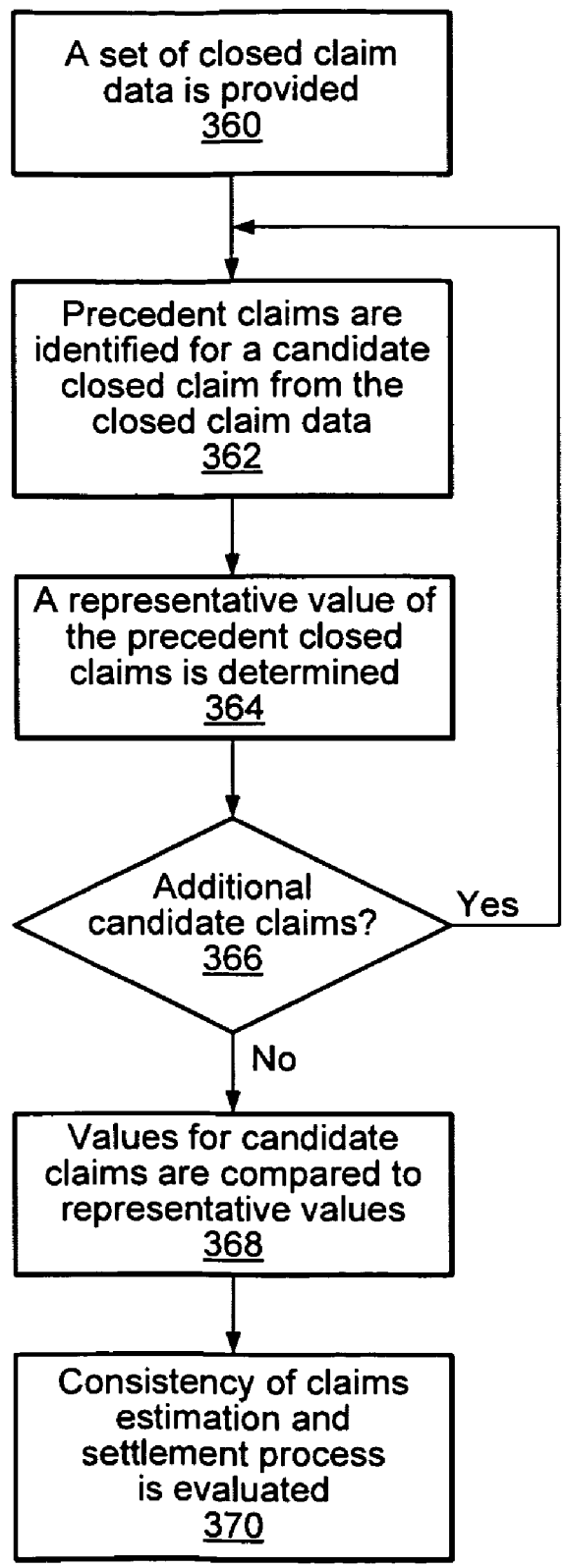
FIG. 15 illustrates determining an effectiveness of a process using a closed claim-to-closed claim comparison according to one embodiment.

In an embodiment, an evaluation of a claims settlement process is performed using cross comparisons of an insurer's closed claim data for bodily injury claims. The data may reflect hundreds or thousands of closed claims. FIG. 15 illustrates determining an effectiveness of a process using a closed claim-to-closed claim comparison according to one embodiment. At 360, a set of closed claim data is provided. In certain embodiments, an insurer's closed claim data may be initially scrubbed to remove data that might skew the results, such as claims that have invalid or missing information. The closed claim data may be for a defined period (e.g., the preceding 3 years). The closed claim data may be limited by other attributes, such as jurisdiction, claim type, or dominant injury.

At 362, precedent claims are identified for a closed claim in a defined set of claims. Each closed claim in the data set is considered a candidate claim when it is used as the claim at issue. The claim data for each candidate claim is used when searching for precedents (e.g., matches) of that candidate claim. In some embodiments, a claims matching process is performed as described above with respect to FIG. 2, except that each candidate claim is a closed claim instead of an open claim.

In certain embodiments, the system automatically excludes precedent claims from the set of matches if they exceed a defined amount of variation from some attribute of the set of precedent claims. For example, the system may automatically exclude precedent claims from the set of matches if they are greater than two standard deviations above or below the mean of the set of matches. Approximately 95 percent of all matching claims are within two standard deviations of the mean of all such matches to the candidate claim.

At 364, a representative value is determined for the precedent claims associated with the candidate claim. The representative value may be based on a statistical value such as mean, median, or mid-zone value of the precedent claims.

At 366, if there are additional candidate claims, the system repeats the sequence of precedent claim identification (362) and determination of a representative value (364) for each of the candidate claims.

At 368, one or more representative values of the precedent closed claims are compared with one or more values of the candidate closed claims. For example, the comparison may include computing a difference between the representative value (e.g., mean, median, or mid-zone value) of the precedent claims and the value of the candidate closed claims.

At 370, consistency of the claims estimation and settlement process is evaluated. The evaluation may be based on a comparison of the values of the candidate closed claims with representative values of the similar claims. For example, a small aggregate deviation between the values of the candidate claims and the representative values of the associated sets of precedent claims may indicate that the process used to arrive at the values of the candidate claims produces consistent results. Conversely, a large aggregate deviation between the values of the candidate claims and the representative values of the associated sets of precedent claims may indicate that the process used to arrive at the values of the candidate claims produces inconsistent results.

Various methods and approaches may be used to determine representative value of similar claims. The mathematical models used may rely, in some cases, on assumptions about how adjusters are influenced by a resulting list of matches. For example, human tendency may result in adjusters actually looking at clusters, mid-points, and averages similar to the models described herein. In addition, adjuster decisions may be shaped based on a particular company's policies and procedures. In one embodiment, determining a representative value may include kernel density estimation. In another embodiment, determining a representative value may include maximum likelihood estimation.

Figure 16:
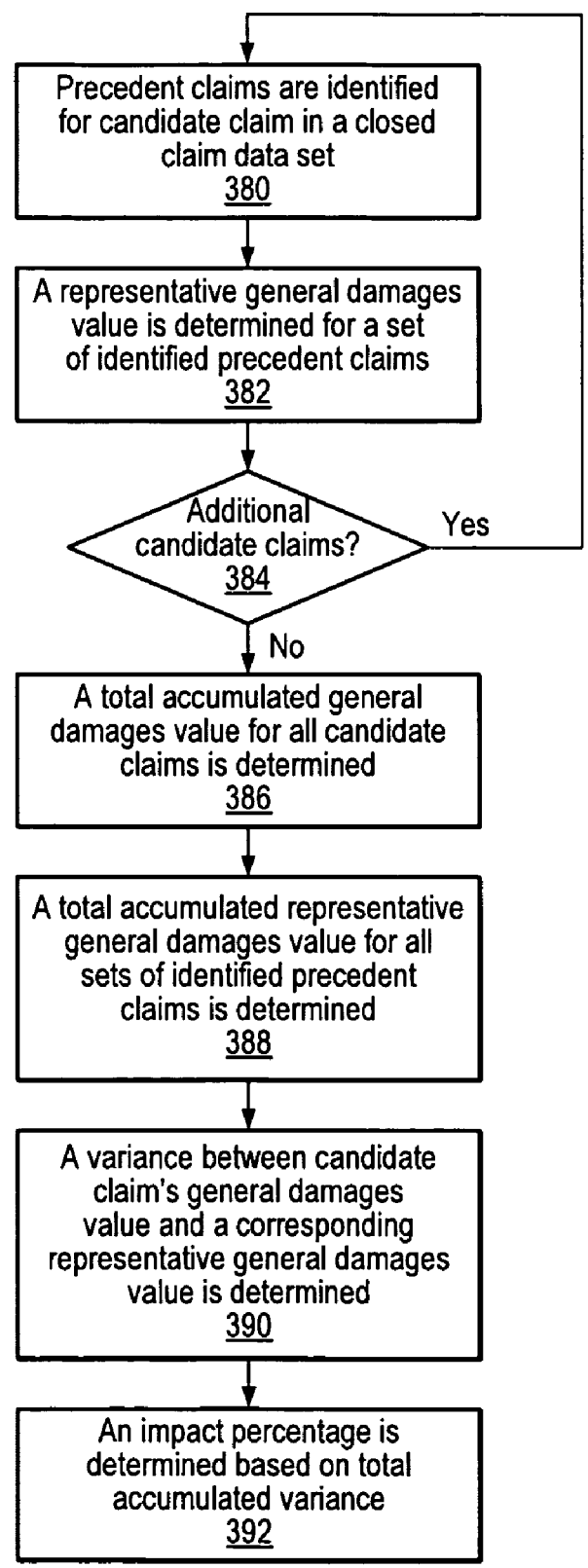
FIG. 16 illustrates evaluation of a claim estimation and settlement process in which evaluation includes determining differences between values for candidate closed claims and representative values for similar closed claims, according to one embodiment.

FIG. 16 illustrates evaluation of a claim estimation and settlement process that includes determining differences between the general damages values for candidate closed claims and general damages values for similar closed claims according to one embodiment. At 380, for each candidate claim in a closed claim data set, claims in the data set that are similar to a candidate claim are identified based on characteristics of the candidate claim. Although the entire data set might include thousands of claims, the mathematical modeling is performed on each claim separately, treating each claim as the candidate claim. Each candidate claim will have a subset of precedent matches from the other claims. Therefore, the relevant data set size is represented by the number of precedent claims matched to the candidate claim. Each data set could be one precedent claim or many precedent claims.

At 382, a representative general damages value is determined for the set of precedent claims associated with each of the candidate claims. The representative general damages value may be based on a statistical value for the entire set, or for a subset, of the similar claims. In some embodiments, the mathematical analysis is successively performed using models and methods of increased complexity and sophistication. Initially, simple measures, such as median and mean, which do not require assumptions about the underlying set of matched general damages, may be used. The median is the number that splits the ordered set of precedent claims essentially in half. By using the median, effects of outliers are minimized without having to exclude any claims from the calculation. The mean is the average of all precedent matches. The median and mean are calculated using the set of precedent matches for each closed candidate claim. Once the median and mean are calculated, they are compared to the actual total general damages for the candidate closed claim.

At 384, if there are additional candidate claims, the system repeats the step of precedent claim identification (380) and calculation of a representative value (382) for each of the candidate claims.

At 386, a total accumulated general damages value for the candidate claims is determined. The total accumulated general damages value may be the sum of the general damages values for all the candidate claims.

At 388, a total accumulated representative general damages value for the sets of similar claims associated with the candidate claims is determined. The total representative general damages value may be the sum of the representative general damages value determined for the sets of precedent claims.

At 390, for the complete data set of matches, the total accumulated difference (variance) between each candidate claim's general damages value and its corresponding representative general damages value (e.g., mean, median, or mid-zone) is determined for all candidate closed claims. The total accumulated difference may be the difference between the sum of all the general damages values of the candidate claims and the sum of the representative general damages value for the associated sets of precedent claims. In an alternate embodiment, a difference is first computed between the value for each candidate claim and the representative value for the precedent claims, and then the accumulated difference is determined by taking the sum of these differences.

At 392, an impact percentage is calculated based on the total accumulated difference. The impact percentage may be determined by dividing the total accumulated difference by the total accumulated general damages for the candidate claims. The impact percentage may be expressed in the following formula:

$$\frac{\text{the difference between the total general damages value for the candidate claims and total representative general damages values for the sets of similar claims}}{\text{total general damages value for two or more of the canidate claims}} * 100\%$$

In some cases, the impact percentage may be used as a measure of consistency of the estimation and settlement process (with relatively larger impact percentage reflecting greater inconsistency in the estimation and settlement process). For example, an impact percentage less than 2% may indicate that the process for establishing a value of the candidate claims was relatively consistent in producing values, while an impact percentage of greater than 10% may indicate that the process was relatively inconsistent in producing values. Impact percentages may be used in benefit studies to project the impact of making a process change or improvement. For example, the impact percentages may be used to project a potential improvement to an insurer from implementing a new system and/or methodologies for evaluating and settling open claims.

FIG. 17 illustrates a simple example of results for a closed claim mathematical analysis. For the sake of simplicity for illustrative purposes, only two candidate claims are included in the set. A closed claim evaluation might, however, include any number of candidate claims, and might include hundreds or thousands of candidate claims.

In the example shown in FIG. 17, information is provided for each of the candidate claims, including identification (ID), claim type, jurisdiction, dominant injury (e.g., soft tissue or demonstrable), and value. The value for each candidate claim may be a general damages value for the claim as determined by a claim adjuster during the evaluation and settlement of the claim. A set of matching closed claims is listed for each of the candidate closed claims. Each of the matching claims includes a corresponding value. For each candidate claim, the matching claims may be grouped into zones (e.g., low, mid, high). A mean, a median, and a mid-zone average are computed for each set of similar claims. In the example shown in FIG. 17, the mid-zone average is an unweighted average of the mid-zone claims (i.e., claims O, P, Q, and R for candidate claim 1 and claims W, X, and Y for candidate 2). In other embodiments, a mid-zone average may be a weighted average. For example, each of claims O, P, Q, and R may each be given a different weight depending on their degree of similarity to candidate claim 1.

The total of each value category is accumulated to yield the total associated with all candidate claims. For each representative value, the difference between the total representative value and the total value is calculated. Based on the difference for each representative value, the impact percentage is determined.

In some embodiments, an impact is determined for a subset of an insurer's closed claim data that meets certain criteria. For example, an impact may be determined for only the claims having a certain claim type, jurisdiction, or dominant injury. In one embodiment, claim types include: unrepresented, unlitigated, and suit. "Unrepresented" are those claims without attorney representation. "Unlitigated" are those claims with attorney representation, but no suit has been filed. "Suit" are those claims in which some type of suit has been filed, but not necessarily a jury verdict outcome.

As is reflected in FIG. 17 above, a matching process may produce a different number of matches for each candidate claim. For example, candidate ID 1 has 8 matches, while candidate ID 2 has 5 matches. The frequency of the number of matching claims may be plotted for the candidate claims. The results may be presented to the user is graphical or textual format.

Figure 18:
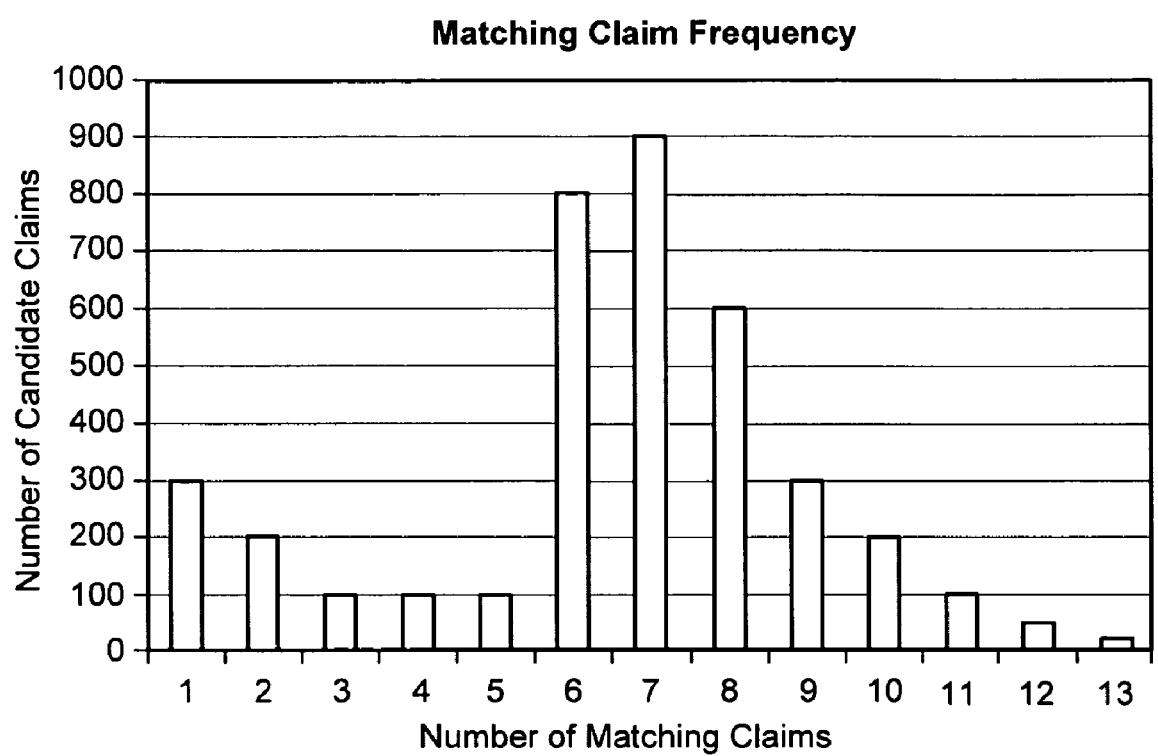
FIG. 18 illustrates a column chart reporting the matching frequency for a claim set according to one embodiment.

FIG. 18 illustrates a column chart for reporting the matching frequency for a claim set according to one embodiment. In this column chart, the x-axis represents the number of matching claims for a candidate and the y-axis represents the number of candidate claims having a given number of matching claims. Thus, the legend at the base of each column represents a number of matching claims for a candidate. The height of the column indicates the total number of candidate claims in the claim set with that number of matches. For example, there were 800 candidate claims in the set for which 6 matching claims were identified. In some embodiments, other statistical information, such as mean and standard deviation may be reported, presented and/or used in evaluating an effectiveness of a claims assessment process.

Identifying Similar Claims

Every injury has its own treatment modality. Finding similar claims may therefore take this into consideration. For example, soft tissue spinal injuries are treated therapeutically. While their treatment details can vary they are all prima facie the same injury, distinguished by their treatment, whereas demonstrable injuries are at face value not similar injuries. For example, a fractured femur and a contusion to the lower leg are completely dissimilar.

Whether a claim will use the soft tissue spine matching or the demonstrable matching component may be an important consideration.

In various embodiments, similar claims may be found using the following steps:

1. Identify whether the major injury is predominantly a soft tissue spinal injury type or a demonstrable injury If soft tissue spinal injury:
1. Search the settled claim database for claims that have at least one of the soft tissue spine injuries the current claim contains
2. Filter the claims whose medical attributes are not within certain pre-defined tolerances of the attributes of the current claim
3. From the matches display a subset of claims which have attributes closest to the current claim If demonstrable injury:
1. Retrieve the pain and suffering severities for all the injuries, treatments and complications which are contained in the current claim
2. Identify all the major body parts injured for the current claim
3. Identify the most injured major body part
4. Find the dominant medical feature (injury, treatment or complication, or combination of them)
5. Search the settled claims database for all of the claims having the same dominant medical feature
6. From the matches display a subset of claims which have the closest attributes to the current claim Deciding Whether a Claim is Demonstrable or Not A claim may be defined to be predominantly demonstrable if it falls into any of the following categories:

1. It has no soft tissue spinal injuries
2. It contains an invasive medical procedure (diagnostic or surgical)
3. It is one of the following injuries
   a. Amputation
   b. Closed Fracture
   c. Open fracture
   d. Dislocation
   e. Fracture dislocation
   f. Crush injury
   g. Internal throat injuries
   h. Intervertebral disc herniations or ruptures
   i Intra-abdominal injuries
   j. Intra-pelvic injuries
   k. Intra-thoracic injuries
   l. Ligament injuries (but not a shoulder ligament injury)
4. It has any of the following, but no soft tissue spine injuries
   a. Lacerations
   b. Concussion
   c. Contusions
   d. Superficial injuries
   e. Sprain strain injuries Shoulder ligament injuries, lacerations, concussion, contusions, superficial injuries and sprain strain injuries may not be indicators, by themselves, of whether a case is demonstrable or not. For instance, there are many whiplash claims that also include shoulder ligament injuries. In these cases the shoulder injuries are not treated, other than as part of the whiplash injury by therapeutic treatment. If the shoulder ligament injury were treated surgically then the case would be considered demonstrable, as per rule 3 above).

Deciding Whether a Claim has Only Trivial Injuries

Trivial injuries are defined as the injuries for which no matching priority rules exist. Injuries such as contusions, untreated lacerations, and superficial injuries are trivial injuries.

If a claim contains only trivial injuries then the system may find matches for the most significant of the trivial injuries, as defined by the injury hierarchy, set out under "Injury Hierarchy" in the Section explaining rule priority considerations.

If a claim contains both only trivial injuries and a soft tissue spine injury then the system may use the presence of the trivial injuries as matching criteria if the injury filter is set to "tight". This is explained in the injury section within "Filters" described below.

Matching for Soft Tissue Spine

In an embodiment, the two broad classes of claim information that will be used in the matching are treatment duration and treatment level, there being a correlation between treatment duration and treatment level. Treatment time defines injury stabilization time or the time taken for an injury to reach maximum improvement. Treatment level can involve multiple types of therapeutic treatment. For instance, this can be any combination of chiropractic, physical therapy, other therapy, GP consultation and specialist doctor consultation. Other treatment can involve various forms of spinal immobilization and prescribed medication.

Matching may involve setting some bounds around the values that are inherent in the current claim, in order to find claims that have similar, but not necessarily exactly the same values. In one embodiment, the criteria used for matching similar claims is as described in the tables below.

Treatment Time

| Actual Treatment Days | Percentage Variation Below | Percentage Variation Above |
|---|---|---|
| 0 | 100% | 100% |
| 30 | 25% | 33% |
| 1080 | 33% | 50% |

The table above may be based on a piecewise linear function approach. For example, a claim where the treatment time was 30 days will be addressed in the following manner. The 30 days treatment time is located in the first column, it is the second entry. The bounds then become from 30 days minus 25%, this being approximately 23 days, to 30 days plus 33%, this being approximately 37 days. Thus initially claims are looked for that had treatment times of 23 to 37 days, in this case. For treatment times which do not fall exactly on a value in the first column, which will be the case the vast majority of the time, a piecewise linear extrapolation may be used to determine the appropriate intermediate value. A worked example is contained for "Treatment Level" below. Exactly the same formula would be used.

Treatment Level

| GP Treatment Consultations | | |
|---|---|---|
| Actual GP Visits | GP Visits From | GP Visits To |
| 0 | 0 | 1 |
| 1 | 1 | 2 |
| 2 | 1 | 3 |
| 5 | 4 | 7 |
| 10 | 7 | 14 |
| 20 | 15 | 30 |
| 50 | 31 | 70 |

In the table above the second and third columns define the low and high bound of GP visits that will be searched for. For example, if the current claim had 5 actual GP visits search would be searched for claims that had between 4 and 7 GP visits (these being the values from the second and third columns for the fourth row, which has the 5 GP visits in the first column).

Intermediate values for GP visits, such as 4 visits, result in piecewise linear extrapolation of the second and third columns to derive the low and high bound.

Piecewise linear extrapolation may be defined as:

$$y = \frac{(x-x_1)(y_2-y_1)}{(x_2-x_1)} + y_1$$

where y is the extrapolated value; x is the number of GP visits; $x_1$ is the value from the first column which is less than x; $x_2$ is the value from the first column which is greater than x; $y_1$ is the value from either the second or third columns (depending on whether we are predicting the lower or upper bound) which corresponds to the $x_1$ value from the first column; and similarly $y_2$ corresponds with $x_2$.

Using 4 GP visits as the actual value results in bounds of 3 to 5.66667, which are rounded to 3 to 6.

Specialist Treatment Consultations

| Actual Specialist Visits | Specialist Visits From | Specialist Visits To |
| --- | --- | --- |
| 0 | 0 | 0 |
| 1 | 0 | 2 |
| 2 | 1 | 3 |
| 5 | 4 | 7 |
| 10 | 7 | 14 |
| 20 | 15 | 30 |
| 50 | 31 | 70 |

The tables for GP and specialist are almost identical, except that if the actual specialist visits is zero then only claims with zero specialist visits will be matched. This is different from the treatment of GP visits, where if the actual visits are zero claims with zero or 1 GP visits will be matched.

Both the GP and specialist tables differ from the therapeutic treatment tables below, in that for the higher values in column 1 the corresponding bands (columns 2 and 3) are broader upwards more than downwards. For example, for 20 GP visits the band is between 15 and 30 visits, whereas for therapeutic treatment it is 15 to 25. Even for therapeutic treatment of 70 visits the band is equally distributed, being from 55 to 85—a difference of 15 either side. For the GP and specialist it is regarded that there comes a point where additional treatment no longer impresses as to the severity of the injury, and it suggestive of over-servicing. For this reason the band is larger on the high side.

In some embodiments, the above table entries can be altered to reflect a particular company's experience or as new trends emerge.

Chiropractic Treatment Visits

| Actual Chiropractic Visits | Chiropractic Visits From | Chiropractic Visits To |
| --- | --- | --- |
| 0 | 0 | 2 |
| 2 | 1 | 4 |
| 5 | 3 | 8 |
| 10 | 7 | 14 |
| 20 | 15 | 25 |
| 40 | 30 | 50 |
| 70 | 55 | 85 |
| 100 | 80 | 120 |

In a similar manner to the previous table, this table defines the low and high bounds for chiropractic treatment used in matching. Physical therapy and other therapy are processed in the same manner using the respective tables below. However, each therapeutic treatment type is used distinctly in the matching process, and matched claims must satisfy all the derived bounds. For example, if the current claim had 10 chiropractic visits and 10 physical therapy visits then matched claims must have between 7 and 14 chiropractic visits and also between 7 and 14 physical therapy visits.

Physical Therapy Treatment Visits

| Actual Physical Therapy Visits | Physical Therapy Visits From | Physical Therapy Visits To |
| --- | --- | --- |
| 0 | 0 | 2 |
| 2 | 1 | 4 |
| 5 | 3 | 8 |
| 10 | 7 | 14 |
| 20 | 15 | 25 |
| 40 | 30 | 50 |
| 70 | 55 | 85 |
| 100 | 80 | 120 |

Other Therapy Treatment Visits

| Actual Other Therapy Visits | Other Therapy Visits From | Other Therapy Visits To |
| --- | --- | --- |
| 0 | 0 | 2 |
| 2 | 1 | 4 |
| 5 | 3 | 8 |
| 10 | 7 | 14 |
| 20 | 15 | 25 |
| 40 | 30 | 50 |
| 70 | 55 | 85 |
| 100 | 80 | 120 |

Other therapy includes treatment given by practitioners of osteopathy, naturopathy, homeopathy or other "alternative medical practices" such as acupuncture, herbal medicine, faith healing, massage or any other non-orthodox therapeutic practices.

The tables have different values associated even with the same actual observed value. In other words, if our claim has no GP visits the bounds become up to 1 GP visit. The difference between none and one GP visit may not be significant. However, the difference between a claim for which a specialist opinion was sought and one where it was not required has more significance as an indicator of severity, simply because of the fact that a specialist opinion was required. Most soft tissue injuries would not involve a specialist referral.

In a similar manner to the demonstrable injury matching process described below, a number of filters are also used to refine the match results. The use of these filters is described in the Section "Filters" below.

Matching Similarity for Demonstrable Injuries

In some embodiments, matching similar cases may include, in the first instance, matching similar injuries. Injuries as defined by the program include traumatic amputations, fracture dislocations, dislocations, fractures, intra-abdominal injuries, intra-thoracic injuries, intra-pelvic injuries, vertebral disc injuries, ligament injuries, lacerations, sprains and strains and trivial injuries such as contusions and superficial injuries.

Demonstrable injuries rarely occur in isolation or to only one body part, and often involve multiple trauma to multiple body parts. Matching similar cases in these instances may include determining what the dominant injury (or injuries) is, or in other words, what major body part was most severely injured. Determining what major body part is injured is not based only on the type of injury suffered. The overall severity of the trauma is not just the injury suffered but can also be influenced by the treatment and often the complications that might arise from the injury.

As an example, consider a case involving a fractured skull, requiring craniotomy for an intracranial hematoma. A fractured skull is not an insignificant injury; but an intracranial hematoma is both life threatening and potentially can lead to residual brain damage; which required an invasive operative procedure to drain the hematoma (craniotomy). A fractured skull would not generally require any operative treatment. In this case the craniotomy alters the nature of the case, making it a more severe head injury. The complication of the intracranial hematoma transcends both the initial injury and the operative treatment, and becomes the dominant medical feature of this claim. Determining the most severely injured body part therefore takes into account all three of these considerations—injuries, treatments and complications, or a combination of these.

The dominant medical feature of a case can be specified by the adjuster using the system's user interface, or failing this, can be determined by the system.

Establishing the Most Injured Body Part

In some embodiments, if the user has not specified the dominant medical feature of a case then the system can perform this function. In order to do this the system:

- Retrieves all the medical facts about the case, the injuries, treatments, complications and impairments
- Accesses its own database tables to retrieve medical attributes corresponding to these case medical facts
- Using its own algorithms it derives the overall severity of each major body part. The major body parts include the head, chest, abdomen, pelvic area, the spine, arms and legs.
- Determining the dominant medical feature of the most injured body part Retrieving Medical Codes Each case can have any number of medical attributes associated with it. These can be a number of injuries, treatments and complications, in any combination. For each of these instances there is a corresponding character code (there is a seventh character denoting sidedness), which is constrained to be from a list of treatment, or complication codes predefined with each injury code tracked by the system.

In certain embodiments, predefined treatment and complication codes may be derived from a series of mappings within the system. Injury may be mapped to treatment, injury may be mapped to complication, and complication may be mapped to treatment. For each injury code, the system may have a list of treatments the injury may require, these are sorted as "expected" and "possible" treatments. For example if the injury were an open fracture of the tibia, the treatment list might contain:

Amputation or re-amputation
Osteotomy
Limb shortening or lengthening procedures
Arthroplasty
Arthrodesis
Open reduction of fracture
External fixation
Traction
Closed reduction of fracture
Immobilization
Removal of internal fixation device
Physical therapy
Debridement of open fracture site
Walking aids
Diagnostic studies
Prescribed medication.

In addition, the list can include treatments for potential complications which will vary depending on the type of complication that occurred. This might include such procedures as fasciotomy, osteoarthrotomy, nerve or vascular repair. Medical procedures are considered only as past and future procedures, there is no notion of initial treatment or subsequent treatment, and these are considered simply as past treatment. Similarly, for each injury code, the system can have a list of potential complications that might arise from the injury. In the case of our fractured tibia this would include:

Associated vascular
Associated nerve injury
Avascular necrosis
Osteomyelitis
Osteoarthritis
Compartment syndrome
Deep vein thrombosis
Nonunion
Malunion
Delayed union.

Complication and treatment mapping may be derived from medical references including:

1. Apley's System of Orthopaedics and Fractures—$6^{th}$ Edition
2. Attorney's Textbook of Medicine: Manual of Traumatic Injuries—Volumes 1-3
3. Attorney's Textbook of Medicine—$3^{rd}$ Edition—Volumes 1-18
4. Vertebral Musculoskeletal Disorders—Corrigan & Maitland
5. Essentials of Surgery—Scientific Principles and Practice—Lippincott—Raven publication
6. Current Surgical Diagnosis & Treatment—$10^{th}$ Edition—Appleton & Lange publication
7. Rehabilitation Medicine—Delisa Gans—$3^{rd}$ Edition—Lippincott—Raven publication
8. The Disability Advisor—$3^{rd}$ Edition—Pressley Reed Medical Severity Attributes of Medical Codes After the medical codes are entered against a case, a table may be accessed which defines a number of attributes for each medical code. In some embodiments, the pain and suffering severity scale is used to derive overall medical severity for each injured body part, given the medical facts regarding the case being considered.

A pain and suffering severity scale can represent relative severity between injuries, treatments and complications respectively. The severity applied may be in isolation to the particular injury, treatment or complication it is applied to. For example the severity applied to an open fracture of the femur can be for the relative trauma of the fracture alone, and not include the treatment or any other considerations. Conversely the relative severity applied to an open reduction of the femur might not take into account the trauma for the fracture. Also, the scale may not include severity for implied impairment. For example procedures such as amputation and arthrodesis leave permanent impairments but these may be ignored in the assigned value.

The pain and suffering severity scale may be refined through a calibration process described below.

Calculating Major Body Part Relative Pain and Suffering Severity

In an embodiment, agglomeration algorithms are used to derive a combined value for a body part when more than one medical code is present. For example, if a case consisted of a fractured humerus and a fractured scaphoid, both being to the same arm, then the agglomeration algorithm can derive an overall value for the arm in question, comprising both injuries. The system can do this for every body part described above.

The determination of the combined value may not be a simple summation of the medical codes. Doing so would result in unconstrained total values. For example, even if a case involves a fracture of the middle finger, which on average settles for $5,000, this does not mean that a case involving three fractured fingers should settle for $15,000. For example, the proximity of the fingers may obviate the combined value being three times the value of one, thus the value for the three-finger injury should be less than three times that of the one-finger injury.

As injuries become less proximal to each other then combined value may increase, towards the sum of the value of the individual injuries.

Deriving the Dominant Medical Feature

In some embodiments, a set of rules may be utilized, one set for each major body part. Each rule detects a particular medical feature. For example, one rule, within the leg detects a femur fracture with osteomyelitis, another with avascular necrosis, yet another for nonunion of the femur.

If only one body part was injured then its related rules may be run to determine the primary medical features and which cases to search for. Example rules are described below for each body part. If more than one body part was injured then the rules may be run for the most injured body part only. The "most injured" body part may be the body part with the highest combined value on the pain and suffering severity scale (described above). All the medical codes present in the case may be visible to all the rules, thus rules can reference medical codes belonging to this body part as well as ones that are systemic (affecting the whole body).

On the other hand, if the user has nominated one or more dominant medical features then the rules may be run which correspond to body parts representing the dominant medical features. For example, if the user had nominated a fractured tibia and a fractured humerus as dominant, then the rules may be run for the leg and those for the arm respectively. In running these rules the system may be restricted to seeing only the dominant medical features nominated by the user—other medical codes which may be present on the case but not made dominant will not be considered by the rules.

Cases can have a number of medical features, even for the same body part. This can result in more than one rule potentially being considered. For example, in a case where there is a fractured humerus with delayed union and an uncompli-cated fractured thumb, then two different rules could be executed—one for the humeral fracture and its complication and another for the thumb. In these cases rule priority determines which will have precedence when it come to searching for matching cases. In this example it will be the fractured humerus with delayed union that will have precedence owing to the higher priority assigned to its rule. In one embodiment, the rule priorities are as defined in the section "Rule Prioritization Considerations" below.

Rule Prioritization Considerations

In prioritizing the rules a number of medical considerations may be taken into account. These include:

The hierarchy of injury
The hierarchy of complications
The hierarchy of treatments
Exceptions for some injuries
Exceptions involving multiple medical features Injury hierarchy may be derived from medical texts and literature and a Judicial Publication. Reference sources may include:

1. The Judicial Studies Board "Guidelines for the Assessment of General Damages in Personal Injury Cases—$4^{th}$ Edition—published by Blackstone Press
2. Fractures and Dislocations—Apley's System of Orthopaedics and Fractures—$6^{th}$ Edition
3. Attorney's Textbook of Medicine: Manual of Traumatic Injuries—Volumes 1-3—a Matthew Bender publication
4. Attorneys Textbook of Medicine—$3^{rd}$ Edition—Volumes 1-18—Matthew Bender publication
5. Vertebral Musculoskeletal Disorders—Corrigan & Maitland
6. Essentials of Surgery—Scientific Principles and Practice—Lippincott—Raven publication
7. Current Surgical Diagnosis & Treatment—$10^{th}$ Edition—Appleton & Lange publication
8. American Medical Associations "Guides to the Evaluation of Permanent Impairment—$5^{th}$ Edition
9. Rehabilitation Medicine—Delisa Gans—$3^{rd}$ Edition—Lippincott—Raven publication In general the hierarchy of injury may be:
1. Loss of vision
2. Major amputations
3. Fracture dislocations to major joints
4. Fractures
5. Intra-abdominal injuries
6. Intra-pelvic injuries
7. Intra-thoracic injuries
8. Dislocations
9. Ligament and tendon injuries
10. Sprain and strain injuries
11. Lacerations
12. Contusions
13. Superficial injuries Within each of these injury groups there may also exist another hierarchy. For example, for fractures clearly a fractured femur is much more serious than fractured toe. Similarly, the removal of a kidney is much more serious than the removal of a gallbladder. Of course, a fractured toe is a trivial injury compared to any significant intra-abdominal injury. Therefore the injury hierarchy when applied to the body as a whole is not a strict one, but only a guide to the placement of different injuries in a pain and suffering medical severity scale. When applied to a body part this injury hierarchy is more constant though still with exceptions. In the arm for example, generally amputations would precede fracture dislocations and fractures and dislocations, which would precede ligament injuries, sprains strains and contusions and superficial injuries.

Injury complications can be either localized or systemic, and like injury type has a hierarchy which is along the following:
1. Life threatening, such as septicemia, peritonitis or pneumonia
2. Brain complications such as intracranial hematoma—subdural, subarachnoid or epidural hematoma, cerebral edema or posttraumatic epilepsy
3. Cranial nerve involvement such as vertigo, tinnitus or loss of smell and taste
4. Vascular complications such as crush syndrome, hypovolemic shock, deep vein thrombosis, compartment syndrome or hemorrhage
5. Thoracic complications such as pneumothorax, hemothorax, pneumothorax or pleural edema
6. Treatment complications such as fistula or adhesions
7. Bone complications such as osteomyelitis, avascular necrosis, bony union difficulties or limb deformities
8. Joint complications such as osteoarthritis, synovitis, joint stiffness or joint laxity
9. Pelvic complications such as hematuria, ureteral or urethral strictures
10. Localized infections Although a hierarchy exists, it may not be strictly followed in all cases. For example, osteoarthritis of the hip is not the same as osteoarthritis of the little finger.

In one embodiment, a treatment hierarchy includes, but is not limited to:
1. Amputation
2. Major chest surgery such as thoracotomy
3. Removal of the eye
4. Organ removal such as kidney or spleen
5. Other abdominal surgery
6. Pelvic surgery
7. Skull procedures such as craniotomy or craniectomy
8. Joint surgery such as spinal fusion, arthrodesis or arthroplasty
9. Bone surgery such as fracture reductions, sequestrectomy or osteotomy
10. Ligament and tendon repairs
11. Vascular repair
12. Fascia repair The above hierarchy is a guide as to the severity of treatments. For instance the amputation of the arm at the shoulder is far more severe than the amputation of the little finger. Accordingly there will be considerable overlap between treatments in the hierarchy in terms of where medical severities could be allocated.

Some injuries can be exceptional and therefore not be close to others of their kind in the hierarchy. For instance, a true dislocation of the knee (a tibiofemoral dislocation) is an orthopedic emergency, with the loss of the limb possible unless it is treated promptly and professionally. Even then the outcome will be guarded. Within the same injury category, dislocations, will be hip dislocations for instance. These latter dislocations do not present the same orthopedic emergency nor are they likely to have the same medical outcome. So in this case, dislocations of the knee would be regarded as the most severe form of dislocation and would rate as a more severe injury in the overall hierarchy of injury than it would have otherwise.

There are also instances where a combination of medical features can have significant implications for the matching process. For instance, a laceration of the upper arm requiring nerve repair implies that a $3^{rd}$ degree peripheral injury is present. Such nerve injuries can lead to significant impairment of the limb. On the other hand, a laceration to the upper arm with vascular repair is also a significant injury but is unlikely to have the same pessimistic outcome or associated impairment of the limb. Thus the first combination of injury and complication could be more serious than the second.

There are no specific rules to match the medical outcome with regard to permanent impairment. Impairments are addressed in the filters section below.

Filters

In some embodiments, filters are used to constrain, refine or relax the criteria that are used in finding matching closed claims. The starting settings of the filters can be specified on a company wide basis, at a user level, or at a specific claim level (once set by the user). Example filter settings are:
Tight
Enabled
Loose
Ignore The settings above are constraints on the range of values that will be used in the search for precedent claims. A "tight" setting for a parameter, such as age, will constrain the search only finding claims whose claimant is in a narrower age band. The "loose" setting will widen the band of claimant ages that can be returned.

The settings of "enabled" and "ignore" refer to parameters whose potential values are Boolean (constrained to the values of yes or no). Gender is an example of a Boolean values attribute—it is either enabled and only claims with the correct gender will be returned or ignored and claims involving both sexes will be returned.

Not all filter values have all the same potential settings. Example filter values are:
State and County
Age
Gender
Injuries
Impairment
Litigation stage State and County The state/county filter can take the values "tight", "loose" and "ignore". The "tight" setting will constrain the search to ensure that all claims returned match the county of the current claim. A "loose" setting will allow claims within the same state to be returned, using all counties within the corresponding state. An "ignore" setting will seek claims anywhere throughout the United States, including the nominated state and county.

Age

For each age (or range of ages), "tight" and "loose" may be defined. For example, a "tight" setting for a 40 year old may be from age 30 to 45, and a "loose" setting for a 40 year old may be from 25 to 55.

Example settings include:

| Claimant age | Tight From age | To age | Loose From age | To age |
| --- | --- | --- | --- | --- |
| 0 | 0 | 5 | 0 | 5 |
| 2 | 0 | 5 | 0 | 5 |
| 5 | 3 | 8 | 3 | 8 |
| 8 | 5 | 12 | 4 | 14 |
| 10 | 7 | 14 | 6 | 16 |
| 13 | 10 | 18 | 9 | 19 |
| 18 | 14 | 25 | 14 | 30 |

| Claimant age | Tight From age | To age | Loose From age | To age |
|---|---|---|---|---|
| 25 | 18 | 35 | 17 | 40 |
| 40 | 30 | 45 | 25 | 55 |
| 70 | 55 | 120 | 45 | 120 |
| 80 | 60 | 120 | 50 | 120 |
| 120 | 100 | 120 | 90 | 120 |

In the above example, the table has entries for ages 0 and 120. Though few claimants will have these particular ages, they are included to provide lower and upper bounds of theoretical potential ages. For claimants whose age falls in between two values in the first column, such as age 9, then the values used representing the age range will be intermediate values from the other columns. For example, if the setting for age is "tight" then, since age 9 is halfway between ages 8 and 10 (which appear in the claimant age column), the derived low age value will be 6 (halfway between 5 and 7—which are the corresponding value for ages 8 and 10) and the high bound will be 13 (between 12 and 14 from the high column).

Gender

The gender settings are "enable" and "ignore", which correspond to matching the claimant's gender or returning claims involving both sexes respectively.

Injuries

The settings for injuries are "tight" and "loose" only

For cases whose dominant injury is demonstrable (therefore non-whiplash) the "tight" setting constrains the matching to include precedent claims whose medical attributes match all the medical attributes of the current claim, excluding any trivial injuries. These medical attributes are governed by the medical rules as specified below. A "loose" setting widens the matching to claims which have the same dominant medical feature as the current claim (the dominant medical feature is described elsewhere in this document).

For claims that are predominantly of a soft tissue spinal nature the "tight" and "loose" setting can have different effects. A "tight" setting may constrain the matching to only return claims which have at least one of the whiplash type injuries of the current claim, and which have trivial demonstrable injuries if the current claim also has them or that do not have any trivial injuries if the current claim also does not have them. For example, for a case with a cervical sprain and a chest contusion the cases returned will include any that have a cervical sprain and another trivial demonstrable injury (not necessarily a chest contusion). A "loose" setting may remove the constraint of requiring to include or exclude the trivial demonstrable injuries. For the above example, claims would be returned which had a cervical sprain, but regardless of whether they also had any trivial demonstrable injuries.

Impairment

In a similar manner to the treatment of an age filter, impairment is constrained to be between two values. Different values are used for "tight" and "loose". Example settings include:

| Claimant whole person impairment | Tight Impairment from | Impairment to | Loose Impairment from | Impairment to |
|---|---|---|---|---|
| 0 | 0 | 0 | 0 | 0 |
| 0.1 | 0.1 | 0.5 | 0.1 | 3 |
| 3 | 2 | 4 | 2 | 5 |
| 5 | 4 | 6 | 3 | 8 |
| 10 | 8 | 12 | 7 | 13 |
| 20 | 17 | 23 | 15 | 25 |
| 50 | 40 | 60 | 35 | 70 |
| 60 | 60 | 100 | 60 | 100 |

Litigation Stage

In one embodiment, potential values for litigation stage are "direct", "unlitigated" and "suit". The values for 30 the filter are "enable" and "ignore". A setting of "enable" constrains the matching to return claims which have the same litigation stage, as the current claim. A setting of "ignore" will return claims regardless of their litigation stage.

Attorney Representation

In an embodiment, a filter may be applied depending on whether a claimant is represented by an attorney. In another embodiment, a filter may be applied depending on whether a claimant is represented by a particular attorney or a defined set of particular attorneys.

Accident Data

In an embodiment, a filter may be applied depending on whether EDR data is available for the accident that gave rise to the claim. In an embodiment, a filter may be applied depending on whether EDR data for the accident indicates that an injury was a low-impact injury.

Fallback

In some embodiments, if insufficient claims are matched the filters may be relaxed in order to expand the search.

In order of priority the filters are relaxed in the following order, assuming filters are originally set at tightest setting
1. Injury is set to "loose"
2. Gender is set to "ignore"
3. Age is set to "loose"
4. Age is set to "ignore"
5. Jurisdiction (state and county) is set to "loose"
6. Litigation stage is set to "ignore"
7. Jurisdiction is set to "ignore"

For example if insufficient claims are found then the first fallback for the filters is to set the injury filter to "loose". If there are still insufficient claims then the gender filter is set to "ignore". Filters may be relaxed in the above sequence until either enough claims are found or the relaxation of the filters has been exhausted.

If, in relaxing a filter, a large number of claims are returned, other filters already relaxed may be re-tightened in order to optimize the closeness of the matched claims' attributes until it reaches close to the minimum number of claims required. For example, if during filter relaxation reached the 6$^{th}$ stage (setting the litigation stage to "ignore"), and suddenly the number of claims matched rises to 100 then all the filters whose priority is less than 6 may be re-tigthened, and then, if not enough matches are found, may be relaxed again in turn until the minimum threshold is reached. This task may be repeated several times to optimize the closeness of the matched claims.

In certain embodiments, one or more of any of the characteristics used for filters described herein may be used as equalization criteria. Such equalization criteria may be used instead of, or in addition to, the application of various filters. For example, the system might filter claims based gender and adjust values using equalization values based on age.

In one embodiment the minimum number of claims used in the filter optimization is set to 6.

Ranking the Matching Claims

In some embodiments, matching claims are ranked on a numerical scale. For example, Rank 1 matches may be the best fit, but claims of Rank 4 are still similar claims. It is the number of claim attributes and to what degree they differ between a matched claim and the current claim that determine the rating a matched claim receives. Example attributes considered when determining ranking level are:

1. Dominant injury treatment or complication
2. Jurisdiction
3. Litigation stage
4. Age
5. Impairment
6. Secondary injuries For soft tissue spine additionally:

7. Treatment time
8. Number of GP visits
9. Number of chiropractor visits
10. Number of physical therapy visits
11. Number of specialist visits Within each rating displayed the claims are sorted by increasing General Damages.

Deriving Adjusted General Damages

There will be instances where the claims that have been returned by the matching process will not be absolute matches for the current claim. For example, the dominant medical feature may match, but secondary medical features may be different. Or if insufficient cases were found in the nominated stage and county then claims can be returned from another jurisdiction. This difference in jurisdiction can be reflected in different settlement values for similar claims. In both cases, the General Damages from the original settlement should be adjusted to reflect different jurisdiction or different secondary medical features. All returned claims may include the actual General Damages paid as well as the adjusted General Damages.

For example, if the current claim involved a fracture of the humerus only and the minimum required number of claims are found for the current claim jurisdiction, then this function would not be invoked. In some instances, however, there may not enough claims within the one jurisdiction, for this injury. The jurisdiction filter would be relaxed at some stage and claims from other states would have been returned. For the sake of example, the current claim is from Massachusetts and one of the claims being returned is from Connecticut. A trend may be found that Connecticut claims settle at higher monetary damages than Massachusetts claims, for similar cases. Thus, if the Connecticut precedent is to be used for the Massachusetts claim then an adjustment would be made to reduce its settled value to Massachusetts values.

In some embodiments, the system also adjusts for differences in litigation stage. For instance, settlements for claims already in suit are generally at higher monetary damages than for unlitigated claims, and direct claims respectively.

In order to derive the variations in settlement values from state to state settled claims from the entire database may be analyzed. Each claim may be considered in turn and matching claims found from other states. The difference between the settlement value of this claim and the average value from the matching claims is recorded, as a comparison. Once the entire database has been examined in this manner state by state relativities are calculated using the stored comparisons generated for each claim. This is performed once for claims involving demonstrable injuries and separately for soft tissue spine claims. Thus, two sets of relativities may be calculated for each state.

In a similar manner the relativities associated with the different stages of litigation may be calculated, by exhaustively examining all the claims in the database.

More commonly, instances will exist where the claims returned will be from the correct jurisdiction but they have different secondary medical features, because sufficient absolutely exact matches could be found. For example, if the current claim involved a fractured humerus and a fractured sternum and a matching humerus fracture claim involved a sprained wrist, then the current claim has a more serious secondary injury than the matched claim. Therefore, the projected value of the current claim should be higher than the settlement value of the matched claim.

Learning How to Adjust for Secondary Medical Features

In an embodiment, each medical code used by the system may be assigned a Pain and Suffering severity which represents the General Damages severity relativity. These relativities follow in general the injury, treatment and complication hierarchies described above. Each medical code may also been assigned a medical scale relativity parameter value (e.g., from 0 to 10). A higher the value may correspond to a more serious medical feature belonging to the code. F or instance, the complication of flail chest, a life threatening respiratory complication, may be assigned a medical scale of 8, while a facial wound infection is assigned 0.5. Other serious complications such as epidural, subdural or subarachnoid hematomas may be assigned a medical scale of 9. The medical scale values reflect the seriousness of a medical condition (whether this is an injury, treatment or complication) and its relationship to the General Damages settled. In the example above a flail chest would contribute more to the settlement than a facial wound infection In certain embodiments, each medical sub body part is assigned a rank. The injuries with same ranks have the same Pain and Suffering severities. For example the radius and ulna have the same rank and the system considers fracture ulna and fracture radius as the same injuries in terms of severity.

All closed claims in the database may be examined. For the injuries, the system may aggregate all medical codes with the same major body part, injury code and rank, to form a set of injury categories. For treatments and complications the categories are constructed by aggregation of the codes with the same medical scale. The system derives the contribution of each category of medical codes to the settlement values of the claims. Once the values of the medical codes categories have been derived then the Pain and Suffering severities assigned to every medical code are adjusted accordingly.

Prioritizing Medical Features for Each Body Part

Within each body part the medical features, being injuries, treatments and complications, may be listed in decreasing priority order. The first entry may be the highest priority—it is the most severe case and will be searched for instead of any others, if it exists.

All the rules are executed for each major body part required. This results in all matching injuries generating matching criteria.

Head

Skull fractures include open or closed fracture to the base of vault or the skull. Facial fractures also include open and closed fractures.

1. Removal of an eye
2. Intracranial hematoma, head vascular injury or cerebral edema
3. Fractured skull or concussive injury with epilepsy
4. Fractured skull or concussive injury with trigeminal neuralgia or cranial nerve injury
5. Fractured skull or concussive injury with hearing loss 6. Fractured skull or concussive injury with loss of smell and taste
7. Fractured skull or concussive injury with craniotomy, craniectomy or other skull surgery
8. Fractured skull or concussive injury with vertigo or tinnitus
9. Open skull or facial fracture or laceration of face or scalp with osteomyelitis
10. Skull, orbit or nose fracture with rhinorrhea or otorrhea
11. Fractured skull without skull surgical procedures
12. Fractured jaw (mandible or maxilla)
13. Fractured facial bone (zygoma or orbit)
14. Fractured nose
15. Laceration to the eye
16. Concussive injury
17. Laceration to the scalp, ear, eyelid, mouth or face Explanation Loss of sight may be the highest level of severity, followed by head injuries with accompanying intracranial hemorrhage such as epidural, subdural and subarachnoid hemorrhage. While recovery from intracranial hemorrhage may take place, some residual cerebral dysfunction may also exist. Posttraumatic epilepsy is a serious consequence of head injury which depending on its severity may have a profound affect on an individuals ability to lead a normal life style. Head injuries with associated cranial nerve trauma may result in sensory loss (hearing, smell and taste). Injuries to the acoustic nerve may produce vertigo or tinnitus or both, again these complications depending on the severity of the symptoms can seriously affect a person's ability to lead a normal life. Skull surgery is an indication that some serious brain or vascular injury or complication was involved. Facial fractures may have both a functional and disfiguring aftermath. Jaw fractures (mandible or maxilla) can heal with dysfunction to mastication and may even be disfiguring. Zygoma and orbit fractures may heal with disfigurement, similarly nasal fractures. The main implication for lacerations to the head region is disfigurement. Eye lacerations can be simple or extremely serious.

The severity order described above is not absolute, for example, an eye laceration with visual impairment clearly would be a more serious injury than where it currently lies within this hierarchy. Debilitating epilepsy or vertigo or tinnitus would also be higher in the hierarchy than suggested above.

Chest
1. Thoracic injuries involving open thoracic or abdominal surgery
2. Life threatening respiratory or cardiac complications (including flail chest, hemothorax, pneumothorax, pneumohemothorax, myocardial contusion, mediastinal emphysema or pneumonia)
3. Intercostal neuralgia
4. Fractured ribs or sternum
   a. Fractures of five or more ribs
      Fractures to 5, 6, 7 or 8 or more rib fractures
   b. Fractures of 4 ribs
      Fractures to 3 to 6 ribs
   c. Fractures of 3 ribs
      Fractures of 2 to 5 ribs
   d. Fracture of 2 ribs
      Fractures of up to 3 ribs or the sternum
   e. Fracture of 1 rib
      Fracture of 1 or 2 rubs or the sternum
   f. Fracture of the sternum
      Fractures of the sternum or 1 or 2 ribs
5. Lacerations or fractures to the internal throat structures
6. Internal thoracic contusions
7. Contusions to the internal throat structures
8. Laceration to the external throat
9. Laceration to the breast
10. Laceration to the chest wall Explanation Chest injuries requiring open chest surgery (thoracotomy) or an abdominal approach (laparotomy) may be the most potentially serious thoracic injury. Thoracotomy for example is one of the most invasive surgical procedures that can be undertaken. Then follows thoracic trauma with life threatening respiratory complications. Intercostal neuralgia is a painful and often intractable condition so it has been placed high in the severity hierarchy. Sternum and rib fractures follow. They are sometimes associated with lung complications such as pneomothorax or hemothorax, in which case they would be considered more serious an injury than a corresponding fracture without lung complication. Internal throat lacerations may be ranked higher than contusions in the overall chest severity hierarchy, lacerations to internal structures or organs are generally more serious than contusions.

Abdomen
1. Internal abdominal surgical removal or reconstruction (nephrectomy, splenectomy, colostomy, ileostomy or jejtnostomy)
2. Peritonitis
3. Fistula
4. Pancreatitis
5. Abscess or cyst
6. Adhesions or incisional hernia
7. Paralytic ileus
8. Internal abdominal open surgery via laparotomy
9. Internal abdominal surgery via laparoscopy
10. Abdominal injuries without surgical intervention Explanation Abdominal hierarchy is generally reflected by removal or repair or reconstruction to major abdominal organs and trauma or surgical complications. Removal of a kidney (nephrectomy) would be seen as the most serious abdominal injury because of its potential to be life threatening should the remaining kidney be injured or become diseased in the future. Removal of the spleen (splenectomy) puts the individual (particularly if he or she is young) at risk of very serious infection (post-splenectomy sepsis) and requires ongoing medication to prevent against infection. Injuries to the small or large bowel requiring surgery indicate serious abdominal injuries. Peritonitis heads the severity for abdominal complications. Fistula, abscess, cyst, adhesions and incisional hernia are all suggestive of possible further surgery. Abdominal injury with repair by laparotomy is considered more invasive than repair by laparoscope.

Pelvis and Uritogenital

Pelvic fracture includes both open and closed fractures.
1. Internal pelvic surgery or laparotomy
2. Intra-pelvic laceration of internal organs (bladder, ureter, urethra)
3. Pelvic fistula
4. Urethral or ureteral stricture or associated urethral, ureter or bladder injury
5. Osteomyelitis of the pelvis
6. Fracture of the pelvis or dislocation of the pelvic ring
7. Laparoscopic surgical repair of internal organs
8. Intra-pelvic contusion of internal organs
9. Lacerations to the testes
10. Lacerations of the penis
11. Lacerations to the scrotum 12. Lacerations to the vulva
13. Contusions of the testes Explanation Lacerations to the bladder, ureter or urethra requiring surgical repair or reconstruction are considered to be the most severe pelvic injuries, followed by complications such as fistula or stricture of the ureter or urethra. Pelvic fractures are serious injuries but not considered as serious as injuries to the urinary system aforementioned. Genital lacerations can be minor or serious injuries, this would be determined by any residual impairment that resulted. As with other body parts it is again pointed out this severity hierarchy is not inflexible and the order shown can change depending on factual circumstances of a claim.

Spine

Spinal fractures include open and closed fractures of the spine. Fractures, dislocations and fracture dislocations to any spinal region include such injuries to any specific level within the spinal region.
1. Fracture dislocations or dislocations of the cervical spine
2. Fracture dislocations or dislocations of the thoracic spine
3. Fracture dislocations or dislocations of the lumbar spine
4. Spinal adhesions
    Any spinal region
5. Osteomyelitis of the spine
    Any spinal region
6. Associated spinal nerve injury
    Any spinal region
7. Traumatic spondylolisthesis
    Any spinal region
8. Fractures of the cervical spine
9. Fractures of the thoracic spine
10. Fractures of the lumbar spine
11. Fractures of the sacrum
12. Fractures of the tailbone (coccyx)
13. Disc herniations or ruptures of the cervical spine requiring surgery
14. Disc herniations or ruptures of the thoracic spine requiring surgery
15. Disc herniations or ruptures of the lumbar spine requiring surgery
16. Disc herniations or ruptures of the cervical spine not requiring surgery
17. Disc herniations or ruptures of the thoracic spine not requiring surgery
18. Disc herniations or ruptures of the lumbar spine not requiring surgery
19. Spondylosis
    Any spinal region
20. Decubitus ulcer
21. Bed sores Explanation Fracture dislocations and dislocations of the spine head the severity hierarchy, vertebral fractures although serious injuries are not considered as severe. Dislocations of the vertebral column have graver potential consequences than fractures because of the increased possibility of spinal cord damage. The cervical region is regarded as potentially a more serious region to be involved than the thoracic or lumbar regions. Spinal complications then follow, followed by fractures. Disc herniations or ruptures requiring disc surgery are ranked higher than those without though of course this may not necessarily follow. Because a disc injury isn't surgically treated does not necessarily mean it is less serious than one operated on.

Arm
1. Amputations at the shoulder
    Any above elbow amputation
2. Amputations of the upper arm
    Forearm, elbow or above amputation
3. Amputation at the elbow
    Elbow, forearm and upper arm amputations
4. Amputation at the forearm
    Hand, wrist, elbow, forearm or upper arm amputations
5. Amputations of the hand or wrist
    Hand, wrist, forearm or elbow amputations
6. Amputations of the thumb
    Whole thumb or partial amputation
7. Amputations of other finger
    Amputation of whole finger or partial amputation
8. Crush injuries to the arm or hand with associated surgery (fasciotomy nerve repair vascular repair)
9. Volkmann's contracture
10. Reflex sympathetic dystrophy
11. Lacerations of the shoulder or upper arm requiring nerve repair
    $3^{rd}$ degree nerve injury to the median, axillary or ulnar nerves
12. Lacerations of the elbow or forearm requiring nerve repair
    $3^{rd}$ degree nerve injury to the radial or ulnar nerves
13. Crossunion of radius
    Synostosis involving the radius and ulna
14. Lacerations of the wrist or hand requiring nerve repair
    $3^{rd}$ degree nerve injury to the radial or digital nerves
15. Lacerations of the thumb requiring nerve repair
    $3^{rd}$ degree digital nerve injury
16. Amputations of the fingers
17. Avascular necrosis of humerus, radius or ulna
18. Avascular necrosis of the shoulder bones (scapula or clavicle)
19. Avascular necrosis of the carpal bones (scaphoid, lunate, pisiform, hamate, capitate, triquetral, trapeziod, trapezium)
20. Avascular necrosis of metacarpal, thumb or finger
21. Osteomyelitis of humerus, radius or ulna
22. Osteomyelitis of the shoulder bones (scapula or clavicle)
23. Osteomyelitis of the carpal bones (scaphoid, lunate, pisiform, hamate, capitate, triquetral, trapeziod, trapezium)
24. Osteomyelitis of metacarpal, thumb or finger
25. Deep vein thrombosis of the arm
26. Nonunion of humerus, radius or ulna
27. Nonunion of the shoulder bones (scapula or clavicle)
28. Nonunion of the carpal bones (scaphoid, lunate, pisiform, hamate, capitate, triquetral, trapeziod, trapezium)
29. Nonunion of metacarpal, thumb or finger
30. Osteoarthritis of shoulder, elbow or wrist
31. Osteoarthritis of hand, thumb or fingers
32. Delayed Union of humerus, radius or ulna
33. Delayed Union of the shoulder bones (scapula or clavicle)
34. Delayed Union of the carpal bones (scaphoid, lunate, pisiform, hamate, capitate, triquetral, trapeziod, trapezium)
35. Delayed Union of metacarpal, thumb or finger
36. Malunion of humerus, radius or ulna
37. Malunion of the shoulder bones (scapula or clavicle)
38. Malunion of the carpal bones (scaphoid, lunate, pisiform, hamate, capitate, triquetral, trapeziod, trapezium)
39. Malunion of metacarpal, thumb or finger 40. Fracture dislocation or dislocation of the shoulder
41. Fracture dislocation or dislocation of the elbow
42. Fracture dislocation or dislocation of the wrist
43. Fracture dislocation or dislocation of the hand
44. Fracture dislocation or dislocation of the thumb
45. Lacerations of the hand or wrist requiring tendon repair
46. Lacerations of the thumb requiring tendon repair
47. Associated tendon injury of hand, thumb or fingers
48. Lacerations of the fingers requiring tendon repair
49. Lacerations of the shoulder or upper arm requiring tendon repair
50. Lacerations of the elbow or forearm requiring tendon repair
51. Associated tendon injury of shoulder, upper arm, elbow, forearm or wrist
    With any other injury
52. Fracture of the humerus
53. Fractures of the forearm bones (radius or ulna)
54. Fractures of the shoulder bones (scapula or clavicle)
55. Crush injury to the thumb with associated surgery (fasciotomy nerve repair vascular repair)
56. Crush injuries to the fingers with associated surgery (fasciotomy nerve repair vascular repair)
57. Crush injury to the thumb not requiring surgery
58. Crush injuries to the fingers not requiring surgery
59. Fractures of the carpal bones (scaphoid, lunate, pisiform, hamate, capitate, triquetral, trapeziod, trapezium)
60. Fractures of the first metacarpal (of the thumb)
61. Fractures of the second to fifth metacarpals (of the fingers)
62. Fractures of the thumb
63. Fracture dislocation or dislocation of the fingers
64. Fractures of the fingers
65. Ligament injuries to the wrist with associated surgery
66. Ligament injuries to the hand with associated surgery
67. Ligament injuries to the shoulder with associated surgery
68. Ligament injuries to the elbow with associated surgery
69. Ligament injuries to the thumb with associated surgery
70. Ligament injuries to the fingers with associated surgery
71. Associated vascular injury
    With any other injury
72. Lacerations of the shoulder or upper arm requiring vascular repair
73. Lacerations of the elbow or forearm requiring vascular repair
74. Lacerations of the fingers requiring nerve repair
75. Associated nerve injury of the arm
76. Lacerations of the wrist or hand requiring vascular repair
77. Lacerations of the thumb requiring vascular repair
78. Lacerations of the fingers requiring vascular repair
79. Sprains and strains of the shoulder with associated surgery
80. Sprains and strains of the wrist with associated surgery
81. Sprains and strains of the elbow with associated surgery
82. Sprains and strains of the thumb with associated surgery
83. Sprains and strains of the fingers with associated surgery
84. Crush injuries to the arm or hand not requiring surgery
85. Ligament injuries to the wrist not requiring surgery
86. Ligament injuries to the hand not requiring surgery
87. Ligament injuries to the shoulder not requiring surgery
88. Ligament injuries to the elbow not requiring surgery
89. Ligament injuries to the thumb not requiring surgery
90. Ligament injuries to the fingers not requiring surgery
91. Bursitis, synovitis, tendonitis or tenosynovitis of shoulder, elbow or wrist
92. Bursitis, synovitis, tendonitis or tenosynovitis of hand, thumb or fingers
93. Sprains and strains of the shoulder not requiring surgery
94. Sprains and strains of the wrist not requiring surgery
95. Sprains and strains of the elbow not requiring surgery
96. Sprains and strains of the thumb not requiring surgery
97. Sprains and strains of the fingers not requiring surgery
98. Lacerations of the shoulder or upper arm not requiring surgery
99. Lacerations of the elbow or forearm arm not requiring surgery
100. Lacerations of the wrist or hand not requiring surgery
101. Lacerations of the thumb not requiring surgery
102. Lacerations of the fingers not requiring surgery Explanation In the above listing, traumatic amputations head the severity order i.e. the limb or part thereof was severed in the accident. Crush injury to the arm or hand follows, crush injuries might be expected to result in some vascular or peripheral nerve damage with resulting muscle and fascia dysfunction. Next in severity hierarchy is major peripheral nerve injury, minor nerve injuries are not surgically treated, those that are suggest $3^{rd}$ degree nerve injuries, and some residual dysfunction might be expected to result. Fracture complications come next in the order. Osteomyelitis and avascular necrosis are serious bone complications, the former being an infection and the latter a bone vascular problem. Nonunion is considered the most significant of the bony union complications (with the exception of cross union). Fracture dislocations and dislocations of major joints are considered slightly more severe than fractures. Obviously not all fractures or fracture dislocations or dislocations are treated alike in terms of injury hierarchy.

There is considerable severity overlap between these injuries with their complications and potential treatments. What may be ranked as a moderately severe injury may in fact end up a more serious injury than some ranked higher in severity, this however can be related by the adjuster as the "dominant injury".

Leg
1. Amputations at the hip
   Amputation at the hip or through the thigh
2. Amputations though the thigh
   Hip, thigh, knee or lower leg amputations
3. Amputations at the knee
   Amputation though thigh, knee or lower leg
4. Amputations through the lower leg
   Amputations through thigh, knee, lower leg, ankle or foot
5. Amputation at the ankle
   Amputations through knee, lower leg, ankle or foot
6. Amputations through the foot
   Amputations through lower leg, ankle or foot
7. Fracture dislocations or dislocations of the knee
8. Fracture dislocations or dislocations of the hip
9. Lacerations of the hip or thigh requiring nerve repair
   $3^{rd}$ degree nerve injury to the femoral or sciatic nerves
10. Lacerations of the knee or lower leg requiring nerve repair
    $3^{rd}$ degree nerve injury to the peroneal, popliteal, tibial or other nerves
11. Crush injuries of the leg or foot requiring surgery (fasciotomy nerve repair vascular repair)
12. Nonunion of femur, patella, tibia or fibula 13. Nonunion of tarsal bones (calcaneus, cuboid, navicular, talus or cuneiforms)
14. Deep vein thrombosis of the leg
15. Avascular necrosis of femur, patella, tibia or fibula
16. Avascular necrosis of tarsal bones (calcaneus, cuboid, navicular, talus or cuneiforms)
17. Avascular necrosis of metatarsals, sesamoids or toes
18. Osteomyelitis of acetabulum, femur, patella, tibia or fibula
19. Osteomyelitis of tarsal bones(calcaneus, cuboid, navicular, talus or cuneiforms)
20. Osteomyelitis of metatarsals, sesamoids or toes
21. Osteoarthritis of hip, knee or ankle
22. Osteoarthritis of foot or toes
23. Delayed union of acetabulum, femur, patella, tibia or fibula
24. Fractures of the femur
25. Fractures of the hip (acetabulum)
26. Fractures of the tibia
27. Amputation of the toes
    Any toes, whole or part
28. Nonunion of metatarsals, sesamoids or toes
29. Delayed union of tarsal bones (calcaneus, cuboid, navicular, talus or cuneiforms)
30. Delayed union of metatarsals or toes
31. Malunion of acetabulum, femur, patella, tibia or fibula
32. Malunion of tarsal bones (calcaneus, cuboid, navicular, talus or cuneiforms)
33. Malunion of metatarsals or toes
34. Fracture dislocations or dislocations of the ankle
35. Fracture dislocations or dislocations of the foot
36. Fractures of the hind foot (talus and calcaneus)
37. Ligament injuries of the knee requiring surgery
38. Sprain strain injuries of the knee requiring surgery
39. Ligament injuries of the ankle requiring surgery
40. Sprain strain injuries of the ankle requiring surgery
41. Ligament injuries of the hip requiring surgery
42. Sprain strain injuries of the hip requiring surgery
43. Sprain strain injuries of the thigh requiring surgery
44. Ligament injuries of the foot requiring surgery
45. Sprain strain injuries of the foot requiring surgery
46. Fracture dislocations or dislocations of the patella
47. Fractures of the patella
48. Fractures of the fibula
49. Fractures of the tarsal bones (cuboid, navicular, first, second and third cuneiforms, tibial and fibular sesamoids)
50. Crush injuries of the toes requiring surgery (fasciotomy nerve repair vascular repair)
51. Ligament injuries of the toes requiring surgery
52. Fractures of the forefoot (metatarsals)
53. Fracture dislocations or dislocations of the toes
54. Fractures of the toes
55. Associated vascular injury
56. Sprain strain injuries of the toes requiring surgery
57. Lacerations of the ankle or foot requiring tendon repair
58. Lacerations of the toes requiring tendon repair
59. Lacerations of the hip or thigh requiring tendon repair
60. Lacerations of the knee or lower leg requiring tendon repair
61. Lacerations of the hip or thigh requiring vascular repair
62. Lacerations of the knee or lower leg requiring vascular repair
63. Lacerations of the ankle or foot requiring nerve repair
64. Lacerations of the toes requiring nerve repair
65. Lacerations of the ankle or foot requiring vascular repair
66. Lacerations of the toes requiring vascular repair
67. Crush injuries of the leg or foot not requiring surgery
68. Crush injuries of the toes not requiring surgery
69. Ligament injuries of the knee not requiring surgery
70. Ligament injuries of the ankle not requiring surgery
71. Ligament injuries of the hip not requiring surgery
72. Ligament injuries of the foot not requiring surgery
73. Ligament injuries of the toes not requiring surgery
74. Associated tendon injury of hip, upper leg, knee, lower leg or ankle
75. Associated tendon injury of foot or toes
76. Associated nerve injury
77. Bursitis, synovitis, tendonitis or tenosynovitis of hip, knee or ankle
78. Bursitis, synovitis, tendonitis or tenosynovitis of foot or toes
79. Sprain strain injuries of the knee not requiring surgery
80. Sprain strain injuries of the hip not requiring surgery
81. Sprain strain injuries of the thigh not requiring surgery
82. Sprain strain injuries of the ankle not requiring surgery
83. Sprain strain injuries of the foot not requiring surgery
84. Sprain strain injuries of the toes not requiring surgery
85. Lacerations of the hip or thigh not requiring surgery
86. Lacerations of the knee or lower leg not requiring surgery
87. Lacerations of the ankle or foot not requiring surgery
88. Lacerations of the toes not requiring surgery Explanation In the listing above, traumatic amputations head the list of severity hierarchy. The follows fracture dislocations of the 2 largest joints in the body, the knee and the hip. Knee fracture dislocation has been given priority over the hip, Knee dislocations are orthopedic emergencies and even when treated promptly and expertly are still likely to result in neurovascular impairment. Injuries with peripheral nerve complications requiring nerve repair come next, the assumption applied here is that because nerve repair is required, the nerve injury is of a third degree type. Third degree peripheral nerve injuries do not fully heal. Extensive soft tissue injury (crush injury) is next, note: it is assumed this injury involves soft tissues—fascia, muscle etc. Bony injuries are not implied as being part of crush injuries. Fracture complications come next in the hierarchy and then fractures to the major weight bearing bones. It will be noted that the fibula although a long bone is not ranked along with the other bone of the lower leg, the tibia. The fibula is not weight bearing and fractures of the fibula are not considered as serious as tibia fractures.

As with the order for the other major body parts, this list is only a broad guide for leg injury severity hierarchy. Complications, treatments, prognosis and medical outcome are all factors that can change the order in which these injuries appear in this hierarchy.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

In some embodiments, users (e.g., claims adjusters, process evaluators, FSO personnel) may access or operate elements of a computer system via a network such as a WAN or LAN. In certain embodiments, users may have web-enabled access to a system (e.g., via internet browser).

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for displaying amounts for use in settling insurance claims, comprising:
    identifying, by a computer system, one or more closed claims that match an open claim based on one or more characteristics of the open claim;
    determining, by the computer system, a likelihood value associated with at least one of the matching closed claims, wherein the likelihood value is a numerical value whose magnitude reflects the likelihood that a monetary amount associated with a closed claim represents an appropriate monetary amount for settling an open claim, wherein the higher the numerical value, the more likely that the monetary amount associated with the closed claim represents an appropriate monetary amount for settling the open claim, and wherein the lower the numerical value, the less likely that the monetary amount associated with the closed claim represents an appropriate monetary amount for settling the open claim;
    displaying, on an x-y graph on a display of the computer system, the likelihood value associated with at least one of the matching closed claims as a function of monetary amount; wherein the likelihood value is displayed on the y-axis and the monetary amount is displayed on the x-axis; and
    displaying, by the computer system, one or more amounts for use in settling the open claim on the display of the insurance claims processing system, at least one of the amounts being based at least in part on an amount for at least one of the matching closed claims associated with at least one displayed likelihood value.

2. The method of claim 1, wherein displaying the likelihood value associated with at least one of the matching closed claims comprises displaying a likelihood curve.

3. The method of claim 1, wherein the displayed amounts are adjusted general damages amounts.

4. The method of claim 1, wherein determining a likelihood value associated with at least one of the matching closed claims includes determining a likelihood value associated with each of two or more closed claims.

5. The method of claim 4, wherein displaying at least one likelihood value comprises displaying at least two likelihood values associated with two or more of the matching closed claims.

6. The method of claim 5, wherein displaying at least two likelihood values comprises displaying a graph of at least two of the likelihood values as a function of monetary amount.

7. The method of claim 1, further comprising displaying one or more ranges of amounts for the open claim as a band in the x-y graph.

8. The method of claim 7, wherein, wherein the band comprises at least one delineator indicating an upper limit of a dollar amount for the band or a delineator indicating a lower limit of a dollar amount for the band.

9. The method of claim 7, wherein at least one of the one or more displayed ranges of amounts is a most likely range, wherein the most likely range is displayed as a band in the x-y graph, wherein the band comprises at least one delineator indicating an upper limit of a dollar amount for the band or a delineator indicating a lower limit of a dollar amount for the band.

10. The method of claim 7, wherein the band for at least one of the ranges comprises a delineator indicating a lower limit of a dollar amount, wherein the band corresponds to about the top quartile of the likelihood curve for the matching closed claims.

11. The method of claim 7, further comprising displaying a summary of amounts for at least one of the one or more ranges.

12. The method of claim 1, wherein the at least one likelihood value is displayed in a first display mode, the method further comprising:
    receiving an input from a user selecting to select a second display mode; and
    displaying a representative value for the open claim in the second display mode.

13. The method of claim 12, wherein the representative value is determined from a sum of least squares for values for two or more of the matching closed claims.

14. A system, comprising:
    a processor;
    a memory coupled to the processor and configured to store program instructions executable by the processor to implement:
    identifying one or more closed claims that match an open claim based on one or more characteristics of the open claim;
    determining a likelihood value associated with at least one of the matching closed claims,
    wherein the likelihood value is a numerical value whose magnitude reflects the likelihood that a monetary amount associated with a closed claim represents an appropriate monetary amount for settling an open claim, wherein the higher the numerical value, the more likely that the monetary amount associated with the closed claim represents an appropriate monetary amount for settling the open claim, and wherein the lower the numerical value, the less likely that the monetary amount associated with the closed claim represents an appropriate monetary amount for settling the open claim;

displaying, on an x-y graph on a display of the computer system, the likelihood value associated with at least one of the matching closed claims as a function of monetary amount; wherein the likelihood value is displayed on the y-axis and the monetary amount is displayed on the x-axis; and displaying one or more amounts for use in settling the open claim, at least one of the amounts being based at least in part on an amount for at least one of the matching closed claims associated with at least one displayed likelihood value.

15. A tangible, computer readable medium comprising program instructions, wherein the program instructions are computer-executable to implement:

identifying one or more closed claims that match an open claim based on one or more characteristics of the open claim;

determining a likelihood value associated with at least one of the matching closed claims, wherein the likelihood value is a numerical value whose magnitude reflects the likelihood that a monetary amount associated with a closed claim represents an appropriate monetary amount for settling an open claim, wherein the higher the numerical value, the more likely that the monetary amount associated with the closed claim represents an appropriate monetary amount for settling the open claim, and wherein the lower the numerical value, the less likely that the monetary amount associated with the closed claim represents an appropriate monetary amount for settling the open claim;

displaying, on an x-y graph on a display of the computer system, the likelihood value associated with at least one of the matching closed claims as a function of monetary amount; wherein the likelihood value is displayed on the y-axis and the monetary amount is displayed on the x-axis; and displaying one or more amounts for use in settling the open claim, at least one of the amounts being based at least in part on an amount for at least one of the matching closed claims associated with at least one displayed likelihood value.

16. The method of claim 1, wherein determining the likelihood value at least one of the matching closed claims comprises performing a maximum likelihood estimation.

17. The method of claim 1, wherein determining the likelihood value at least one of the matching closed claims comprises performing a kernel density estimation.

* * * * *